US007382773B2

(12) United States Patent
Schoeneberger et al.

(10) Patent No.: US 7,382,773 B2
(45) Date of Patent: Jun. 3, 2008

(54) CONTACT CENTER WITH NORMALIZED MULTIPLE PROTOCOL ARCHITECTURE

(75) Inventors: Carl Schoeneberger, Dallas, TX (US); Justin Broughton, Alameda, CA (US); Michael P. Dimitroff, Sunnyvale, CA (US); Kevin McPartian, Saratoga, CA (US); Charles Hymes, Pacifica, CA (US); Chandra Pisupati, Mountain View, CA (US)

(73) Assignee: Intervoice, Inc., Dallas, TX (US)

( * ) Notice: Subject to any disclaimer, the term of this patent is extended or adjusted under 35 U.S.C. 154(b) by 956 days.

(21) Appl. No.: 10/632,615

(22) Filed: Jul. 31, 2003

(65) Prior Publication Data

US 2004/0141508 A1 Jul. 22, 2004

Related U.S. Application Data

(60) Provisional application No. 60/435,974, filed on Dec. 20, 2002, provisional application No. 60/404,076, filed on Aug. 16, 2002.

(51) Int. Cl.
*H04L 12/66* (2006.01)
(52) U.S. Cl. ............... 370/353; 370/354; 370/384; 379/265.05; 379/265.09
(58) Field of Classification Search ........ 370/351–385; 379/265.01, 265.02, 265.05, 265.06, 265.07, 379/265.09, 266.01–266.1
See application file for complete search history.

(56) References Cited

U.S. PATENT DOCUMENTS

| 5,282,243 | A | 1/1994 | Dabbaghi et al. ........... 379/201 |
|---|---|---|---|
| 5,325,423 | A | 6/1994 | Lewis ........................ 379/90 |
| 5,390,295 | A | 2/1995 | Bates et al. ................ 395/157 |
| 5,459,780 | A | 10/1995 | Sand ......................... 379/265 |
| 5,483,582 | A * | 1/1996 | Pugh et al. ............ 379/144.01 |
| 5,488,411 | A | 1/1996 | Lewis ........................ 348/8 |
| 5,491,795 | A | 2/1996 | Beaudet et al. ............. 395/159 |

(Continued)

FOREIGN PATENT DOCUMENTS

EP 1 016 998 A2 5/2000

(Continued)

OTHER PUBLICATIONS

"Signaling Gateway CX6100-SG", Haraski et al., pp. 138-142, NEC Res & Develop., vol. 42, No. 2, Apr. 2001.

(Continued)

*Primary Examiner*—Hassan Kizou
*Assistant Examiner*—Brian T O'Connor
(74) *Attorney, Agent, or Firm*—Fulbright & Jaworski LLP

(57) ABSTRACT

The present invention is a system and method of receiving realtime and non-realtime communications from customers, distributing those communications efficiently to an appropriate agent and providing a response to the communication within an appropriate time. The present invention utilizes a hub and node architecture where realtime communications such as a voice call entering the architecture are received by a Voice over Internet Protocol (VoIP) gateway before being sent to a voice server. Other realtime and non-realtime communications are received by an appropriate media server. Routers for each media type access a predetermined set of routing data with an application server through a corporate and CRM database to facilitate routing through a node router to the appropriate node and agent.

89 Claims, 37 Drawing Sheets

U.S. PATENT DOCUMENTS

| | | | |
|---|---|---|---|
| 5,530,744 A | 6/1996 | Charalambous et al. | 379/265 |
| 5,612,730 A | 3/1997 | Lewis | 348/8 |
| 5,613,068 A | 3/1997 | Gregg et al. | 395/200.13 |
| 5,835,126 A | 11/1998 | Lewis | 348/8 |
| 5,844,572 A * | 12/1998 | Schott | 345/440 |
| 5,848,143 A | 12/1998 | Andrews et al. | 379/219 |
| 5,903,642 A | 5/1999 | Schwartz et al. | 379/309 |
| 6,046,741 A | 4/2000 | Hochmuth | 345/348 |
| 6,046,762 A | 4/2000 | Sonesh et al. | 348/16 |
| 6,049,603 A | 4/2000 | Schwartz et al. | 379/309 |
| 6,072,486 A * | 6/2000 | Sheldon et al. | 715/835 |
| 6,094,479 A | 7/2000 | Lindeberg et al. | 379/220 |
| 6,122,364 A * | 9/2000 | Petrunka et al. | 379/265.02 |
| 6,141,341 A | 10/2000 | Jones et al. | 370/352 |
| 6,144,667 A | 11/2000 | Doshi et al. | 370/401 |
| 6,188,673 B1 | 2/2001 | Bauer et al. | 370/252 |
| 6,188,761 B1 | 2/2001 | Dickerman et al. | 379/265 |
| 6,201,804 B1 | 3/2001 | Kikinis | 370/352 |
| 6,212,565 B1 | 4/2001 | Gupta | 709/229 |
| 6,219,648 B1 | 4/2001 | Jones et al. | 705/8 |
| 6,225,998 B1 | 5/2001 | Okita et al. | 345/356 |
| 6,266,058 B1 | 7/2001 | Meyer | 345/339 |
| 6,289,001 B1 | 9/2001 | Smyk | 370/216 |
| 6,298,383 B1 | 10/2001 | Gutman et al. | 709/229 |
| 6,301,480 B1 | 10/2001 | Kennedy, III et al. | 455/445 |
| 6,330,326 B1 | 12/2001 | Whitt | 379/265.13 |
| 6,337,858 B1 | 1/2002 | Petty et al. | 370/352 |
| 6,366,577 B1 | 4/2002 | Donovan | 370/352 |
| 6,377,568 B1 | 4/2002 | Kelly | 370/352 |
| 6,400,804 B1 | 6/2002 | Bilder | 379/76 |
| 6,430,174 B1 * | 8/2002 | Jennings et al. | 370/352 |
| 6,434,143 B1 | 8/2002 | Donovan | 370/356 |
| 6,445,695 B1 * | 9/2002 | Christie, IV | 370/352 |
| 6,463,148 B1 | 10/2002 | Brady | 379/265.01 |
| 6,493,695 B1 | 12/2002 | Pickering et al. | 706/47 |
| 6,529,499 B1 | 3/2003 | Doshi et al. | 370/352 |
| 6,542,475 B1 | 4/2003 | Bala et al. | 370/271 |
| 6,574,218 B1 | 6/2003 | Cooklev | 370/352 |
| 6,577,726 B1 | 6/2003 | Huang et al. | 379/265.02 |
| 6,584,191 B1 | 6/2003 | McPartlan et al. | 379/265.02 |
| 6,590,596 B1 | 7/2003 | Rector | 345/810 |
| 6,600,735 B1 | 7/2003 | Iwama et al. | 370/352 |
| 6,611,590 B1 | 8/2003 | Lu et al. | 379/265.09 |
| 6,614,902 B1 | 9/2003 | Rizzetto | 379/265.11 |
| 6,615,235 B1 | 9/2003 | Copeland et al. | 709/203 |
| 6,639,982 B1 | 10/2003 | Stuart et al. | 379/266.03 |
| 6,665,395 B1 | 12/2003 | Busey et al. | 379/265.09 |
| 6,674,713 B1 * | 1/2004 | Berg et al. | 370/217 |
| 6,678,265 B1 | 1/2004 | Kung et al. | 370/352 |
| 6,678,718 B1 | 1/2004 | Khouri et al. | 709/204 |
| 6,687,251 B1 | 2/2004 | Mousseau et al. | 370/401 |
| 6,697,858 B1 | 2/2004 | Ezerzer et al. | 709/224 |
| 6,704,409 B1 * | 3/2004 | Dilip et al. | 379/265.02 |
| 6,704,412 B1 * | 3/2004 | Harris et al. | 379/269 |
| 6,724,884 B2 | 4/2004 | Jensen et al. | 379/265.01 |
| 6,741,698 B1 | 5/2004 | Jensen | 379/265.02 |
| 6,766,377 B1 * | 7/2004 | Grabelsky et al. | 709/238 |
| 6,771,765 B1 * | 8/2004 | Crowther et al. | 379/265.09 |
| 6,778,494 B1 | 8/2004 | Mauger | 370/230 |
| 6,781,959 B1 | 8/2004 | Garakani et al. | 370/242 |
| 6,823,382 B2 | 11/2004 | Stone | 709/224 |
| 6,850,599 B2 | 2/2005 | Yoshitani | 379/37 |
| 6,850,613 B2 | 2/2005 | McPartlan et al. | 379/265.02 |
| 6,868,059 B1 | 3/2005 | Jones et al. | 370/216 |
| 6,937,715 B2 | 8/2005 | Delaney | 379/265.09 |
| 7,035,252 B2 | 4/2006 | Cave et al. | 370/356 |
| 7,085,263 B1 | 8/2006 | Fitzgerald | 370/352 |
| 7,167,899 B2 * | 1/2007 | Lee et al. | 709/204 |
| 7,225,139 B1 * | 5/2007 | Tidwell et al. | 705/8 |
| 2001/0024997 A1 | 9/2001 | Sugano et al. | 477/2 |
| 2002/0071541 A1 | 6/2002 | Cheung et al. | 379/215.01 |
| 2003/0018702 A1 | 1/2003 | Broughton et al. | 709/202 |
| 2003/0133558 A1 | 7/2003 | Kung et al. | 379/215.01 |
| 2003/0195753 A1 | 10/2003 | Homuth | 705/1 |
| 2004/0054743 A1 | 3/2004 | McPartian et al. | 709/206 |
| 2004/0066923 A1 | 4/2004 | Robinson | 379/166 |
| 2004/0141508 A1 | 7/2004 | Schoeneberger et al. | 370/401 |
| 2004/0221053 A1 | 11/2004 | Codella et al. | 709/231 |

FOREIGN PATENT DOCUMENTS

| | | |
|---|---|---|
| WO | WO 99/65214 | 12/1999 |
| WO | WO 01/35601 | 5/2001 |
| WO | WO 01/61529 A2 | 8/2001 |

OTHER PUBLICATIONS

"Media Gateway CX3200", Naoki Satoh et al., pp. 133-137, NEC Res & Develop., vol. 42, No. 2, Apr. 2001.

"Message Classification in the Call Center", by Stephan Busemann, Sven Schmeier, and Roman G. Arens. Published in Saarbrucken,Germany, pp. 158-165.

"The Modernization of a Call Center", by Karen Reasoner, University of Wyoming, Client Support Services, Information Technology, Laramie WY. 82070, pp. 270-273.

"Redefining the Call Center: Customer Service on the Internet", by D. Steul from San Francisco, Ca., pp. 38-42.

"Declaration of Kevin McPartlan", 2 pages.

"Declaration of Carl Schoeneberger" 2 pages.

Dr. D. E. Brown, "The Interaction Center Platform™", Interactive Intelligence, Apr. 6, 2001, pp. 1 of 31.

M. Taylor, "Integrated Versus Unified CTI—What's the Difference?", Interactive Intelligence http://www.inin.com/news/presscoverage/presscoverage.asp?id=14, Aug. 2, 2001, pp. 1 of 9.

CosmoCom, "CosmoCall Universe™ Technology Overview", http://www.cosmocom.com/Productinfo/techover.htm, Aug. 2, 2001, pp. 1 of 3.

"Using SNMP to Manage Your Call Center More Efficiently", 2001 Aspect Communication Corporation, 12 pp.

\* cited by examiner

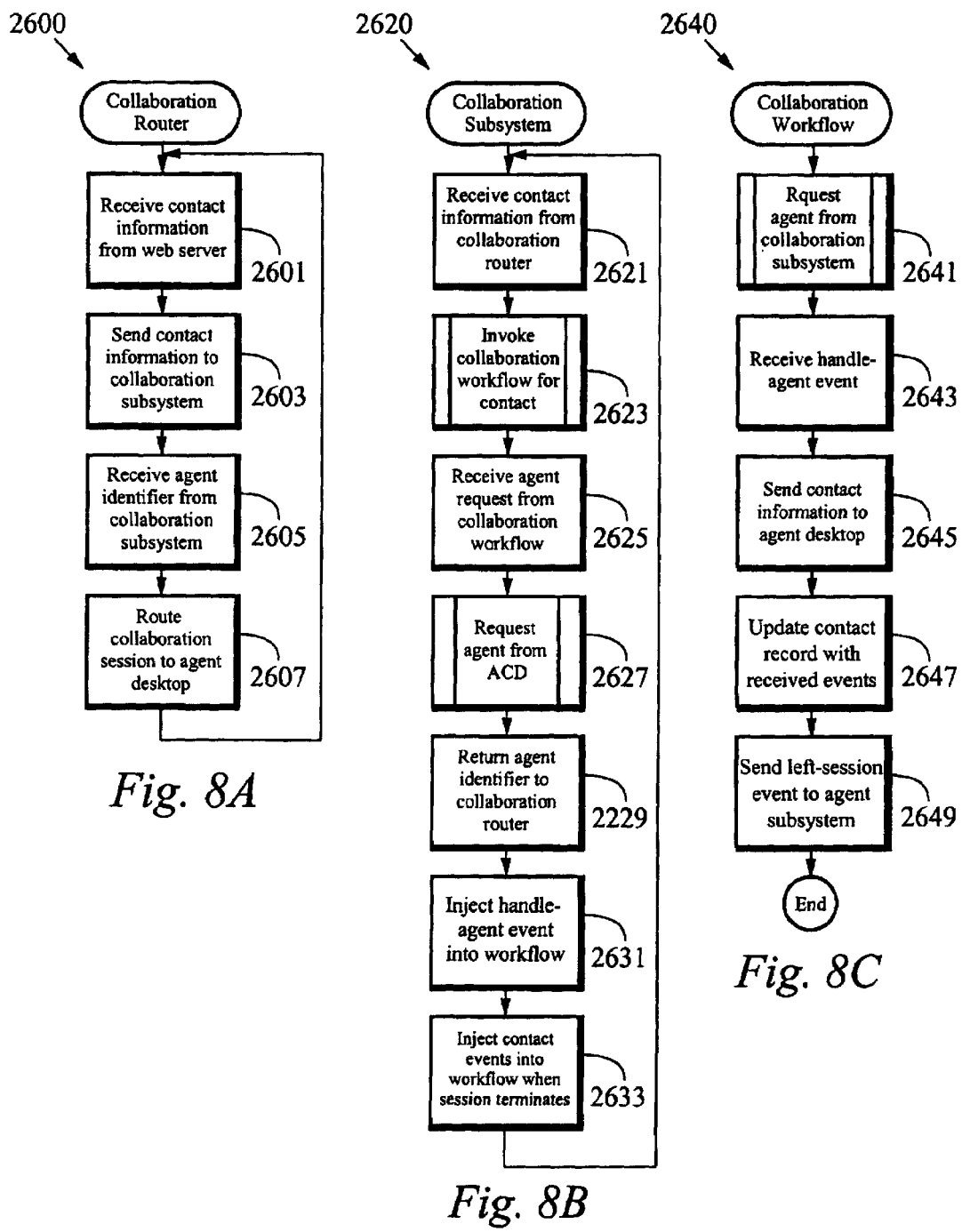

Proxy Server Priority Table — 300

| Proxy Address | Time Out | Level | Pointer |
|---|---|---|---|
| 192.168.0.1 | 36 mS | 1 | N/A |
| 192.168.0.2 | 36 mS | 1 | |
| 192.168.37.1 | 370 mS | 2 | N/A |
| 192.168.25.1 | 800 mS | 3 | 0 |
| 192.168.25.2 | 800 mS | 3 | 1 |
| 192.168.25.3 | 800 mS | 3 | 0 |
| DEFAULT | | -- | -- |

| | 600 |
|---|---|
| Field Option | Value |
| Incoming Caller | 214-555-1212 |
| Call Purpose | Billing Inquiry |
| Derivative Purpose 1 | Dispute |
| Dispute I.D. | 5/12/01/275 |
| DNI (Called Number) | (1-800-246-1000) |

602 → Field Option, 612 → Value
604 → Incoming Caller, 614 → 214-555-1212
606 → Call Purpose, 616 → Billing Inquiry
608 → Derivative Purpose 1, 618 → Dispute
610 → Dispute I.D., 620 → 5/12/01/275
611 → DNI (Called Number), 622 → (1-800-246-1000)

CONTACT CENTER WITH NORMALIZED MULTIPLE PROTOCOL ARCHITECTURE

RELATED APPLICATION(S)

This Patent Application claims priority under 35 U.S.C. §119(e) of the now abandoned U.S. Provisional Patent Application, Ser. No. 60/404,076, filed Aug. 16, 2002, and entitled "YOSEMITE ARCHITECTURE SPECIFICATION." The Provisional Patent Application Ser. No. 60/404,076, filed Aug. 16, 2002, and entitled "YOSEMITE ARCHITECTURE SPECIFICATION" is also hereby incorporated by reference in its entirety.

This Patent Application claims priority under 35 U.S.C. §119(e) of the now abandoned U.S. Provisional Patent Application, Ser. No. 60/435,974, filed Dec. 20, 2002, and entitled "YOSEMITE ARCHITECTURE SPECIFICATION II." The Provisional patent Application, Ser. No. 60/435,974, filed Dec. 20, 2002, and entitled "YOSEMITE ARCHITECTURE SPECIFICATION II" is also hereby incorporated by reference in its entirety.

The co-pending and co-owned U.S. patent application Ser. No. 10/327,360, filed Dec. 20, 2002, and entitled "REMOTE AGENT ACCESS METHOD TO A VOIP CONTACT CENTER WHERE HIGH QOS IS NOT SUPPORTED" is also hereby incorporated by reference in its entirety.

The co-pending and co-owned U.S. patent application Ser. No. 10/327,348, filed Dec. 20, 2002, and entitled "SCHEDULED RETURN TO QUEUE WITH PRIORITY (SRQP)" is also hereby incorporated by reference in its entirety.

The co-pending, co-owned and co-filed U.S. patent application Ser. No. 10/632,615, filed Jul. 31, 2003, and entitled "HIGH AVAILABILITY VOIP SUBSYSTEM" is also hereby incorporated by reference in its entirety.

The co-pending, co-owned and co-filed U.S. patent application Ser. No. 10/633,250, filed Jul. 31, 2003, and entitled "AUTOMATIC MANAGEMENT OF THE VISUAL SPACE WHILE PERFORMING A TASK" is also hereby incorporated by reference in its entirety.

The co-pending, co-owned and co-filed U.S. patent application Ser. No. 10/633,018, filed Jul. 31, 2003, and entitled "ESCALATED HANDLING OF NON-REALTIME COMMUNICATIONS" is also hereby incorporated by reference in its entirety.

The co-pending, co-owned and co-filed U.S. patent application Ser. No. 10/632,617, filed Jul. 31, 2003, and entitled "GRAPHICAL CONTROL FOR SIMULTANEOUSLY EDITING AN ARRAY OF VALUES THAT SUM TO A FIXED VALUE" is also hereby incorporated by reference in its entirety.

FIELD OF THE INVENTION

The present invention relates generally to the field of contact centers. More specifically, the present invention relates to the field of processing realtime and non-realtime communications from customers in a contact center.

BACKGROUND OF THE INVENTION

As the service sector of the economy has grown, contact centers have become the nerve center of many businesses. A consumer of computer software and hardware peripherals with a conflict between multiple computer programs or devices can call the sales and service department of the computer manufacturer or software company to resolve the interrupt conflict. A purchaser of a 3 horse power induction motor can speak with a technical representative at a contact center to re-configure a motor from a 110 volt wiring to a 220 volt wiring. Many automobile insurance companies have agents on call 24 hours a day to handle insurance claims, or offer proof of insurance when members are stopped by police. Credit card companies often staff agents 24 hours a day to receive reports of lost or stolen credit cards, as well as emergency requests for increased credit limit. Some contact centers are, by their nature, 24 hour-a-day businesses. For example, many airlines have a global presence in major cities throughout the world, and tickets and scheduling are continually taking place around the globe. Phone numbers, often toll free, can connect callers around the globe with ticketing agents for sales, re-scheduling to another flight, information regarding departure, arrival, delays, and missing baggage.

As web-based and web-assisted commerce has grown, many transactions formerly performed over a telephone are conducted over new mediums, including the web, email, and various live-camera conference calls. In many contact centers, the telephone has been replaced by the computer, which can handle standard phone calls by means of an expansion card, and can also provide web access and email access. The term "phone" is not limited to the traditional handset, but can refer to any means of achieving voice communication, including traditional handsets and computers with audio capability. In a traditional contact center limited to standard telephones and phone calls, a private branch exchange (PBX) was typically sufficient to route calls to agents. In a setting comprising twenty agents, a round robin routing scheme could be performed by a PBX. The round robin scheme would receive an incoming call and locate the first available agent, as numbered from one to twenty. If agents one through six were busy on calls, the call would be routed to agent seven. When the next call came in, the PBX would begin by examining the status of agent eight. Alternatively, routing could be prioritized, such that, if agent "one" is available, the incoming call was given to agent one. Only when agent one was busy would the call be routed to another agent. Because phone media, by itself, was not very complex, the routing schemes were also simple.

In addition to the greater flexibility afforded by the multi-format contact center described herein, greater time management can be provided when a multi-format contact center includes real-time media and delayed media options. Most industries experience "peak" client call times, followed by lower demand times. Through a multi-format contact center incorporating real-time assistance such as a phone call or web chat requests, and deferred assistance such as an email response or a voice message, a contact center is able to level the demands placed on agents throughout the day by responding to delayed-response mediums such as email during non-peak hours when incoming live calls are lessened. This has the added advantage of allowing true flexibility beyond projected levels of client contact. For example, projections can suggest that on Monday mornings from 8:00 a.m. to 11:40 a.m. agents will be interacting live because of the volume of incoming real-time calls (telephone, web-assistance, etc), but on a given Monday morning, live incoming calls may be abnormally slow, allowing agents to answer delayed calls such as email questions submitted by clients. The terms "call," "incoming call," and "caller" as used herein with respect to the present invention are therefore intended in the broadest sense, including but not limited to traditional telephone calls, web co-navigation, email, visual conferencing and other electro-optical communication mediums. Throughout this disclosure, examples specifically reference a telephone call, or variously refer to a telephone or to a computer. Those skilled in the art will recognize that the same principles apply to other contact methods, and that the example is not offered to limit the present invention.

SUMMARY OF THE INVENTION

The present invention is a system and method of receiving realtime and non-realtime communications from customers, distributing those communications efficiently to an appropriate agent and providing a response to the communication within an appropriate time. The present invention utilizes a hub and node architecture where realtime communications such as a voice call entering the architecture are received by a Voice over Internet Protocol (VoIP) gateway before being sent to a voice server. Other realtime and non-realtime communications are received by an appropriate media server. Routers for each media type access a predetermined set of routing data with an application server through a corporate and CRM database to facilitate routing through a node router to the appropriate node and agent.

In one aspect of the present invention, a contact center for receiving and routing realtime and non-realtime communications from a customer to a plurality of agents to elicit a response comprises at least one hub configured to receive and route realtime and non-realtime communications from the customer including at least one server configured to receive realtime and non-realtime communications from the customer, a plurality of gateways configured to receive a voice call from the customer, at least one router coupled to the at least one server, the at least one router configured to normalize realtime and non-realtime communications from the customer and an application server coupled to the at least one router, the application server configured to route the realtime and non-realtime communications based upon a set of predetermined routing criteria. The contact center also comprises at least one node coupled to the at least one hub, the at least one node configured to receive realtime and non-realtime communications, the at least one node further configured to route the realtime and non-realtime communications to the plurality of agents.

The contact center further comprises a node router configured to interface between the at least one hub and the at least one node, wherein the node router provides the application server with the availability status of the at least one node and the plurality of agents, an immediate workflow engine configured in the application server, wherein the immediate workflow engine includes the predetermined routing criteria, at least one corporate CRM database coupled to the at least one hub, wherein the immediate workflow engine is configured to store a set of CRM data to and extract the set of CRM data from the at least one corporate CRM database. The at least one server includes an email server configured to receive non-realtime communication including emails and voice messages, a web collaboration server configured to receive realtime communications including web collaboration requests and a voice server coupled to the plurality of gateways, the voice server configured to receive the voice call from the plurality of gateways. The at least one router includes an email router corresponding to the email server, a web collaboration router corresponding to the web collaboration server and a voice router corresponding to the voice server.

The contact center further comprises a software ACD configured in the application server, wherein the software ACD matches the at least one node to realtime and non-realtime communications, further wherein the software ACD matches the plurality of agents to realtime and non-realtime communications. The software ACD calculates a contact priority value for every realtime and non-realtime communication when one of the plurality of agents is available. A first one of the at least one nodes match realtime and non-realtime communications to a second one of the at least one nodes when a plurality of nodes exist, and the at least one hub is not operational, and further wherein the at least one node matches the realtime and non-realtime communications to the plurality of agents when the at least one hub is not operation.

The contact center further comprises a database, coupled to a workflow engine, the database configured to record a set of transaction data produced by the workflow engine, wherein the workflow engine is the immediate workflow engine or a deferred workflow engine, an in memory database coupled to the database, the in memory database configured to replicate the set of transaction data in the database, further wherein the in memory database is replicated in each of the at least one node and a contact history viewer, the contact history viewer configured to allow the plurality of agents to view the set of transaction data.

The at least one node includes a node voice server configured to receive a local voice call from a local gateway, a node voice router coupled to the node voice server and configured to receive the local voice call from the node voice server and a node application server coupled to the node voice router and the at least one hub, wherein the node application server is configured to receive the local voice call from the node voice router, and further wherein the node application server is configured to receive realtime and non-realtime communication from the at least one hub. The plurality of gateways include a proxy table configured in each of the plurality of gateways, wherein the plurality of gateways send the voice call to one of at least one proxy server and a call restoration data table configured in each of the plurality of gateways, wherein the call restoration data table provides data to restore a lost call. The voice call is divided by the plurality of gateways into a session initiation protocol portion and a real time protocol portion. The at least one hub includes the at least one proxy server, the at least one proxy server configured to receive the session initiation protocol portion of the voice call.

The contact center further comprises at least one media server configured in the at least one hub, the at least one media server configured to receive the real time protocol portion for the voice call. The at least one node are coupled to each of the at least one hub with a local area network connection. The plurality of gateways are configured such that when one of the plurality of gateways fails, the remainder of the plurality of gateways remain operational. The proxy table selects the appropriate proxy server based on a priority scheme. The data provided to the call restoration data table is transmitted to the call restoration data table in a session initiation protocol packet, further wherein the session initiation protocol packet includes a header and an SDP body. The data provided to the call restoration data table is stored as a key value pair, further wherein the key value pair is derived from the header and the SDP body.

The contact center further comprises a plurality of shared file folders configured in the email server where non-realtime communications are received and stored, wherein an aged communication is extracted from the plurality of shared file folders based on a set of predetermined escalation criteria, an escalation service coupled with the plurality of shared file folders such that the escalation service routes the aged communication to the immediate workflow engine and a plurality of designated agents such that the aged communication is displayed on a desktop of a first designated agent after receiving the aged communication from the immediate workflow, wherein the first designated agent provides an immediate response to the aged communication on the desktop, and further wherein the escalation service escalates an immediate communication to the immediate workflow engine for routing to the first designated agent. The desktop includes a visual indicator, further wherein the visual indicator includes an expiration time for the aged communication in the plurality of shared file folders. The communication is designated as immediate based on the set of predetermined escalation criteria before the communication becomes aged. The escalation service checks a present threshold for a maximum number of immediate workflows and delays escalating the communications designated as immediate until the number of immediate workflows is below the threshold.

The contact center further comprises a second designated agent, wherein when the first designated agent does not answer the aged communication, the immediate workflow routes the aged communication to the second designated agent. The contact center further comprises sending an acknowledgment message when the first and second designated agents are unavailable. The aged communication is routed to the second designated agent after the first designated agent does not answer the prompt. The aged communication is routed to the second designated agent after the first designated agent answers the prompt by declining to respond to the aged communication. The first designated agent is prompted when the first designated agent does not respond within a predetermined timeout period after the aged communication is displayed on the desktop. The set of predetermined escalation criteria are variable such that the set of predetermined escalation criteria will change while the first designated agent responds to the aged communication. The first and second designated agents may select non-realtime communications from the plurality of shared file folders that are not designated as aged, and further wherein the first and second designated agents respond to those non-realtime communications not designated as aged. An agent is designated based on a set of predetermined designation criteria.

The contact center further comprises a remote data access device, a remote terminal coupled with the remote data access device through a data circuit and a remote telephone coupled with the plurality of gateways through a telephone circuit, wherein when a remote agent logs the remote terminal into the contact center, a voice component of the voice call is transmitted from the plurality of gateways to the remote telephone and a data component of the voice call is transmitted from the contact center to the remote terminal. When the remote terminal logs into the contact center, the remote terminal provides a phone number to direct the transmission of the voice component of the voice call from the plurality of gateways to the remote telephone. The remote agent can respond to the voice call using the remote telephone and the remote terminal. The telephone circuit is a public switched telephone network. The data circuit is a high speed internet connection. The data circuit is a high speed wireless internet connection. The remote data access device is a VPN device.

The contact center further comprises a graphical user interface for displaying on an agent desktop including a shutters managed display having a task bar, wherein the task bar includes at least one managed application, at least one shutter icon corresponding to each one of the at least one managed applications and a workflow having at least one step corresponding to each one of the at least one shutter icons, wherein one of the at least one shutter icons is selected according to the corresponding step of the workflow, and the managed application corresponding to the selected shutter icon is displayed in a managed application display area, wherein a predetermined set of rules determines the size, placement and visibility of the at least one managed application in the managed application display area. The managed application corresponding to the selected shutter icon is displayed outside of the managed application display area. The contact center further comprises a quick start bar, wherein the quick start bar includes at least one non-managed application and a contact center control panel illustrating current contact information. The graphical user interface is displayed on the agent desktop having a display and an input device. The input device is used to selectively input data in to any one of the at least one managed applications. When one of the plurality of agents select any of the at least one shutter icons, the corresponding managed application is displayed in the managed application display area.

The contact center further comprises a second graphical user interface for displaying in an application on the agent desktop including a view including a plurality of wedges, wherein each of the plurality of wedges represents a value, a thumb corresponding to each of the plurality of wedges, the thumb configured to allow a user to change the value of the corresponding wedge and a track forming an outside edge of the view, the track configured to allow the user to change an attribute of the second graphical user interface, wherein when the user changes the value of any of the plurality of wedges, the remaining wedges adjust their values according to a set of predetermined allocation criteria. The thumb is configured such that the user changes the value of one of the plurality of wedges by dragging the thumb. The thumb and the track are configured such that the user changes the value of one of the plurality of wedges by clicking on the track. The sum of the values of the plurality of wedges is a constant value. The track is configured such that the user changes the attribute of the graphical user interface by dragging the track. The attribute of the second graphical user interface is the constant value. Any of the plurality of wedges can be locked by the user such that the value corresponding to the locked wedge will not change.

The contact center further comprises an allocation algorithm, wherein the allocation algorithm creates a relationship between any of the values of the plurality of wedges, a plurality of text boxes corresponding to each of the plurality of wedges, wherein the text boxes include the value of each of the plurality of wedges, and further wherein the user may change the value of any of the plurality of wedges by entering a new value into any of the plurality of text boxes and a plurality of control buttons, wherein the control buttons are programmable, thereby allowing the user to customize the function of the control buttons. The view is a circle, rectangle or a bar graph.

In another aspect of the present invention, a method of distributing realtime and non-realtime communications in a contact center to elicit a response comprises receiving the realtime and non-realtime communications in at least one hub, wherein the at least one hub includes at least one server configured to receive realtime and non-realtime communications, normalizing the realtime and non-realtime communications, wherein at least one media router is configured for normalizing the realtime and non-realtime communications and routing the realtime and non-realtime communications, wherein an application server is configured to route the realtime and non-realtime communications to at least one node based upon a set of predetermined routing criteria, further wherein the at least one node is configured to route the realtime and non-realtime communications.

In yet another aspect of the present invention, a contact center for distributing realtime and non-realtime communications to elicit a response comprises means for receiving the realtime and non-realtime communications in at least one hub, means for normalizing the realtime and non-realtime communications, wherein the normalizing means are coupled to the receiving means and means for routing the realtime and non-realtime communications to at least one node based upon a set of predetermined routing criteria, wherein the routing means are coupled to the normalizing means.

BRIEF DESCRIPTION OF THE DRAWINGS

FIGS. 8a-8c are flowcharts of methods to be performed by collaboration components in the embodiment of the digital multimedia contact center shown in FIG. 4.

FIG. 14b is a diagram of one embodiment of a computer sytem suitable for use in the operating environment of FIG. 14a.

FIG. 15 illustrates a priority table of the present invention.

DETAILED DESCRIPTION OF THE PREFERRED EMBODIMENT

Figure 1:
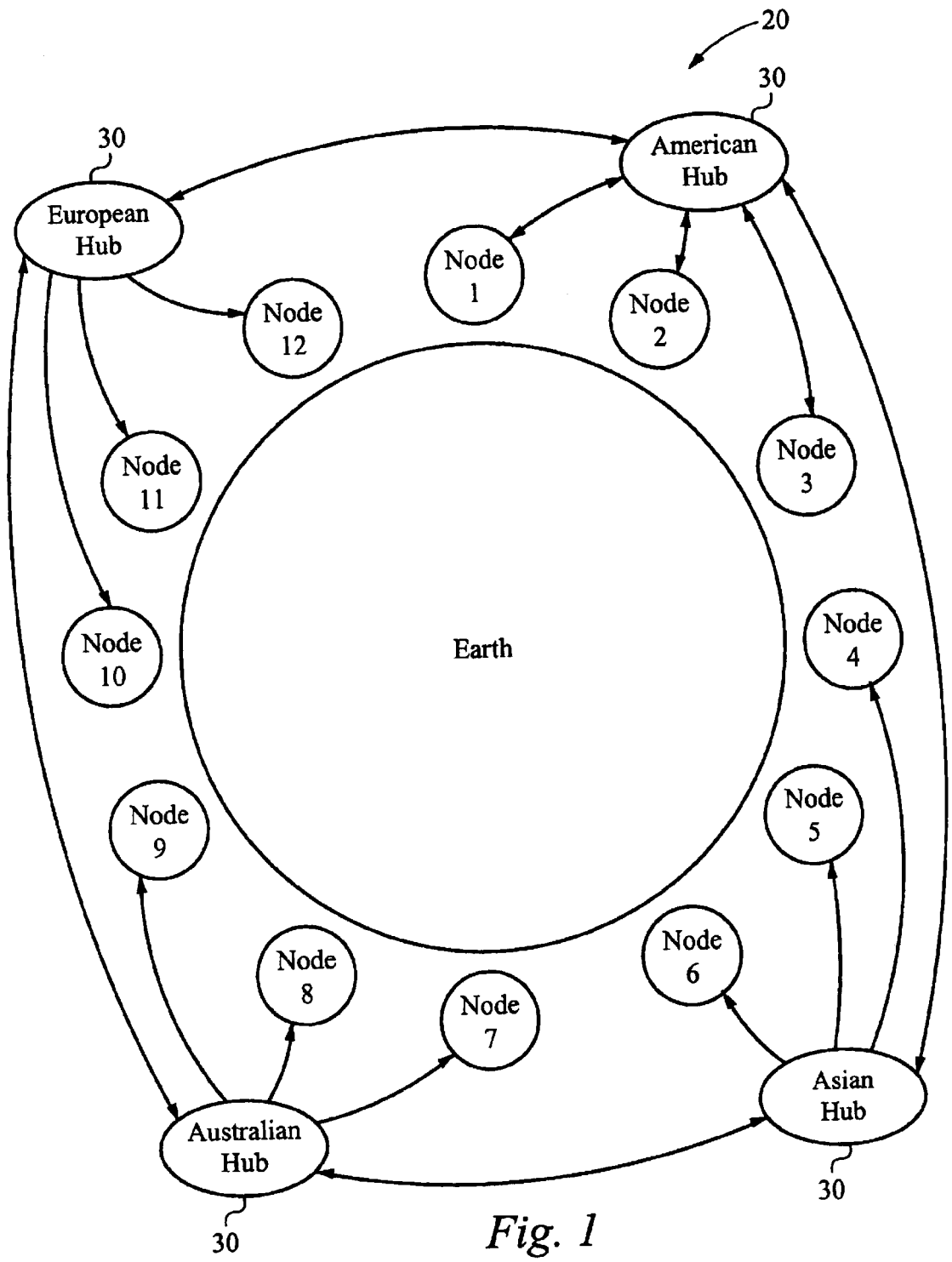
FIG. 1 illustrates a hub-and-node communication structure of a global contact center.

Referring to FIG. 1, an exemplary hub and node communication structure of a global contact center 20 is depicted. Here, a number of hubs 30 of the global contact center 20, including hubs 30 physically located in Europe, Australia, Asia and the United States, include a number of nodes 1-12 coupled to the appropriate hub 30 through a wide area network (WAN) or local area network (LAN). The hubs 30 are also coupled to each other as shown. This contact center 20 allows customers to send a communication in to the contact center 20 and have that communication answered in an acceptable amount of time.

Still referring to FIG. 1, a realtime communication such as a phone call, regardless of when it is placed, may be routed using this contact center 20 architecture to a qualified agent in any node 1-12 in the world. For example, if a customer in the United States works the late shift and is unable to call into the contact center 20 with an inquiry until late at night, when the agents in all of the United States nodes 1-3 have gone home, the call may be routed to a hub 30 that is operating in normal business hours such as the Asian Hub 30 or the Australian Hub 30. This contact center 20 architecture thereby eliminates the need of any single hub 30 to staff an agent workforce for a continuous 24 hour period. Of course, it will be readily understood to one skilled in the art that the contact center 20 depicted in FIG. 1 is for exemplary purposes only and should not be construed to represent the only embodiment of the present invention. The present invention may utilize any number of hubs and nodes to facilitate efficient handling of calls based on system requirements and constraints.

Voice Routing

Figure 2A:
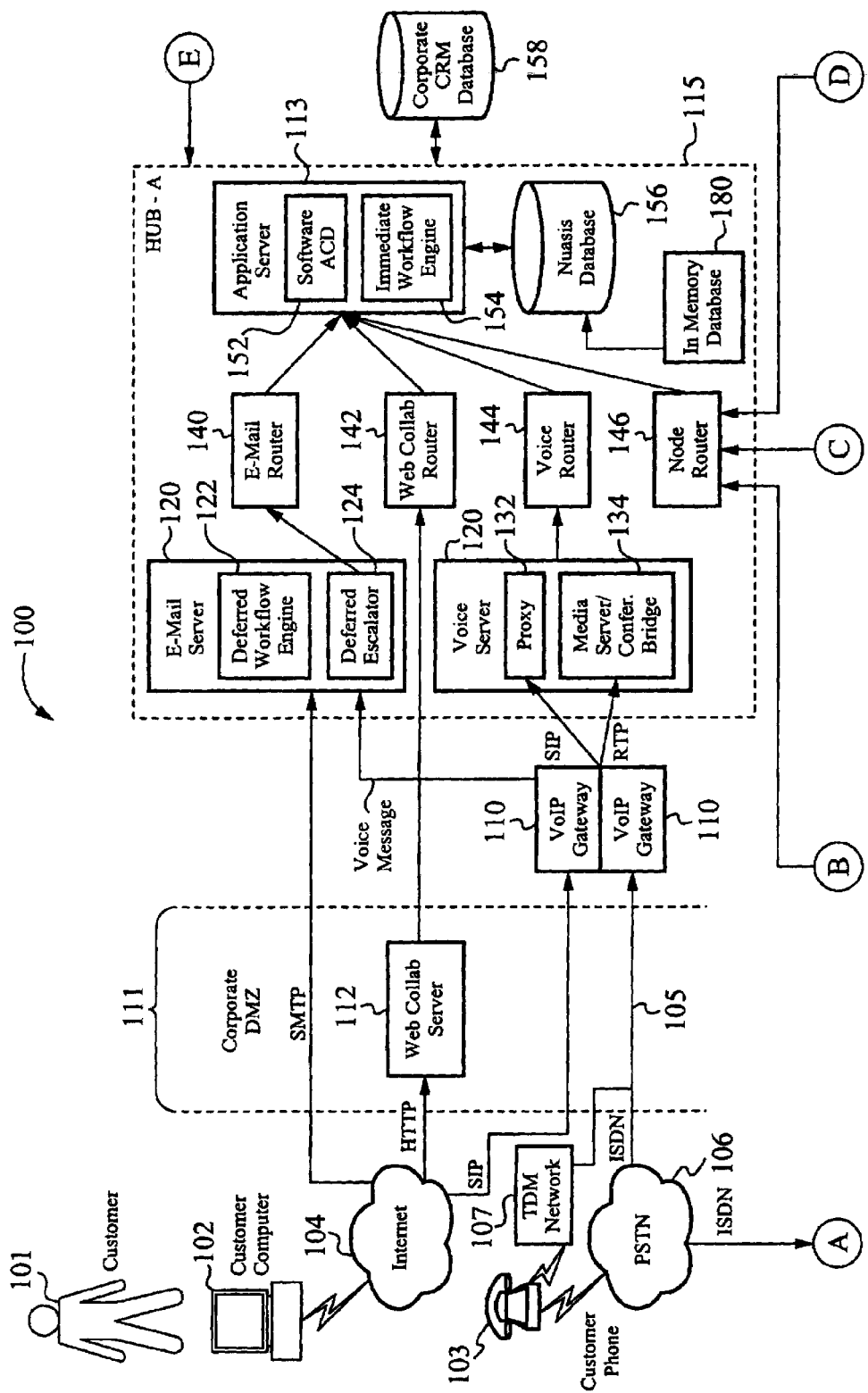
FIGS. 2a-2c illustrate a graphical representation of the preferred embodiment of the present invention.
Figure 2B:
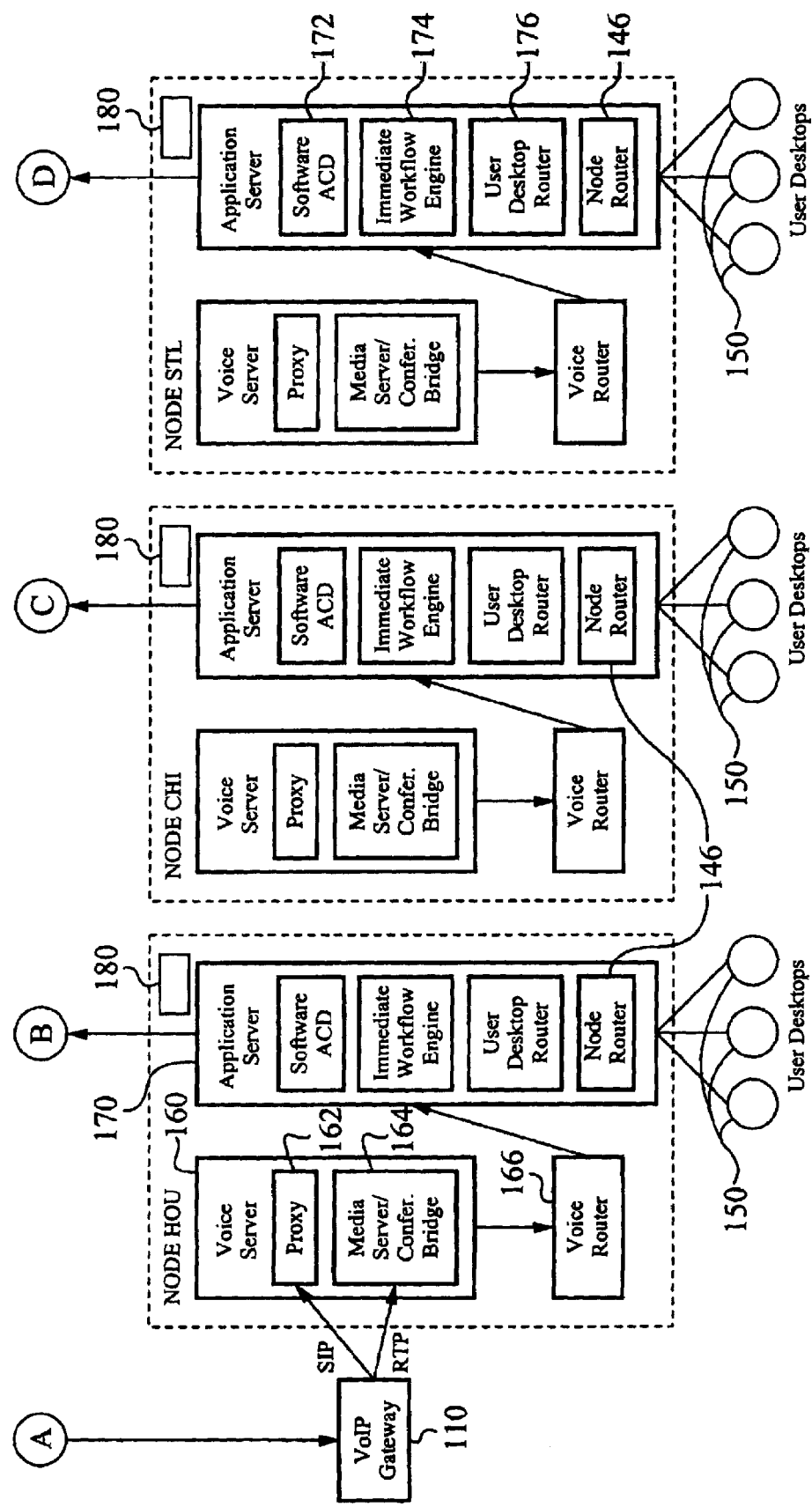
Figure 2C:
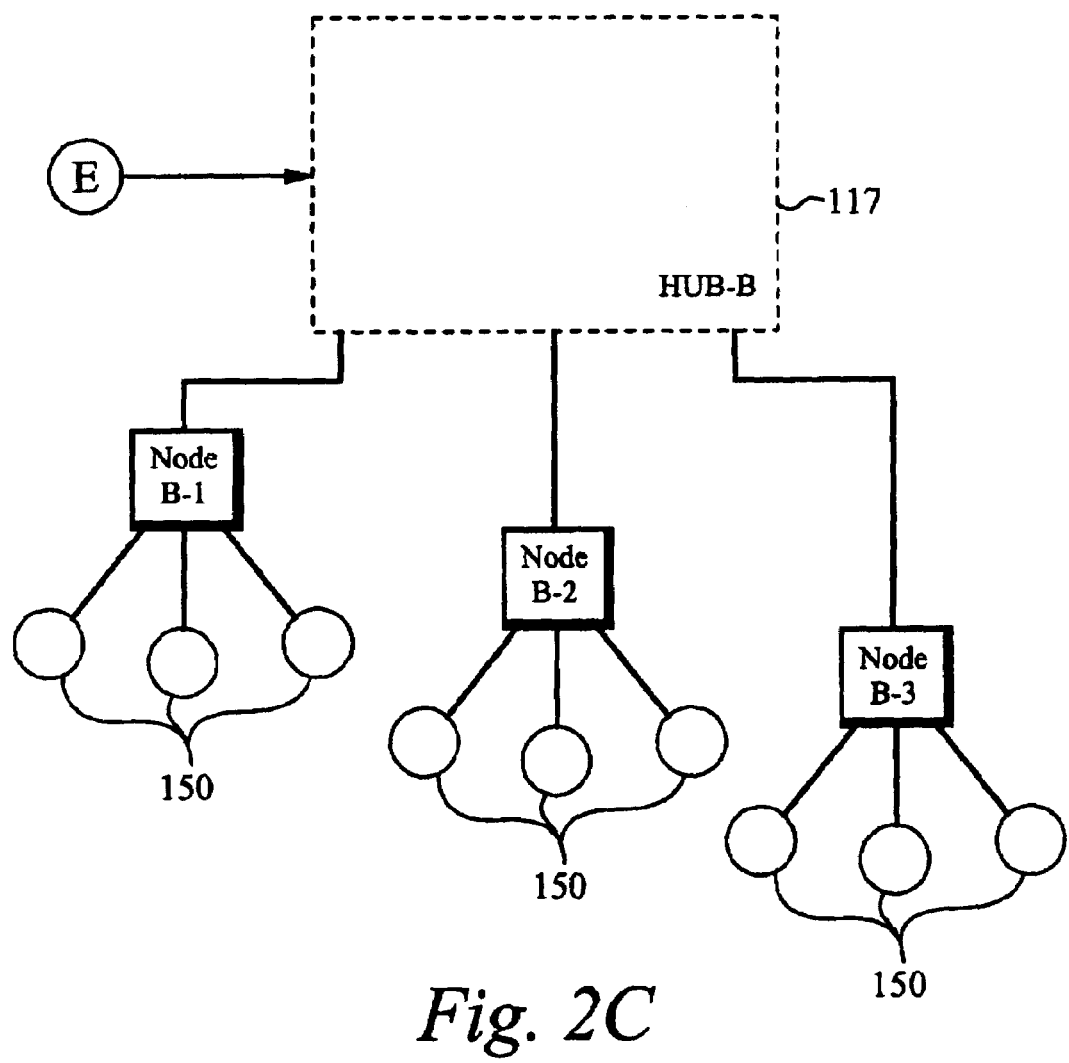

The details concerning the operation of the preferred embodiment of the present invention are depicted in the graphical representations in FIGS. 2a-2c. Referring now to FIG. 2a and FIG. 2b, a customer 101 makes an inquiry or comment to the contact center 100 by sending a realtime or non-realtime communication in to the contact center 100. The customer utilizes a phone 103 to call into the contact center 100, the phone 103 being connected to the contact center 100 by the public switched telephone network (PSTN) 106. Other communications, including realtime communications such as chat and web collaboration requests and non-realtime communications such as email are made by the customer 101 with a computer 102 through an internet connection.

Still referring to FIGS. 2a and 2b, a customer 101 initiating a realtime communication in the form of a phone call from a phone 103b, does so through the PSTN 106, and the call enters through an ISDN 105 circuit. The ISDN circuit can also be replaced by other circuits known in the art to carry voice traffic such as a T1 circuit. The incoming call terminates at the VoIP gateway 110 where the call is converted to internet protocol (IP). The call is divided into a session initiation protocol (SIP) portion and a real time protocol (RTP) portion. The SIP portion of the call contains control signaling to facilitate the routing of the call while the RTP portion of the call contains the actual voice data. The SIP portion enters the hub 115 through the proxy 132 in the voice server 130. The voice server 130 plays announcements to the customer 101 if the customer must be put on hold, and is also responsible for conferencing the customer 101 with other parties.

The SIP portion of the incoming call enters the proxy 132, immediately alerting the proxy 132 of the call. The proxy 132, in turn, notifies the voice router 144 that a call has entered the contact center 100 and needs to be handled by an agent 150. The voice router 144 acts as an interpreter, tying the proxy 132 to the immediate workflow engine 154 in the application server 113. The node router 146, which is also duplicated in each of the nodes (NODE HOU, NODE CHI & NODE STL), is alerted as to which nodes and agents 150 are online and available. From the viewpoint of any node, when an agent 150 logs in, the desktop router 176 in that node recalls that particular agent's 150 data and sends the agent 150 data to the node router 146 in the hub 115. The node router 146 in the hub 115 stores this information, keeping track of all agents 150 currently logged in and what type of calls each agent 150 is qualified to answer.

Referring back to the incoming call, when the voice router 144 signals the immediate workflow engine 154 that a call has arrived the immediate workflow engine 154 starts the predetermined, programmable workflow. This workflow will eventually request a node to which the call will be sent. The immediate workflow engine 154 will then record this event in the database 156. The software ACD 152 then looks to the node router 146 using dynamic information collected from the nodes including to inquire as to what nodes and agents 150 are logged in. The software ACD 152 matches the requirements of the call with the agent 150 data in the node router 146 and then determines which agent 150 is available and best qualified to answer the call. Once this is established, the immediate workflow engine 154 signals the voice router 144, which in turn instructs the proxy 132 to disconnect from the media server/conference bridge 134 in the hub 115, and to send both the SIP and the RTP portion of the call to be reconnected to a proxy 162 and media server/conference bridge 164 respectively, of the appropriate node. In the case where no agent 150 is available after some configuration time, the software ACD 152 chooses another node based on predetermined routing criteria.

Still referring to FIG. 2b, the SIP portion of the call is transferred to the appropriate node, the SIP portion carrying all of the routing information that has occurred in the hub 115 to date, as this routing information was being continually stored in the VoIP gateway 110 as the above operation was executed. As in the hub 115, the SIP portion of the call is sent to the proxy 162 and the RTP portion of the call is sent to the media server/conference bridge 164. The proxy 162 signals the voice router 166 that a call has arrived, and the voice router 166 notifies the immediate workflow engine 174, thereby starting a workflow. The software ACD 170 matches the call with an appropriate agent 150 by accessing data stored in the in memory database 180 in the hub 115 and replicated in other in memory databases 180 in the nodes, which hold all of the skill information for the agents 150 currently logged into the contact center 100. That agent 150 is then connected to the media server/conference bridge 164 and a screen pop with all of the customer's 101 information is displayed on the agent 150 desktop.

Referring to FIGS. 2a and 2b, the contact center 100 also allows a customer to call in through a local gateway 110. In other words, a customer 101 calling from Houston may have a local number to receive service from the local NODE HOU. Such a call will terminate at the VoIP gateway 110, where again the SIP portion of the call will be sent to proxy 162 and the RTP portion of the call will be sent to the media server/conference bridge 164. The SIP portion of this call will not contain a full set of routing information as this call was initiated in the local VoIP gateway 110, and therefore bypassed any hub 115. Therefore, the call will be routed as a new call. Again, the routing process of such a call is the same as that described above. It is important to note here that because each node includes a node router 146, the NODE HOU may route a call entering NODE HOU from the local VoIP gateway 110 to another node if appropriate, or simply to an agent 150 in the NODE HOU if qualified agents 150 are available.

It should be noted that prior art architectures did not utilize a separate immediate workflow engine 154 and software ACD 152, rather the workflow engine of previous architectures did multiple jobs in addition to executing the workflow. The advantages of separating these two components are tremendous as in the preferred embodiment of the present invention, the immediate workflow engine 154 only executes the workflow, greatly conserving the resources of the immediate workflow engine 154.

Still referring to FIG. 2a and FIG. 2b, as stated previously, every node (NODE HOU, NODE CHI, NODE STL) has a node router 146 that operates like the node router 146 in the hub 115. It is therefore possible for any given node to operate like the hub 115 when and if portions of the hub 115 fail. For example, if the voice server 130 or the voice router 144 of the hub 115 fail, the VoIP gateway 110 may send the call to the voice server 160 in NODE HOU. The NODE HOU, in addition to a node router (not shown), also includes a voice server 160 with a proxy 162 and a media server conference bridge 134, a voice router 166 and an application server 10 with a software ACD 172 device, immediate workflow engine 174 and a user desktop router 176. The operation of routing a call entering the NODE HOU is the same as the call routing described above when the call enters the hub 115. In cases where calls are routed to an agent 150 that is not qualified to take the call, any node is capable of routing a call to another node, or routing a call to agents 150 logged into that node.

Referring back to FIG. 2a, the preferred embodiment of the present invention also includes a CRM Database 158. It is often the object of contact centers to achieve complete computer telephone integration (CTI). Problems arise as most contact center customers utilize various CRM applications in implementing their contact center. Generally, a different CRM application is utilized for each media type. Collection and storage of CRM data for each CRM application is oftentimes problematic, complicated and expensive. The architecture of the preferred embodiment of the present invention allows for all CRM data to be stored and accessible from the CRM database 158. Because all of the communications in the preferred embodiment of the present invention are normalized, or routed in the same manner, customer information extracted from communications in all of the media types arrive in the immediate workflow 154. The immediate workflow 154 then becomes the single interface to the CRM database 158 to store and extract CRM data to and from the CRM database 158, thereby providing a simple, fast and inexpensive process for storing and extracting CRM data. The importance of this concept will be obvious after the remaining media type routing systems are discussed below.

Web Collaboration and Chat

Referring to FIG. 2a and FIG. 2c, the preferred embodiment of the present invention also routes web collaboration and chat requests from the customer 101. The customer utilizes a computer 102 having a graphical user interface (GUI) connected to the internet 104 preferably, or alternatively any web network of accessible from a computer 102, such that the customer has access to the corporate website or help website of the entity associated with that contact center. The customer 101, through the internet 104, accesses the corporate website, where a "help," "support" or other similar icon will allow the customer 101 to request agent 150 assistance. Preferably, the customer is prompted for login information, as most contact center 100 administrators only desire identified customers 101 access to the contact center 100. This firewall is known as the corporate DMZ 111. Once the customer 101 is given access, the web collaboration server 112 pushes and displays on the GUI a web form to collect all of the appropriate customer 101 information. Once the customer 101 completes the web form, the web form is routed from the corporate web server, past the corporate DMZ 111 to the web collaboration router 142 in HUB-A 115. It should be noted that in the preferred embodiment, the web collaboration server 112 is located in the corporate DMZ 11. However, further embodiments may include the web collaboration server 112 located in HUB-A 115.

Still referring to FIG. 2a and FIG. 2b, the web collaboration router 142 notifies the immediate workflow engine 154 that the customer 101 is seeking a web collaboration and/or a chat session. The customer's 101 information collected in the web form will then be entered into the immediate workflow engine 154. When the immediate workflow engine 154 receives the customer 101 information, the immediate workflow engine 154 will eventually request a node to which the customer 101 will be sent. The immediate workflow engine 154 will then record this event in the database 156 before the software ACD 152 begins to match the customer 101 with an agent 150 having certain capabilities. The software are ACD 152 matches the requirements of the call with the dynamic agent 150 and node data collected by the node router 146 and then determines, base on the information the node router 146 has for every active agent 150, which agent 150 is available and best qualified to answer the web collaboration request or chat request. Once this is established, the immediate workflow engine 154 signals the web collaboration router 142 to send the web collaboration request or chat request to the application server 170 of the appropriate node.

Still referring to FIG. 2a and FIG. 2b, the application server 170 of the appropriate node then performs a screen pop on the GUI of the agent 150 assigned to answer the web collaboration session or chat session. The screen pop preferably includes a chat page and CRM application screens. Unlike the call routing system described above, a customer 101 making a web collaboration request is not "on hold" in the same sense as a customer 101 is when they are waiting for their communication to be routed. Therefore, while a web collaboration request is being routed to the appropriate agent 150, the web collaboration server sends the customers URLs rather than music until the customer 101 is connected to the appropriate agent 150. It should also be noted here that each hub and each node in the contact center 100 includes an in memory database 180 that replicates necessary data stored in the database 156. This is done to insure that all up do date customer 101 information is replicated in every location in the contact center 100.

Email Communications

The preferred embodiment of the present invention also includes the ability to route non-realtime communications such as email or voice messages and callbacks to an appropriate agent. In contrast to media channels such as phone calls where the number of calls is limited to an exact number of phone lines, the number of non-realtime communications, especially in the case of emails, is virtually unlimited. This dynamic requires a slightly more controlled routing system for this media type. The advantages, however, of servicing this media are many, including servicing a large volume of customers at a lower cost and embodying a non-immediate customer expectation.

Referring again to FIG. 2a, the preferred embodiment of the present invention includes the customer 101 sending an email with a computer 102 connected to the internet 104, or calling into the contact center 100 using a telephone 103 through the PSTN 106. In both cases, and in any other non-realtime media types that may not be mentioned in this description, the non-realtime communication enters the deferred workflow engine 122 in the email server 120. The path of a voice message call would first pass through the VoIP Gateway 110 before being routed to the deferred workflow engine 122. The non-realtime communications that enter the deferred workflow engine 122 are assumed to be deferred communications, meaning they don't require immediate response. A set of rules is run on each non-realtime communication in order to immediately escalate those communications that meet predetermined criteria. This escalation concept will be discussed in further detail later in this description. The communications that are not immediately escalated are then placed in a shared file folder in the deferred workflow engine 122.

Still referring to FIG. 2a, while in the shared file folders in the deferred workflow engine 122, the non-realtime communications are subject to a "pull" model of batch processing, where any agent 150 may pull a non-realtime communication from the shared file folder and answer the communication. However, this method is not always optimal as the agents 150 may elect to not select more difficult communications or some more important communications may go unanswered for an unacceptable amount of time. Therefore, the method also includes an escalation model where the rules that are run on each of the non-realtime communications identify those communications that ought to be escalated. There are many criteria for which such escalation is based. For example, designating a customer as a "platinum" customer, or simply a time threshold linked to the amount of time the communication is waiting in the deferred workflow engine. When a non-realtime communication is designated to be escalated, the communication is redirected to the email router 140, and is then routed through the immediate workflow engine 154 as is described above for voice calls as well as web collaboration or chat sessions. A more detailed description of the escalation model is provided later in this description.

The preferred embodiment of the present invention associates contact requirements with agent 150 skills. It uses workflow engines 122, 154 to collect customer information and calculate desired attributes for each customer contact and stores them in a database 156.

A separate software ACD 152 process takes weight values configured outside the workflow 122, 154 and applies them to each contact's associated attribute value to determine a contact priority value for each contact. This calculation is done when an agent 150 resource becomes available. In this way all contacts with similar requirements ca be prioritized against each other based on how the business chooses. Additionally, because the weightings can be changed outside the workflow 122, 154, the order or weighting contacts ca be changed dynamically implementing a "dynamic queue." Preferably, the weightings may be changed using a "pie slider" graphical user interface that is described in greater detail later in this document. Alternative embodiments of the present invention changing the weightings using other graphical user interfaces such as sliders, buttons, etc.

Three Tier Escalation Model

In the following detailed description of alternative embodiments of the invention, reference is made to the accompanying drawings in which like references indicate similar elements, and in which is shown by way of illustrations specific embodiments in which the invention may be practiced. These embodiments are described in sufficient detail to enable those skilled in the art to practice the invention, and it is to be understood that other embodiments may be utilized and the logical, mechanical, electrical, functional and other changes may be made without departing from the scope of the present invention. The following detailed description is, therefore, not to be taken in a limiting sense, and the scope of the present invention is defined only by the appended claims.

The detailed description of the alternative embodiment is divided into four sections and conclusion. In the first section, a system level overview of the invention is presented. In the second section, methods for an embodiment of the invention are described with reference to flowcharts. In the third section, a particular Internet Contact Center (ICC) implementing of the invention is described. In the final section, an operating environment in conjunction with which alternative embodiments of the invention may be practiced is presented.

System Level Overview

A system level overview of the operation of an alternative embodiment of the invention is described by reference to FIGS. 3 and 4.

Figure 3:
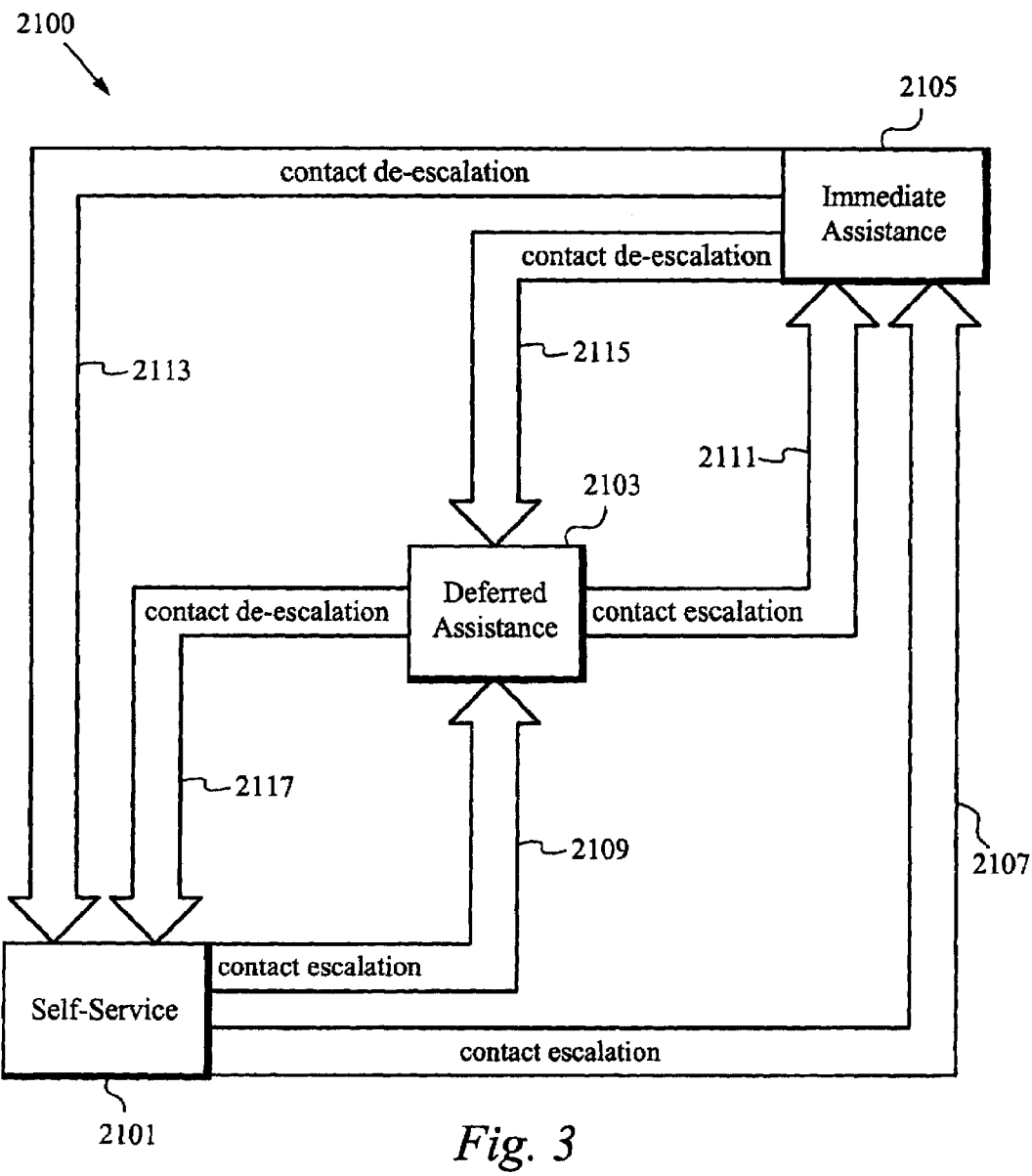
FIG. 3 is a diagram illustrating a three-tiered service model for a digital multimedia contact center of an alternative embodiment of the present invention.

FIG. 3 illustrates a tree-tiered service model 2100 for a digital multimedia contact center. As shown, there are three service tiers: self-service tier 2101, deferred service tier 2103, as an immediate assistance tier 2105. Contacts accessing the center at the self-service trier 2101 do not require the assistance of an agent at the contact center, while contacts being serviced at the deferred tier 2103 and the intermediate assistance tier 2105 do require agent activity. A contact accessing the center at deferred tier 2103 is presented to an agent who pulls a deferred contact for processing when there are no immediate assistance contacts to process. A contact at the immediate assistance tier 2105 is presented in a "push" model as a foreground task. One immediate assistance contact is pushed to the agent's desk at any one time and in such a way that it is obvious to the agent that this contact must be handled immediately. As a particular contact is presented, any related customer information is also shown. The components for the different tiers are designed to handle different magnitude of contacts. The self-service tier components will process orders-of-magnitude more contacts than the deferred tier components, which will process orders of magnitude more contacts than the immediate assistance tier components.

A contact entering the contact center is initially assigned to one of the three tiers based on the type of media used by the contact in accessing the contact center. The embodiment shown in FIG. 3 is further described with reference to three media types: voice calls, emails and World Wide Web, although the invention is not so limited. Voice calls are initially routed to the immediate assistance tier 2105, emails are initially routed to the deferred tier 2103, and Web contacts are initially routed to the self-service tier 2101.

The subsequent routing may be performed that escalates or de-escalates the contact to another tier (shown as arrows in FIG. 3), the subsequent routing can be based on one or more routing criteria, including factors defined by the contact center owner or subscriber, such as priority, access phone numbers, and time-out periods, and environmental factors such as contact activity. The routing criteria associated with a contact may change as the various components in the contact center process the contact. For example, if the routing criteria of a contact passes a pre-defined threshold, the contact may be escalated or de-escalated. Thus, an email is escalated (arrow 2111) to the immediate assistance for 2103 if it has not been answered when a "time-to-reply" period elapses. A voice call is initially routed to the immediate assistance tier 2103 but is de-escalated (arrow 2115) to the deferred tier 2103 if the caller chooses to leave a voice-mail, or de-escalate (arrow 2113) to the self service tier 2103 if the contact is sent to an interactive voice response (IVR) system for more processing. A self service WEB contact can be escalated (arrow 2107) into the immediate assistance tier 2103 by through "Click and Talk" buttons available on the WEB site, or escalated (arrow 2109)

to the deferred tier 2103 if the contact chooses to send an email instead. Details of the escalation and de-escalation of each media type is described in more detail in conjunction with the flowcharts in the next section. Furthermore, although the exemplary embodiments focus on voice, email, and WEB contacts for ease in understanding, it will be appreciated that the invention encompasses all potential analog and digital media types, including fax, "faxback", video, etc. In the addition to being extensible to other WANs and to LANs. It will also be appreciated that the contact is not limited by its initial media type so, for example, the contact and agent in a collaboration session could be also talking by phone, an email message could generate a return fax or phone call, or the expiration of a time-out on a collaboration request generate an email message to the contact promising a response within a set time period.

Figure 4:
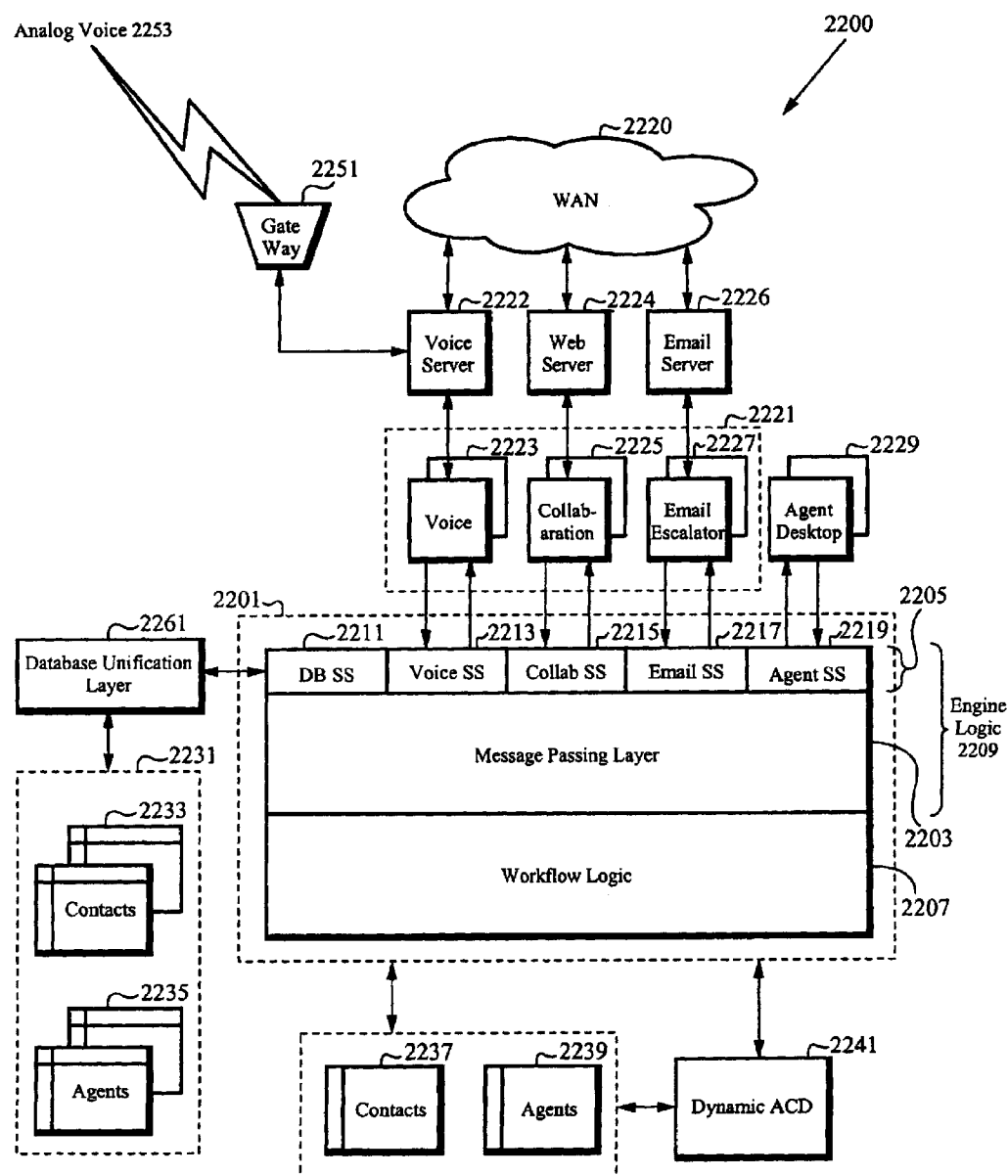
FIG. 4 is a diagram illustrating an embodiment of a system architecture underlying the digital multimedia contact center model shown in FIG. 3.

The alternative embodiment three-tier service model 2100 illustrated in FIG. 3 operates within a digital multimedia contact system, one embodiment of which is shown in FIG. 4. The system architecture for contact center 2200 is based on a workflow engine 2201 that directs the activities of the agents in the center using workflow steps. A contact workflow is initiated by events that are routed into one of a set of workflow subsystems 2205 dedicated to a contact media type. An agent workflow is initiated by events routed into an agent subsystem 2219 by an agent desktop component 2229. Events that trigger a workflow include a new call arriving at the contact center or an agent logging in. The workflow for a contact remains active until the contact is terminated; the workflow for an agent remains active until the agent logs out of the contact center 2200.

The workflows are executed by workflow logic 2207. Events are passed between the workflow logic 2207 and the workflow subsystems 2205 by a message passing layer 2203. The events can also modify the execution flow of active and running contact or agent workflows.

When executed by the workflow logic 2207, a workflow for an immediate assistance contact causes a dynamic ACD (automatic contact distributor) 2241 to allocate an agent to the contact. The allocation is also reflected in the agents workflow. The operation of the dynamic ACD 2241 is described in further detail below.

A contact coming into the contact center 2200 of this alternative embodiment is initially classified in accordance with a set of previously defined classifications, e.g., Sales, Customer Service, Support, etc., by the appropriate workflow subsystem 2205. Additional information is also gathered to determine the optimal routing of the contact. Information that narrows down the set of agents to which a contact can be routed is referred to as "contact requirements". Examples of contact requirements include product knowledge, language fluency, and previous communication with the contact. Furthermore, each contact that enters the contact center 100 is considered a new contact. Origin and destination information now is consistently collected from all media types, such as calling phone number and called phone number for voice calls. Subject information may also be collected from voice contacts based on responses to IVR menu options.

A voice router 2223 provides an interface between a voice subsystem 2213 and a conventional digital telephony system (voice server 2222), that handles IP (Internet Protocol) calls. The voice subsystem 2213 starts a workflow when a call arrives at the contact center 2200 and communicates a request to the voice server 2222 to redirect the call to an agent (or to voice mail or IVR) as determined by the workflow. The voice server 2222 receives digital voice calls (referred to as voice-over IP or IVR) directly from a digital wide-area network (WAN) 2220, such as the Internet, or via a gateway 2251, that converts analog voice calls 2253 to VoIP calls. The gateway 2251 also converts VoIP calls from the digital telephony system 2222 into analog voice originals for transmission back to the caller.

A conventional email system (email server 2226), processes deferred contacts received from the WAN 2220. The email system uses its own workflow engine for processing incoming email and placing it into mailboxes to be accessed by the agents as backgrounds tasks. The agents retrieve deferred contacts from these mailboxes explicitly. An email escalator 2227 provides an interface between an email system 2217 and the conventional email system for emails that are escalated from deferred to immediate assistance. The email escalator 2227 periodically reviews the mailboxes for pending emails that meet pre-determined criteria for escalation, such as time-to-reply or customer value parameters. It then collects information about the email (customer, priority etc.) And passes this to the email subsystem 2217. In one embodiment, the emails are evaluated in chronological order and the emails that meet the escalation criteria are further broken down by classification and within a particular classification, the email is passed to the email subsystem 2217 on a first-in first-out basis.

The email subsystem 2217 determines if the contact is entitled to be escalated to an immediate assistance contact based on the contact information and starts a contact workflow if it is. When the workflow succeeds in routing the email to an agent, the agent address is returned to the email escalator 2227, which passes it to the email subsystem 2217 for actual routing to the agent. In an embodiment in which voice message is routed to an agent as an audio attachment to an email, the email escalator 2227 also serves to escalate voice messages to the immediate assistance tier if appropriate.

A conventional Web server 2224 processes self-service contacts that originates from the WAN 2220. Such a server can offer browsing and searching capabilities for a knowledge base, or a set of FAQs (frequently asked questions). A collaboration router 2225 provides an interface between a collaboration subsystem 2215 and a conventional collaboration system, that executes on, or in conjunction with, the Web server 2224. Web pages on the Web server 2224 are modified to include "Click to Chat/Talk" buttons to connect to the collaboration system. When the button is clicked by a Web contact, the collaboration systems sends an event to the collaboration router 2225, which in turns sends an event to the collaboration subsystem 2215. The collaboration subsystem 2215 determines if the contact is entitled to be escalated to an immediate assistance contact and initiates a contact workflow if so. Once the collaboration request has been assigned to an agent, the agent address is passed back to the collaboration router 2225 for actual routing. Other agents may be included in the collaboration session if necessary.

An agent subsystem 2219 provides an interface between one or more agent desktops 2229 and the workflow logic 2207 for agent events. When notified of an agent login by the corresponding agent desktop 2229, the agent subsystem 2219 validates the agent before starting an agent workflow that describe the agent's work process until the agent logs out. The agent desktop 2229 notifies the agent subsystem 2219 of all agent state changes. The agent subsystem 2219 is also responsible for watching the agent's phones for outbound call events. It passes this information to the workflow logic 2207 to ensure the agent state is changed to "busy".

The agent desktop 2229 controls the presentation of tasks on an agent's desktop. The tasks originate from the multiple conventional systems with which the contact center 2200 interfaces as previously described. The tasks also originate from the workflow engine 2201. Each of the conventional systems has its own user interface. Monitoring tools may also be available to certain agents, such as those providing statistics on the operation of the contact center and individual agents. The agent desktop 2229 integrates the separate user interfaces into a single coherent interface that presents the agent with immediate assistance contacts as foreground tasks and deferred contacts as background tasks. Thus, for example, the foreground mode integrates the telephony interface, the collaboration interface. And the email interface (for escalated emails). Similarly, the background mode integrates the email interface (for non-escalated emails and other deferred contacts, such as Voice mail, fax, forms, etc.) And the monitoring tools, for example. The agent desktop 2229 also integrates with any existing customer relationship management applications to provide customer information to the agent for the foreground and background tasks. The connection between the agent desktops 2229 and the conventional systems 2222, 2224, 2226 are not shown in FIG. 4 for clarity in illustration.

In the alternate embodiment shown, the agent desktops 2229 do not communicate directly to the agent subsystem 2219 but are managed through a desktop manager component that handles concurrent requests from desktops and routes responses. To concurrently handle multiple desktops, the desktop manager component communicates with a server portion that queues events arriving from the agent subsystem 2219 and sends them to the appropriate desktop in response to polls from the desktops. Executing the server portion of the desktop manager on a machine separate from that executing the agent subsystem provided additional scaling capabilities to the contact center.

The relationship among the components of the contact center 2200 described so far is most easily understood through an example. When an analog voice call 2253 is received by the gateway 2251, it is converted to a VoIP call and directed by the voice server 2222 to a voice media router 2223. The voice media router 2223 informs the voice subsystem 2213 of the incoming contact and the voice subsystem 2213 creates a workflow for the contact. Assuming the contact is to remain at the immediate assistance tier 2103, the workflow requests the dynamic ACD 2241 allocate an agent to the contact. The dynamic ACD 2241 passes the agent information back to the voice router subsystem 2213, which then sends the agent and contact information to the voice router 2243. The voice router 2223, in turn, sends the information to the voice server 2222 for routing. The voice server 2222 transfers the contact to the appropriate agent desktop 2229 as a foreground task.

Returning now to FIG. 4, the workflow engine 2201 also contains a database 2231 of contact 2233 and agent records 2235. A database unification layer 2261 confines the information in the database 2231 and information maintained by the voice 2222, Web 2224, and email 2226 servers into a coherent view of the contact center. The contact and agent workflows query and update the database 2231 through a database subsystem 2211 that converts workflow requests into calls for the database unification layer 2261. In an alternate embodiment not shown in FIG. 4, the contact and agent workflows query the database unification layer 2261 directly. In yet another alternate embodiment, the database unification layer is incorporated into the database subsystem 2211.

The database unification layer 2261 has access to, and is accessible by, all the other components of the contact center to allow reporting and analysis of the activities of the contact center regardless of the media type used by the contacts. The connections between the database unification layer 2261 and the other components are not shown in FIG. 4 for clarity in illustration. The information can be retrieved through the database unification layer 2261 by a monitoring tool (*not shown) to graphically and/or numerically illustrate the state of the contact center (number of contacts awaiting service, how many agents are on break, etc.). For instance, the monitoring tool may display the number of un-serviced contacts broken down by classification. Additionally, a conventional reporting application can be employed to obtain information through the database unification layer 2261 for standardized reports. Agents, supervisors and managers may each have access to a set of such reports to gauge the efficiency of the contact center, a group, or individual agent.

The database unification layer 2261 also provides for the collection of billing information and for the tracking of contacts through the contact center, across all media types.

In the alternative embodiment shown in FIG. 4 the dynamic ACD 2241 uses unordered lists of waiting contacts 2237 and available agents 2239 to match a contact with an agent. The workflow engine 2201 causes the dynamic ACD 2241 to create and manage the unordered lists of contacts 2237 and and agents 2239. Although shown as separate from the database 2231 in FIG. 4 it will be appreciated that the unordered lists 2237, 2239 may be database structures that are managed by the database subsystem 2211 as instructed by the workflow engine 2201 and the dynamic ACD 2241.

As previously described, contact requirements (e.g., product knowledge, language fluency, previous communication) are used to determine the set of agents to which a contact can be routed. Information used to decided the appropriateness of an agent within the set, is referred to as "agent attributes" and may include such parameters as seniority and length of time waiting for a contact. Furthermore, agents may be dedicated to one or more contact classifications. When an immediate assistance contact requests an agent, the dynamic ACD 2241 searches for an appropriate agent from list 2239 of available agents by filtering the agents against the contact classification and any requirements, and prioritizes the resulting agents according to their attributes. If an agent is available, the dynamic ACD 2241 passes the information for the agent back to the appropriate subsystem to route the contact to the agent and removes the agent from the available agent list 2239. If no appropriate agent is available, the contact is entered into the waiting contact list 2237 until an appropriate agent becomes available to take the contact. Similarly, when an agent requests a contact, the waiting contact list 2237 is filtered by classification and "agent requirements" (e.g., media type, territory) and prioritized according to contact attributes such as time in queue and business value. The matching process is invoked by a step in the contact workflow for an immediate assistance contact or in the agent workflow for an available agent as explained further below.

As illustrated in FIG. 4 there may be multiple instances of each of the media routers 2221. There is also an instance of the agent desktop 2229 running on each agent workstation in the contact center. Although only a single set of workflow subsystems 2205 is shown, it will be appreciated that workflow engine 2201 may obtain multiple instances of one or more of the workflow subsystem 2205 depending on workload. Additionally, multiple workflow engines 2201 may be present within a contact center 2200.

Furthermore, the architecture permits distribution of the various components among multiple computers, thus enabling scalability of the contact center 2200. As described previously, each component provides services for other components. For instance, the dynamic ACD 2241 provides an agent allocation service and the collaboration subsystem 2215 provides a collaboration workflow service. In one embodiment, a service manager (not shown) provides a central location for registration and discovery of the contact center service providers. When a component needs a service (such as the initialization of a workflow), it calls the service manager to find the location of that service. The service manager reviews a list of all registered providers of that service and selects the appropriate providers (e.g., shortest routing to requester). Finally it chooses the best provider based on the unused capacity of each service. Thus, the contact center 2200 may continue to start service on new or existing machine as necessary to deal with its workload.

The system level overview of the operation of the alternative embodiment of the invention has been described in this section of the detailed description. A tiered service model that allows the escalation and de-escalation of a contact has been described, along with its operation within a digital multimedia contact center. The digital multimedia contact center handles contacts in accordance with the contact's required level of service instead of relying solely on the media type to determine the necessary processing. Because different levels of service incur different quantities of contacts, different processing methodologies are appropriate within the contact center. Thus, workflows are used to handle immediate assistance contacts regardless of media type because the workflow engine excels at processing relatively small numbers of contacts in real-time. A workflow engine also gives the subscriber fine-grained control over the handling of the high priority contacts that require immediate assistance. On the other hand, deferred contacts number at least an order of magnitude greater than immediate assistant contacts and are handled most efficiently through an inline rule engine such as commonly implemented in an email (and/or voice message). Finally, because the greatest number of contacts are self-service contacts which require no agent interventions, processing techniques such as interactive voice response, automatic email response, and knowledge base/FAQ logic on Web servers are used.

While the alternative embodiment of the present invention is not limited to any particular number of service tiers, this embodiment has been described in terms of a three tier model. The invention has further been described using an example that mixes voice calls, emails, and Web contacts within the same contact center but the invention is not so limited. Additionally, the invention can be practiced with any underlying architecture that allows the escalation and de-escalation of contacts through a tiered service model.

Methods of Embodiment of the Invention

In the previous section, a system level overview of the operation of embodiments of the invention was described. In this section, the particular methods of one alternative embodiment of the multimedia copy contact center 2200 are described in terms of computer software with reference to a series of flowcharts and also a series of tier diagrams. The flowcharts and tier diagrams are grouped according to related components within the contact center. Thus, FIG. 5A and flowcharts FIGS. 6A-C illustrate the processing of the voice components. FIG. 5B and flowcharts 7A-C illustrate the processing of the email escalator components. FIG. 5C and flowcharts 8A-C illustrate the processing of the collaboration components. The processing of the agent components are illustrated only through flowcharts in FIGS. 9A-C.

The methods to be performed by a computer constitute computer programs made up of computer-executable instructions. Describing the methods by reference to a flowchart enables one skilled in the art to develop such programs including such instructions to carry out the methods suitably figured computers (the processor of the computer executing the instructions from computer-readable media) acting as one or more of the components of the contact center 2200 in FIG. 4. The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to apeak of software, in one form or another (e.g., programs, procedure, process, application, module, logic . . . ), as taking an action or causing a result. Such expressions are merely a shorthand way of saying that execution of the software by a computer causes the processor of the computer to perform an action to produce a result.

Figure 5A:
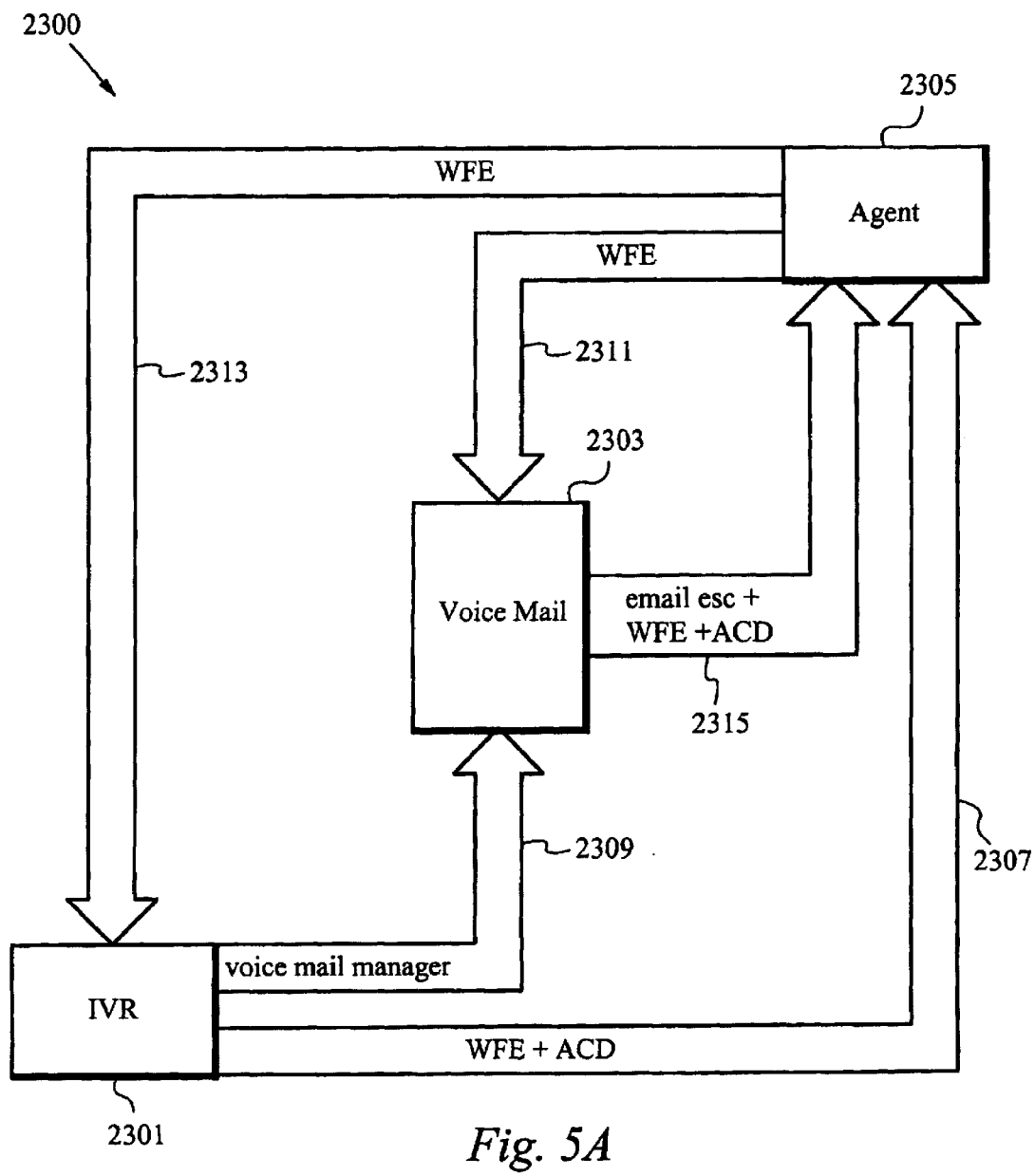
FIGS. 5a-5c are diagrams illustrating the processing of media-specific contacts within the architecture of the digital multimedia contact center shown in FIG. 4.
Figure 5B:
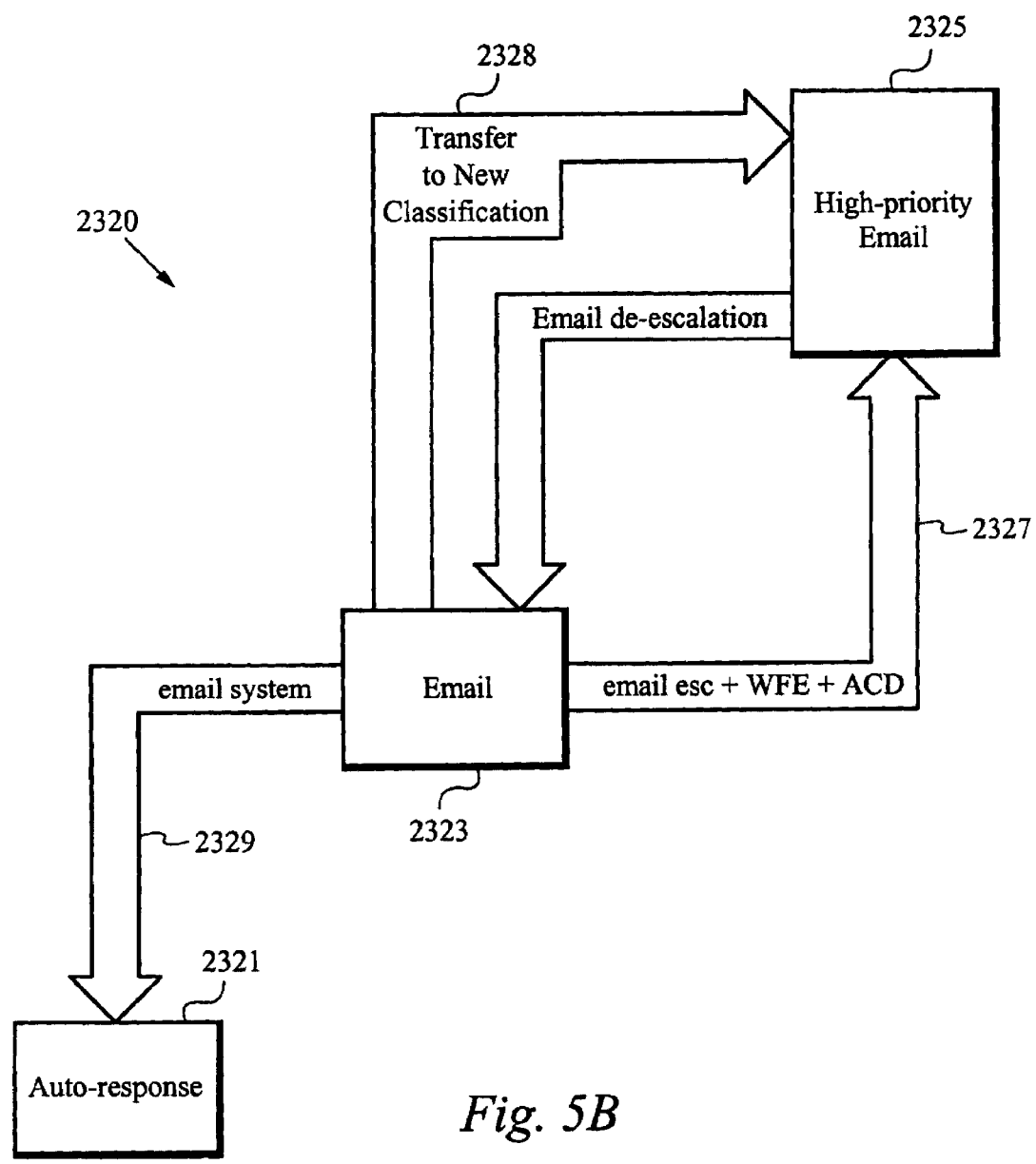
Figure 5C:
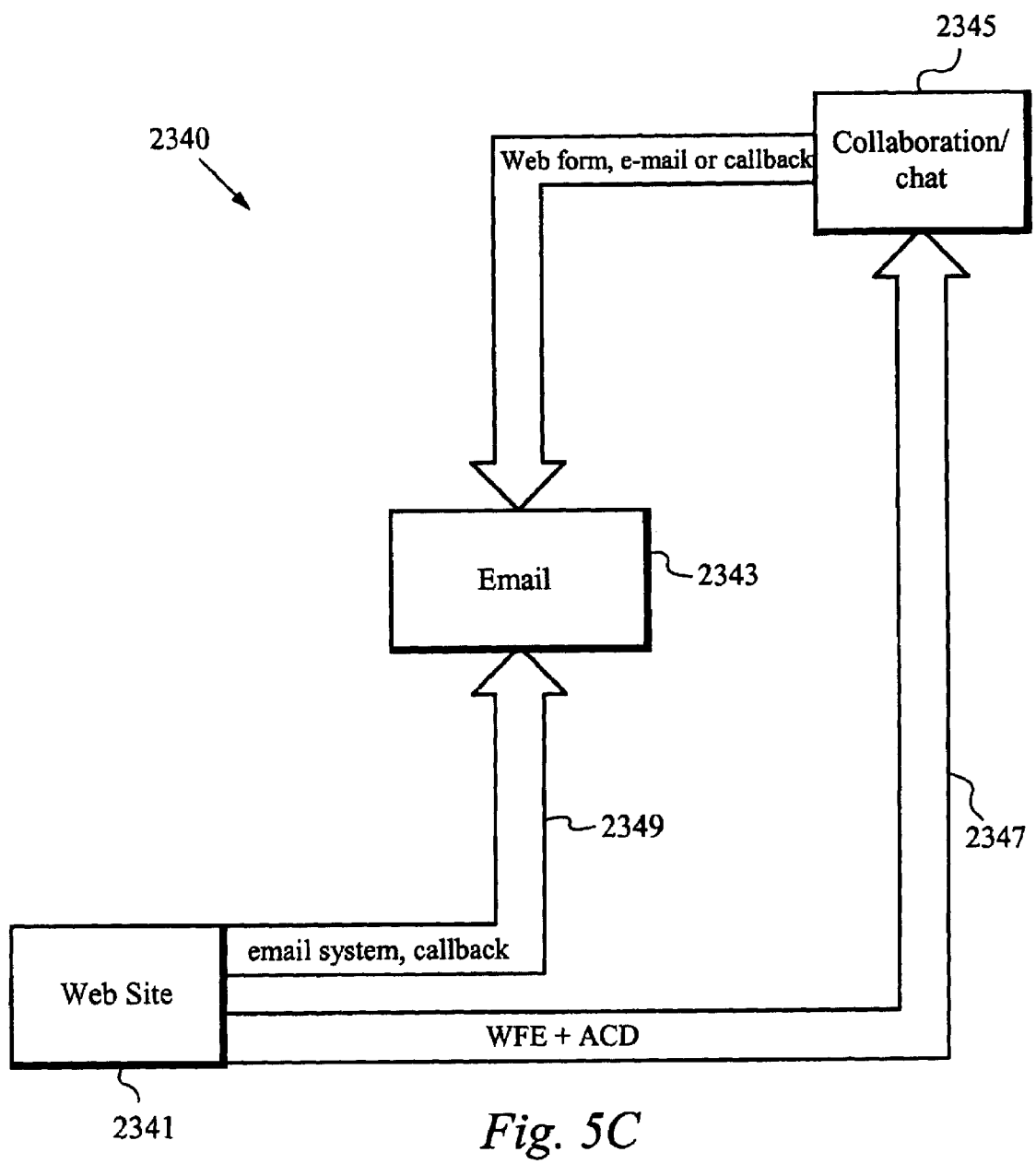
Figures 6A, 6B:
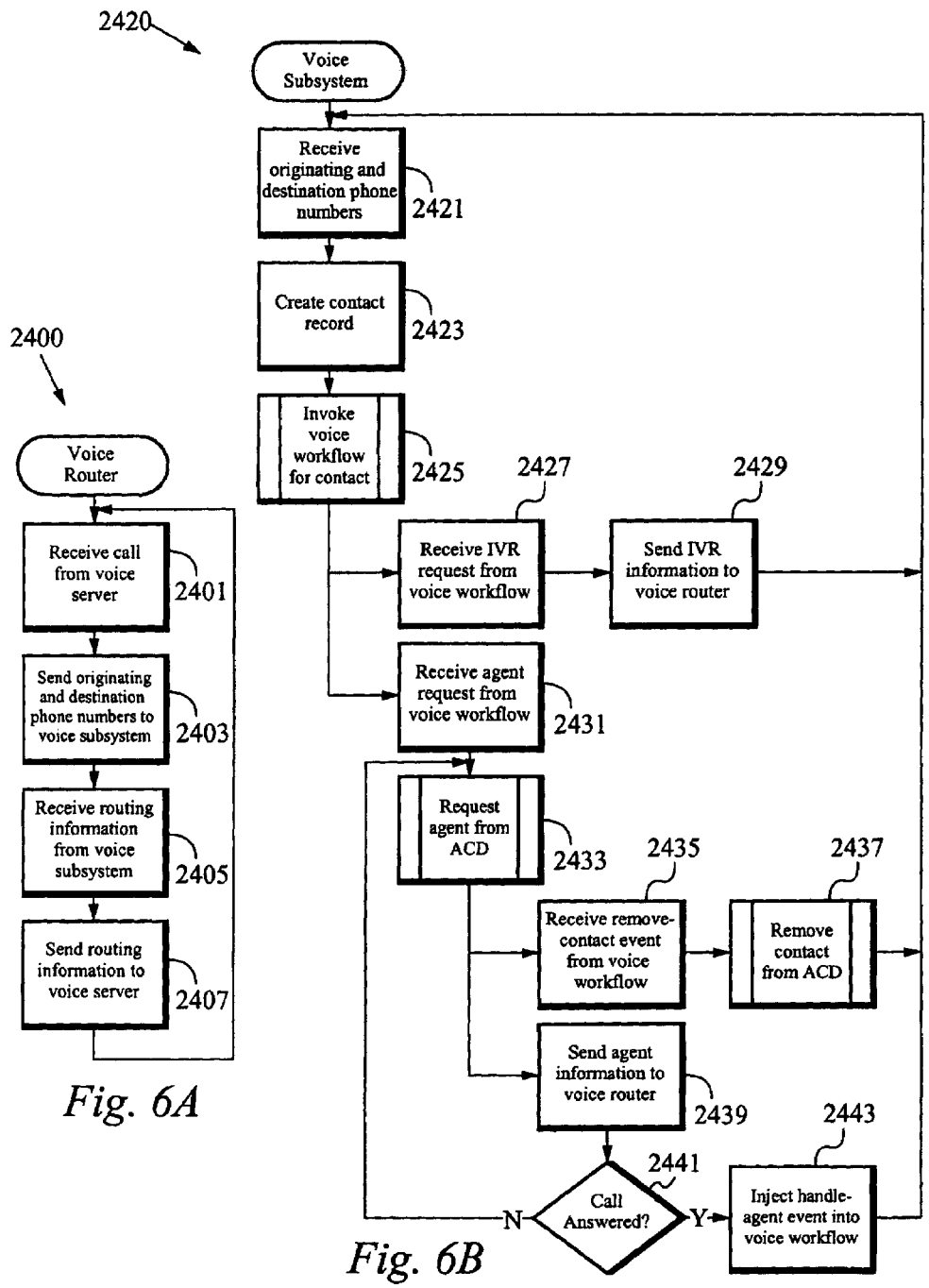
FIGS. 6a-6c are flowcharts of method s to be performed by voice components in the embodiment of the digital multimedia contact center shown in FIG. 4.
Figure 6C:
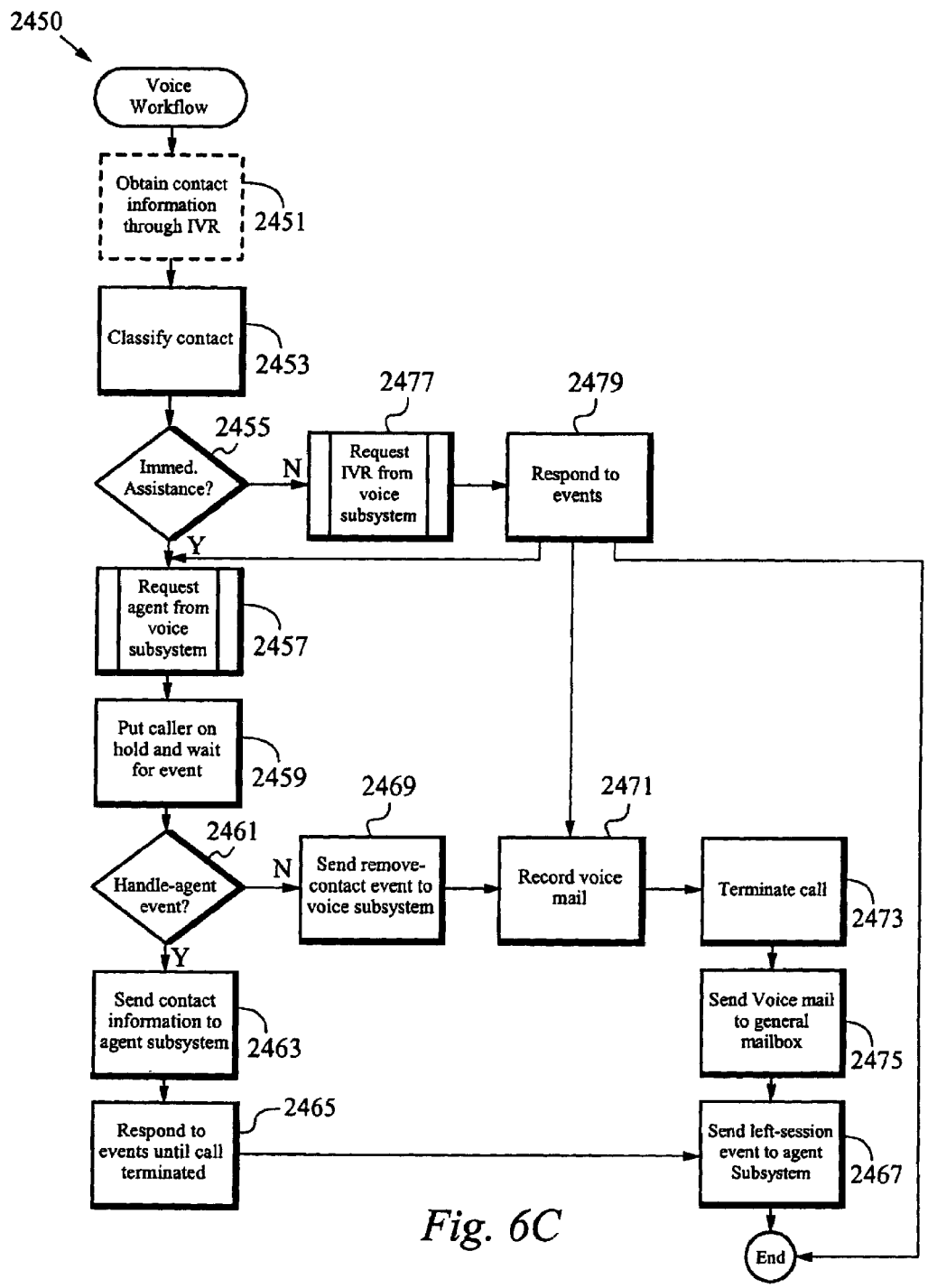

As shown in FIG. 5A, the voice components receive a voice phone call and direct it to either an agent for immediate assistance 2305 or to an interactive voice response system 2301 for self-service. If directed initially to an agent 2305, the workflow engine may de-escalate the contact (represented by arrow 2311) voice message 2303 if an agent is not available within a given period of time. In addition, the workflow engine may de-escalate an immediate assistance contact (represent by arrow 2311) to interactive voice response (IVR) 2301 if the call priority is less than a pre-determined amount or if the caller chooses self-service. A self-service contact may be escalated by a voice message manager (represented by arrow 2309) if the user chooses to leave voice message.

Alternatively, when a self-service contact requests active assistance from an agent, the workflow engine 2201 and the dynamic ACD 2241 escalate the contact into the immediate assistance 2305 as presented by arrow 2307. In an embodiment in which the voice message recording is attached to an email for subsequent processing by an agent, the email with the voice message attachment may be escalate through a combination of the email escalator, the workflow engine, and the dynamic ACD (represented by arrow 2315) as explained below in conjunction with FIGS. 5B and 7A-C.

Turning now to FIGS. 6A-C, the flowchart in FIG. 6A illustrates the acts performed by the voice router 2223 component when executing a voice router method 2400. The voice router method 2400 receives notification of a call from the voice server 2222 (block 2401). As part of the information received from the gateway, the voice router method 2400 receives the originating and destination phone numbers for the call, which it then sends to the voice subsystem 2213 (block 2403). The voice subsystem determines how to route the call, as will be described further below, and sends the routing information to the voice router. The voice router method 2400 receives the routing information (block 2405) and then sends the routing information to the voice server 2222 for routing (block 2407).

Turning now to FIG. 6B, a voice subsystem method 2420 executed by the voice subsystem component 2213 is described. The voice subsystem method 2420 receives the originating and destination phone numbers from the voice router (block 2421), collects additional contact information and creates a contact record for the contact (block 2423). The voice subsystem method 2420 then invokes an appropriate voice workflow for the contact from the workflow engine 2201 (block 2425). One of the steps within the voice workflow will be the determination of service tier, i.e., immediate assistance in a self-service. Assuming the contact is a self-service contact, the voice subsystem method 2420 receives an IVR request from the voice workflow at block 2427 and then sends the IVR information to the voice recorder at block 2429 so that the voice router will route the voice call to interactive voice response. On the other hand, if the workflow determines that the contact is an immediate assistance contact (block 2431), the voice subsystem method 2420 receives an agent request from the workflow and requests an agent from the dynamic ACD (block 2433) in response. The dynamic ACD attempts to match an agent with the contact as previously described. Assuming no agent is available within a pre-determined period of time, the workflow causes additional options to be presented to the contact. In one instance, the contact may choose to be routed to voice mail, at which point the workflow engine sends a remove-contact event to the subsystem method 2420, which is received at block 2435. In response, the voice subsystem method 2420 requests that the contact be removed from the list by the dynamic ACD (2437). If, however, an agent is available, the dynamic ACD sends the agent information to the voice subsystem method 2420, which in turn sends the agent information to the voice router (block 2439) so that the voice router may appropriately route the contact to the chosen agent. The voice subsystem method 2420 continues to monitor the contact to determine if the call is answered within a reasonable period of time (block 2441). If it is, then the voice subsystem method 2420 injects a handle-agent event into voice workflow at block 2443 so that the workflow will continue to handle the contact as explained further below. Alternatively, if the call is not answered, the voice subsystem method 2420 returns to block 2433 and requests another agent from the dynamic ACD. In one embodiment, the voice subsystem method 2420 generates events which create and update contact information regarding the voice call in the database 2231.

FIG. 6C illustrates an alternative embodiment of a voice workflow 2450 that is executed by the workflow logic 2207 for a voice contact. When the voice workflow 2450 is initiated, it obtains contact information through the IVR process at block 2451 (shown in phantom) if it is unable to determine the contact information at block 2453. A determination is made as to the level of service to be given to this contact (block 2455). If the contact is not entitled to immediate assistance, the voice workflow 2450 requests the contact be routed to the IVR system by the voice subsystem (block 2477). The voice workflow 2450 continues to monitor the contact because a contact at the IVR self-service tier 2301 may choose to leave a voice message or wait for an agent during the IVR sessions by inputting certain digits. The input digits are captured as events by the voice workflow 2450 at block 2479 and, depending on the event, the voice workflow 2450 escalates the contact to the deferred assistance tier 2303 by transferring the contact into the voice message system (block 2471) or to the immediate assistance tier 2305 by requesting an agent for the contact (block 2457). In one embodiment, the email system manager serves as the voice message manager and the processing represented by block 2471 is performed by a workflow. The workflow records the contact message, attaches the recording to an email message addressed to general mailbox, and sends the email to the email subsystem 2217 for transmission to the email server 2226.

If the contact is entitled to immediate assistance, an agent is requested from the voice subsystem at block 2457 and the caller is put on hold to wait for events from the voice subsystem (block 2459). If a handle-agent event is injected into the voices workflow 2450 by the subsystem because an agent allocated to this contact has answered the phone, the handle-agent event is detected at block 2471 and contact information is sent to the voice subsystem (block 2463). The voice workflow 2450 loops waiting for events and responding appropriately to those events, including updating the contact record, until the call is terminated as represented by block 2465. Once the call is terminated, the voice workflow 2450 sends a left-session event to the agent subsystem at block 2467 that causes the agent to become available to receive a new contact.

If the contact chooses to be sent to voice mail prior to being routed to an agent (block 2461), the voice workflow 2450 sends a remove-contact event to the voice subsystem at block 2469 to remove the contact from the list managed by the dynamic ACD. The voice workflow 2450 transfers the contact to the voice message manager to record the message (block 2471) and terminates the call after the message is recorded (block 2473). The voice message is then sent to a general mailbox to be acted upon by an agent at a later point (block 2475). In one embodiment, the voice message is attached to an email message and placed into the mailbox by the email system.

Referring now to FIG. 5B and FIGS. 7A-C, the email escalator component of the multimedia contact center 2200 is described. As shown in FIG. 5B, a deferred email 2323 is escalated into high priority email 2325 through a combination of the email escalator, the workflow engine, and the dynamic ACD (represented as arrow 2327). Alternatively, an email message may be handled through an automatic response option in the conventional email system and such an email is de-escalated by the email server 2226 (represented as arrow 2329) into an auto response contact 2321 or transferred to a new classification as represented by an arrow 2328. As automatic response options are common in conventional email systems, the de-escalation process is not further described.

Figure 7A:
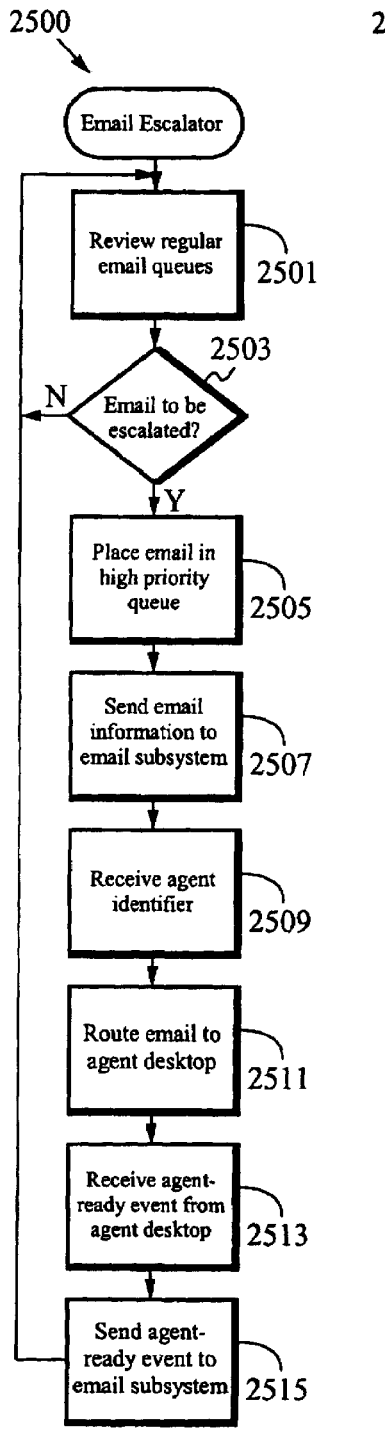
FIGS. 7a-7c are flowcharts of methods to be performed by by escalated email components in the embodiment of the digital multimedia contact center shown in FIG. 4.
Figure 7B:
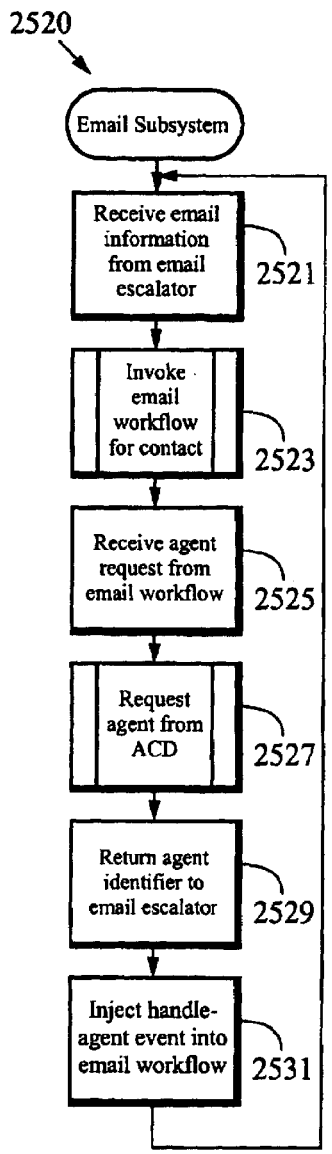

FIG. 7A illustrates an email escalator method 2500 performed by the email escalator 2227. The email escalator method 2500 constantly reviews the email system mailboxes or queues (block 2501) to determine if any pending emails should be escalated based on factors previously described. If an email is to be escalated (block 2503), it is placed in a high priority queue (block 2505) and the email information is sent to the email subsystem 2217 at block 2507. As will be explained in conjunction with FIG. 7B, the email subsystem 2217 matches the contact to the agent and returns the agent identifier, which is received by the email escalator method 2500 at block 2509. The email escalator method 2500 routes the email (via the email system) to the agent desktop (block 2511) as a foreground task. In one embodiment, the email is presented on the desktop already opened. Once the agent has determined that he or she is ready to handle the email, the email escalator method 2500 receives an agent-ready event from the agent desktop (block 2513) and sends that event to the email subsystem at block 2515. The agent workflow will not assign the agent to any other contacts until the email is handled. In another embodiment, the email escalator method 2500 instructs the email subsystem to identify an email that is close to being escalated and to give the agent visual clue, such as color or special icon, that the email must be handled immediately.

A component acting as the email subsystem 2217 executes a email subsystem method 2520 to perform the functions illustrated in FIG. 5D. The email subsystem method 520 receives the email information from the email escalator at block 2521 and invokes the workflow logic 2207 at block 2523. In one embodiment, when the email subsystem method 2520 receives the email information at block 2523, it creates the contact record for the email and marks it as escalated. In an alternative embodiment, the email manager creates a contact record for each email received at the contact center and the email subsystem method 2520 marks the existing contact record as escalated at block 2523. The email subsystem method 2520 requests the agent from the dynamic ACD at block 2527.

When an agent is allocated to the contact, the agent identifier is returned from the dynamic ACD to the email subsystem method 2520, which, in turn, at block 2529 returns the agent identifier to the email escalator to cause the contact to be routed to the identified agent. The email subsystem method 2520 injects a handle-agent event into the email workflow at block 2531 in response to receiving the agent-ready event from email escalator. In one embodiment, the email subsystem method 2520 generates events which create and update contact information regarding the escalated email in the database 2231.

Figure 7C:
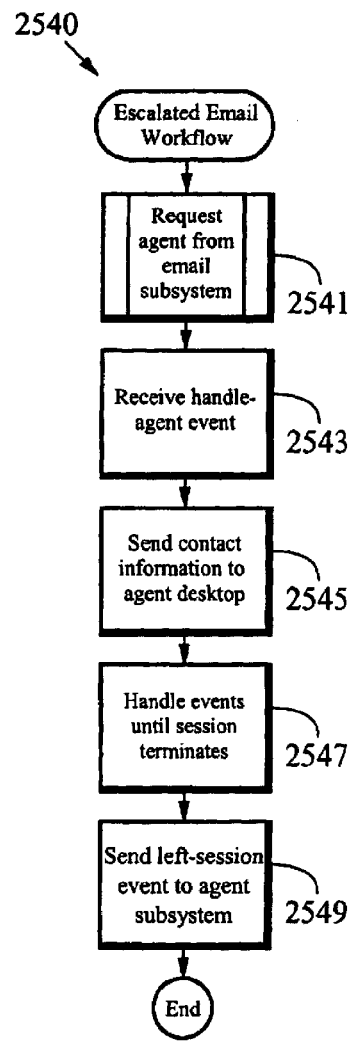

A method 2540 for a contact workflow for an escalated email is illustrated in FIG. 7C. When the escalated email workflow 2540 begins, it requests an agent from the email system at block 2541, which causes the events previously described to occur. When the escalated email workflow 2540 receives the handle-agent event at block 2543, the workflow sends the email to the agent desktop at block 2545 via the agent subsystem 2219. As the agent is working with the escalated email message, the agent may generate events that cause the escalated email workflow 2540 to perform certain functions, including updating the contact record, presented generally at block 2547. When the agent is finished with the escalated email, the escalated workflow 2540 sends a left-session event to the agent subsystem at block 2549.

FIG. 5C illustrates the escalation that is performed for a contact that initially appears at the contact center 2200 through a self-service Web site 2341. By choosing to send an email or callback, the contact can be escalated (represented by arrow 2349) through the email manager into a deferred email contact 2343. Alternatively, if the contact clicks on a collaboration/chat button, it is escalated by a combination of the workflow engine and the dynamic ACD (represented by arrow 2347) into an immediate assistance contact 2345. As the sending of emails is handled by the conventional email system, the escalation from a self-service contact 2341 into a deferred email contact 2343 is not further discussed.

Turning now to FIGS. 8A-C, the escalation of a contact from self-service Web contact 2341 to an immediate assistance collaboration contact 2345 is described beginning with collaboration router method 2600 performed by the collaboration router 2325. The collaboration router method 2600 receives the contact information from the Web server (block 2601) and sends the contact information to the collaboration subsystem 2215 (block 2603) to have an agent allocated to the contact. When the collaboration router method 2600 receives the agent identifier from the collaboration subsystem at block 2605, it then routes the collaboration session to the contact desktop for the identified agent (block 2607) via the collaboration server.

A collaboration subsystem method 2620 executed by the collaboration subsystem 2215 is next described in conjunction with FIG. 5B. The collaboration subsystem method 2620 receives the contact information from the collaboration router at block 2621 and invokes a collaboration workflow for the contact at block 2623. The collaboration subsystem method 2620 receives an agent from the dynamic ACD (block 2629) for routing the collaboration session to the appropriate agent's desktop. The collaboration subsystem method 2620 also injects a handle-agent event into the collaboration workflow at block 2623. Events resulting from the collaboration session are injected into the workflow by the collaboration subsystem method 2620 when the session terminates (block 2633). In one embodiment, the collaboration subsystem method 2620 generates events which create and update contact information regarding the collaboration session in the database 2231.

Turning now to FIG. 8C, a collaboration workflow method 2640 that is executed by the workflow logic 2208 as a collaboration workflow for a contact, is described. When the collaboration workflow method 2640 begins, it requests an agent from the collaboration subsystem at block 2641. The collaboration workflow method 2640 receives a handle-agent event from the collaboration subsystem at block 2643. The handle-agent event informs the workflow that the agent is now ready for the collaboration session and collaboration workflow method 2640 sends the contact information to the agent desktop (block 2645) via the agent 2219 system. The collaboration workflow method 2640 updates the contact record with the events received from the collaboration subsystem when the session is terminated (block 2647). The collaboration workflow method 2640 also sends a left-session event into the agent subsystem at block 2649.

Figure 9A:
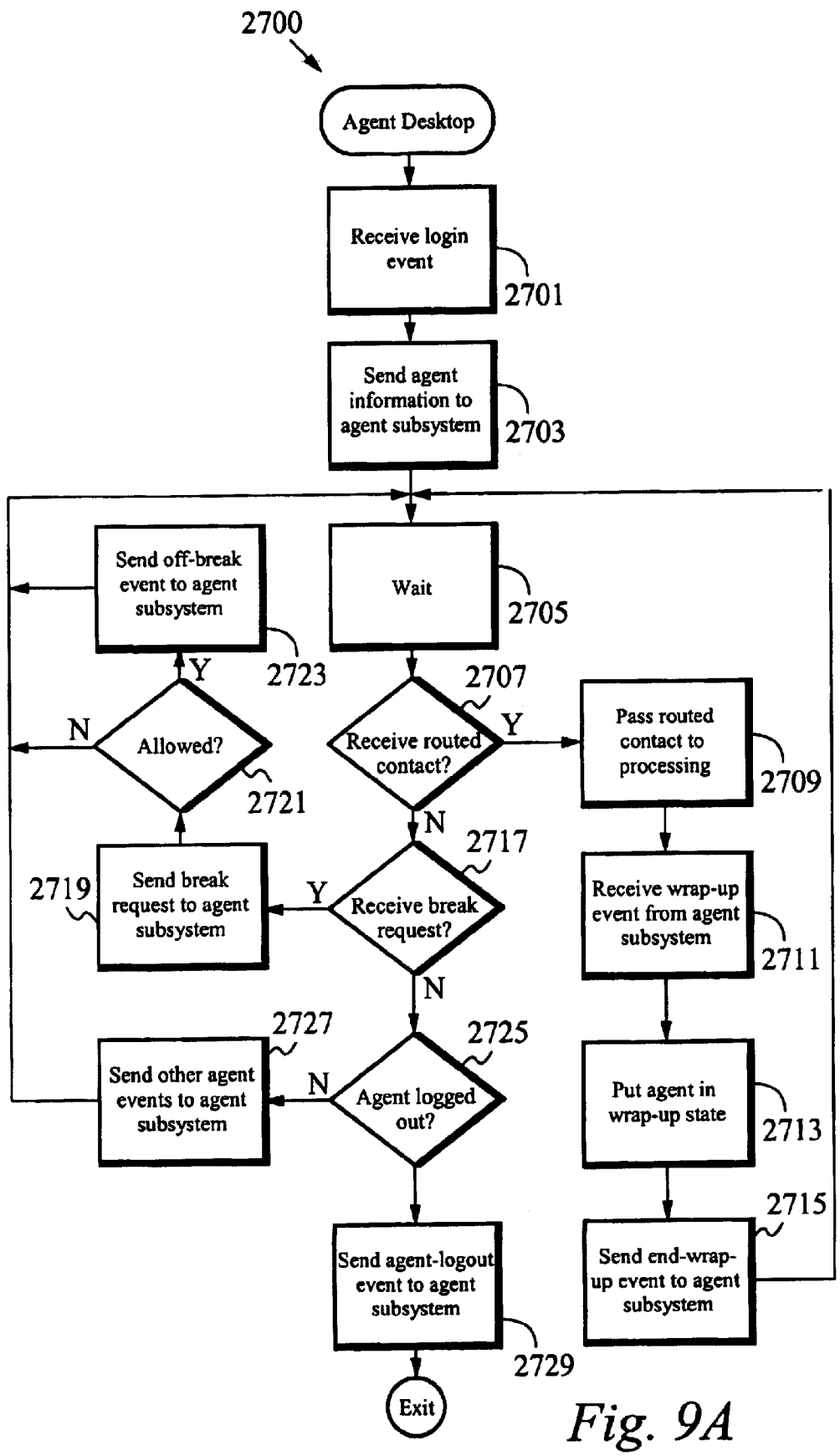
FIGS. 9a-9c are flowcharts of methods to be performed by agent components in the embodiment of the digital multimedia contact center shown in FIG. 4.

The methods used by the multimedia contact center 2200 for agents are now described with reference to the flowcharts in FIGS. 9A-C. FIG. 9A illustrates an agent desktop method 2700 that presents tasks on an agent desktop 2229. The agent desktop method 2700 receives a login event when an agent logs into the agent subsystem 2219 at block 2703. As part of their processing, the agent subsystem 2219 and the agent workflow 2207 make the agent available for contacts. The agent desktop method 2700 waits for messages from the agent and the agent subsystem at block 2705. If the agent desktop method 2700 receives the routed contact (block 2707), it passes the contact information onto the appropriate underlying system(such as the email system and the collaboration system) at block 2709. When the appropriate system has terminated the contact, the agent desktop method 2700 receives a wrap-up event from the agent subsystem (block 2711), which causes it to put the agent into a wrap-up state (block 2713). The agent desktop method 2700 sends an end-of-wrap up event to the agent subsystem at block 2715 when the agent has finished the contact wrap up procedures.

The agent desktop method 2700 also handles the transition of the agent into various states such as break, logout, etc. If the agent is requesting a break (block 2717), the agent desktop method 7—sends the break request to the agent subsystem (block 2719), which forwards it onto the agent workflow for a decision (as described further below). If the break request is allowed (block 2712), the agent desktop method 2700 waits for the agent to return from break and sends off-break event to the agent subsystem to inform it that the agent is again available (block 2723).

If the agent is logging out (block 2725), the agent desktop method 2700 sends an agent-logout event into the subsystem at block 2729. All other messages are sent to the agent subsystem at block 2727. One of skill in the art will readily understand the processing necessary to transition the agent into other states without further illustration.

Figure 9B:
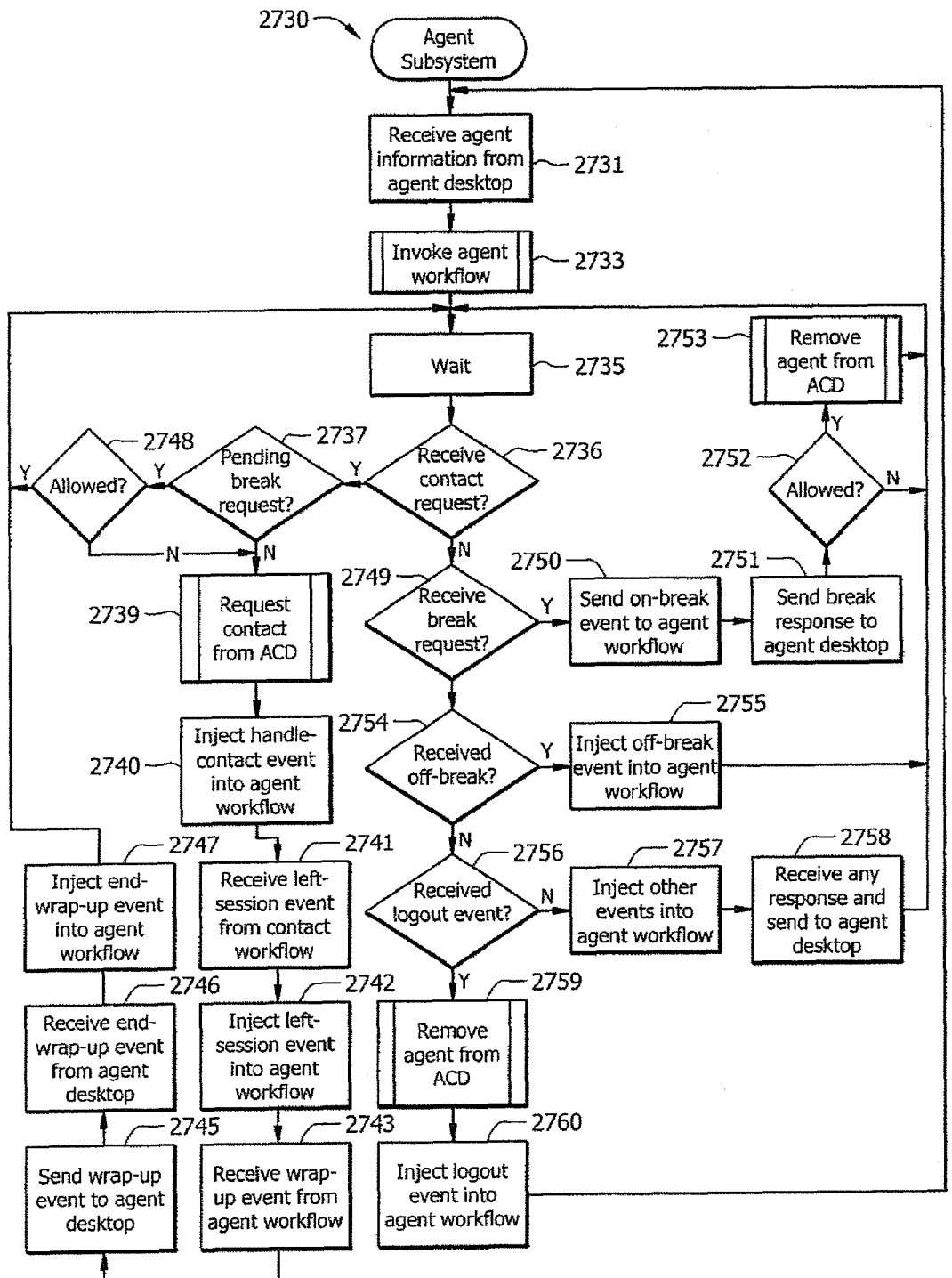

Referring now to FIG. 9B an agent subsystem method 2730 executed by the component acting as the agent subsystem 2219 is described. The agent information is received from the agent desktop at block 2731 when the agent logs into the contact center. The agent subsystem method 2730 invokes an agent workflow from the workflow engine 2201 at block 2733 and waits for events from the agent workflow and the agent desktop 2229 (block 2735). If the event is a contact request from the agent workflow (Block 2736), the agent subsystem method 2730 checks to see if there is a pending break request from the agent desktop (Block 2737). If not, the agent subsystem method 2730 requests a contact for the agent from the dynamic ACD at block 2739. Once the dynamic ACD returns a contact, the agent subsystem method 2730 injects a handle contact event into the agent workflow (block 2740). When the agent or the contact terminates the call or the session, the agent subsystem method 2730 receives a left-session event from the corresponding contact workflow, i.e., the voice workflow, the email workflow, the collaboration workflow, at block 2741, and injects the event into the agent workflow at block 2742. The agent subsystem method 2730, in conjunction with the current session or call, also receives a wrap-up event from the agent workflow (block 2743), which it sends to the agent desktop (block 2745). When the agent desktop has determined that the agent has completely wrapped up the contact, the agent subsystem method 2730 receives the end-wrap-up event from the agent desktop at block 2746, and in turn, injects the event into the agent workflow at block 2747. If a break request is pending (block 2737), the agent subsystem method 2730 waits until the agent workflow makes a decision on the break request (block 2748). If allowed, the agent subsystem method 2730 waits (block 2735) for an off-break event from the agent desktop. If not allowed, the agent subsystem method 2730 requests a contact from the dynamic ACD at block 2739.

If the agent subsystem method 2730 receives a break request from the agent desktop (block 2749), it sends an on-break event to the agent workflow (block 2770) and waits for a response, which it forwards to the agent desktop at block 2751. If the break is allowed by the agent workflow (block 2752), the agent subsystem method 2730 requests the agent be removed from the agent list by the dynamic ACD at block 2753 and waits a block 2735 for an off-break event from the agent desktop. When the off-break event is received (block 2754), the agent subsystem method 2720 injects the off-break event into the agent workflow at block 2735 to cause the workflow to request a contact for the now available agent.

If a logout event is received (block 2756), the agent subsystem method 2730 requests the agent be removed from the agent list by the dynamic ACD (block 2759) and injects a logout event into the agent workflow (block 2760). The handling of other events is illustrated generically at block 2757, where the event is injected into the agent workflow, and at block 2758, where the agent subsystem method 2730 forwards any response received from the agent workflow to the agent desktop. One of skill in the art will readily understand the processing necessary to handle different types of events without further illustration.

Figure 9C:
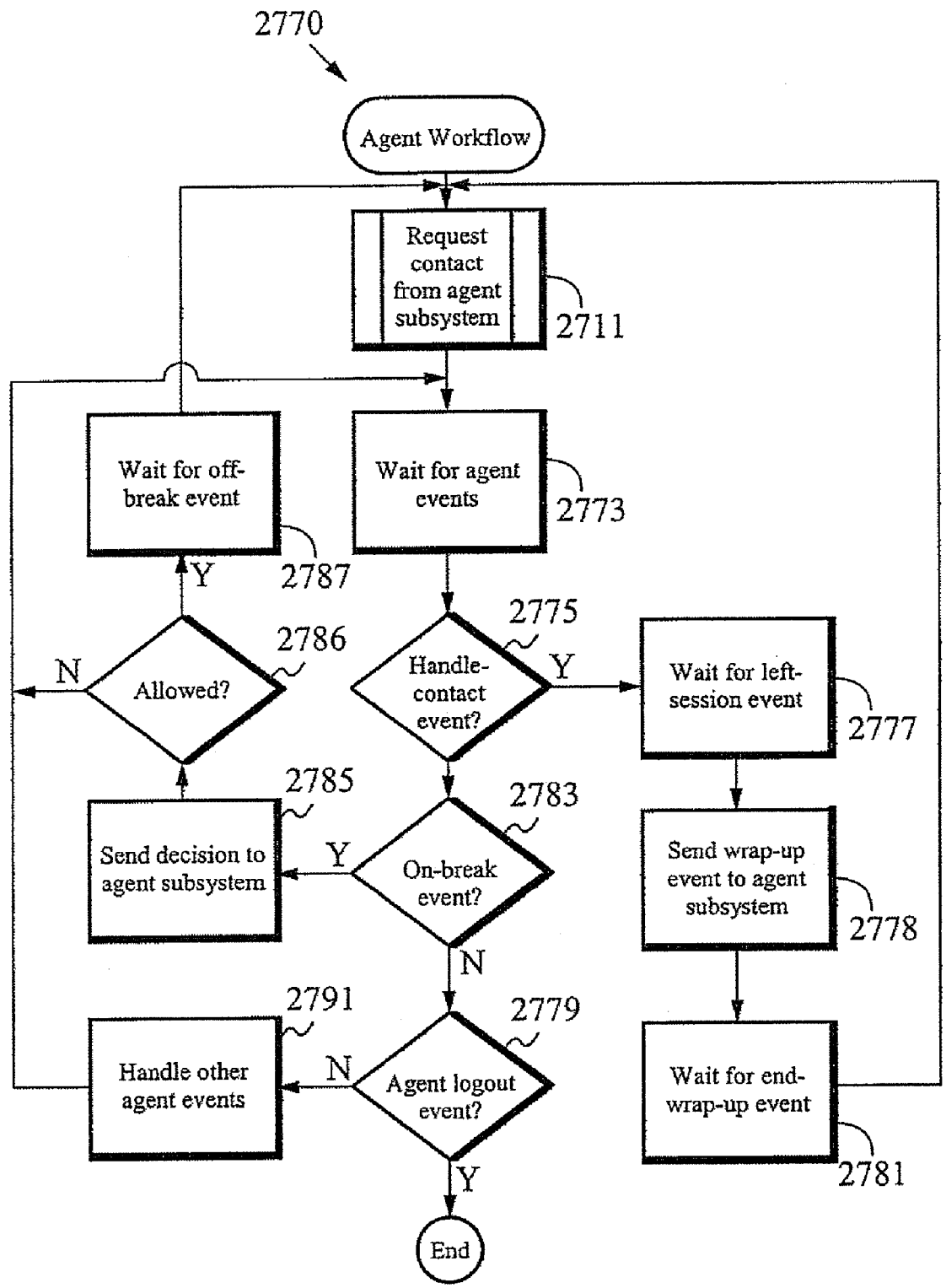

An agent workflow method 2770 for an agent workflow is now described in conjunction with FIG. 9C. The agent workflow method 2770 begins by requesting a contact for the agent from the agent subsystem at block 2771. The agent workflow methods 2770 than waits for the agent events at block 2773. If a handle-contact event is received (block 2753), the agent has been allocated to a contact and the agent workflow methods 2770 waits for a left-session event from the corresponding contact workflow that indicates the contact session has terminated (block 2777). When the left-session event arrives, the agent workflow method 2770 sends a wrap-up event to the agent subsystem at block 2778 and waits for an end-wrap-up event that indicates the agent is now available (block 2781).

The agent workflow method 2770 loops back to block 2771 to request a new contact for the agent.

If an on-break event is received by the agent workflow method 2770 (block 2761), the agent workflow method 2770 determines if the break can be allowed based on the status of the call center (block 2785). In either case, a message is sent to the agent subsystem to notify the agent desktop of the decision (block 2785). If the break is allowed (block 2785), the agent workflow waits for an off-break event to be received at block 2786. If the break is not allowed, the agent workflow method 2770 loops to block 2773 to wait for a contact.

If an agent logout event is received by the agent workflow mentioned 2770 (block 2779), the agent workflow method 2770 terminates. In an embodiment not shown, the agent logout event is a request that can be denied based on the status of the contact center, such as when the contact center is overloaded, or allowed at an appropriate time, such as when the agent workflow requests a new contact. All other events are handled by the agent workflow method 2770 as generically illustrated by block 2791. One of skill in the art will readily understand the processing necessary to handle different types of events with an agent without further illustration.

It will be appreciated that the workflow described in conjunction with the flow charts 6C, 7C, 8C and 9C are simplified examples of the actions available through the workflow logic 2207 and are not intended to limit the invention to only those actions and sequences illustrated. A detailed description of the embodiment of the workflow logic 2207 and the workflow actions is given in the next section.

In addition, one of skill in the art will readily conceive of alternate logic flows with more or fewer processes or different processes that achieve the results of these method and such alternatives are considered within the scope of the inventions. For example, instead of having the contact workflow inject the left-session events directly into the agent workflow, in one alternate embodiment, the contact workflow sends a contact-ended event to the contact subsystem and thence to the appropriate media router, which causes the router to send the left-session event to the agent subsystem for injection into the agent workflow. In another alternative embodiment, the termination of the contact workflow causes the contact subsystem to send the contact-ended event to the appropriate media router, causing the router to send the left-session event to the agent subsystem and thence to the agent workflow.

The particular methods performed by components of the alternative embodiment of the digital multimedia contact center of the present invention have been described in terms of media-specific processing diagrams and flowcharts. The methods performed by a voice router, a voice subsystem, and workflow logic for a voice contact have been shown by reference to flowcharts 6A-C including all the acts from 2401 until 2407, from 2421 until 2443, and from 2451 until 2475, respectively. The methods performed by an email escalator, an email subsystem, and workflow logic for an escalated email contact have been shown by reference to flowcharts 7A-C including all the acts from 2501 until 2515, from 2521 until 2531, and from 2541 until 2549, respectively. The methods performed by a collaboration router, a collaboration subsystem, and workflow logic for a collaboration contact have been shown by reference to flowcharts 8A-C including all the acts from 2601 until 2607, from 2621 until 2633, and from 2641 until 2649, respectively. The methods performed by an agent desktop, an agent subsystem and workflow logic for an agent have been shown by reference to flowcharts 9A-C including all the acts from 2701 until 2729, from 2731 until 2760, and from 2771 until 2791, respectively.

Internet Contact Center (iCC) Implementation

In this section of the detailed description, a particular alternative implementation of the invention is described. Companies subscribe to the services of the iCC to manage their customer contacts. The iCC is located remotely from the agents for the subscribers, who may be at various locations. The agent desktops 2229 are Web browser-based that connect to the agent subsystem(s) 2219 in the remote iCC. The subscriber's customers contact the iCC directly through the Internet or POTS and are then routed to the appropriate agent desktop through a virtual private network. The browser-based agent desktops enable the use of various plug-in applets that extend the basic capabilities of the agent desktop without extensive reprogramming. Additionally, a combination Java applet/serlet can be used to implement the desktop manager described previously.

Messaging

Communication between the workflow engine 2201 and the media routers 2221/agent desktop 2229 is handled through a set of interfaces using Java RMI (remote method invocation). Three generic interfaces are provided in a messaging library. All contact workflow subsystems, e.g., voice subsystem 2213, collaboration subsystems 2215 and mail subsystem 2217, are required to implement at least a generic contact service interface, such as "ContactWorkflowService Interface" described below. All agent workflow subsystems, e.g., the agent subsystem 2219, are required to implement at least a generic agent service interface, such as "AgentWorkflowServiceInterface" described below. Each media router 2221 is required to implement at least a generic media router interface, such as "MediaRouterInterface" described below. New interfaces specific to the service requested can be defined that inherit from existing interfaces. Thus, for example, a voice service interface implements generic contact services interface along with interface for telephone commands. Global variables pass information between the workflow subsystem 2205 and the workflow logic 2207. The global variables contain the values needed by the workflow logic 2207. The global variables contain the values needed by the workflow logic 2207 in the context of a particular workflow, and requests made by the workflow logic 2207 to the workflow subsystems 2205 through various workflow steps described further below.

A media router 2221 uses the ContactWorkflowServiceInterface of a particular contact workflow subsystem to 1) start a contact workflow and receive a contact identifier for the workflow, 2) inject an event into an existing workflow identified by a contact identifier, and 3) determine if the contact workflow subsystem is handling a specified contact. To start a workflow for a contact, a media router 2221 invokes a "startWorkflow" method in the ContactWorkflowServiceInterface of the desired contact workflow subsystems, passing in an identifier for the media router interface of the media router (client), and the attributes of the contact (attributes), and receives an identifier for the newly created contact workflow in return (contactID), startWorkflow(client, contactID, attributes).

To inject an event into an existing workflow, a media router 2221 invokes an "injectEvent" method in the ContactWorkflowServiceInterface of the appropriate contact workflow subsystems, identifying the contact workflow (contact ID) and the event to be injected into the workflow (event) e.g., injectEvent(contactID, event).

To determine if a particular contact workflow subsystem is handling a specific contact, a media router calls a "handleContact" method in the contactWorkflowServiceinterface on the contact workflow subsystems, passing in the identifier of the contact workflow (contactID) and receives a boolean value in return, e.g.

handleContact(contactId).

An agent desktop 2229 uses the AgentWorkflowServiceInterface to 1) start an agent workflow and receive an agent identifier for the workflow, 2) inject an event into an existing workflow and receive an agent identifier by an agent identifier, and 3) determines if a particular agent workflow subsystem is managing a specified agent. As described previously, when multiple agent workflow subsystems are present, an agent desktop is assigned to one of the agent workflow subsystems by a service manager. To start an agent workflow, an agent desktop invokes a "startWorkflow" method in the AgentWorkflowServiceInterface of the appropriate agent workflow subsystem, passing in the attributes of the agent (attributes), and receives an identifier for the newly created agent workflow in return (agentID), e.g., startWorkflow(agentID, attributes).

To inject an event into an existing workflow, agent desktop invokes an "injectEvent" method in the AgentWorkflowServiceInterface of the appropriate agent workflow subsystem, identifying the agent workflow (agentID) and the event to be injected into the workflow (event), e.g., injectEvent(agentID, event).

To determine if a particular agent workflow subsystem is handling specific agent, an agent desktop calls a "handleAgent" method in the AgentworkflowServiceInterface of the agent workflow subsystem, passing in the identifier of the agent workflow (agentID) and receives a boolean value in return, e.g., handleAgent(agentID).

The MediaRouterInterface allows contact workflow subsystems to route contacts to the agents allocated by the dynamic ACD and to terminate a contact session. To route a contact to an agent, a contact workflow subsystem invokes an "assignContactToAgent" method in the MediaRouterInterface of the appropriate media router, passing in the workflow identifier for the contact (contactID) and the workflow identifier for the agent (agentID) and receiving a boolean in return that indicates whether the routing was successful, e.g., assignContactToAgent(contactID, agentID).

To terminate a contact session, a contact workflow subsystem invokes a "teminateContact" method in the iCCMediaRouterInterface of the appropriate media router, passing in the workflowidentifier for the contact (contactID), e.g., terminateContact(contactID).

Database Unification Layer

The database unification layer 2261 implements a unified schema consisting of information replicated from a number of different sources including the database used by the third-party systems, and the internal iCC database 2231 as described previously.

Each different source is defined in a sub-schema including:
Billing
Customer Relationship Management (CRM)
Entitlement (Billing option, maximum agents, maximum contacts, . . . )
Provisioning (Agents, User Ids, Passwords, Classifications, Skills, Proficiencies, . . . )
Business Logic (Priority Expressions, Attributes, Stored Procedures, . . . )
Active State (Agent State, Session State, Contact State, Contact Center State, Customer State).

The database unification layer provides access to the information in the various databases through Java classes, such as CRM, Provisioning Entitlement, Rules, Contact Detail Record (CDR), Contact Center State.

The unified schema is synchronized with the vendor-specific sources by a set of database triggers. For instance, many conventional email systems use event handlers that watch for messages entering and changing state, and create and update CDR records as necessary, e.g. when an email message is responded to or forwarded to another agent. Updating one of the sources with information in the unified schema is accomplished through the Java classes.

Figure 10:
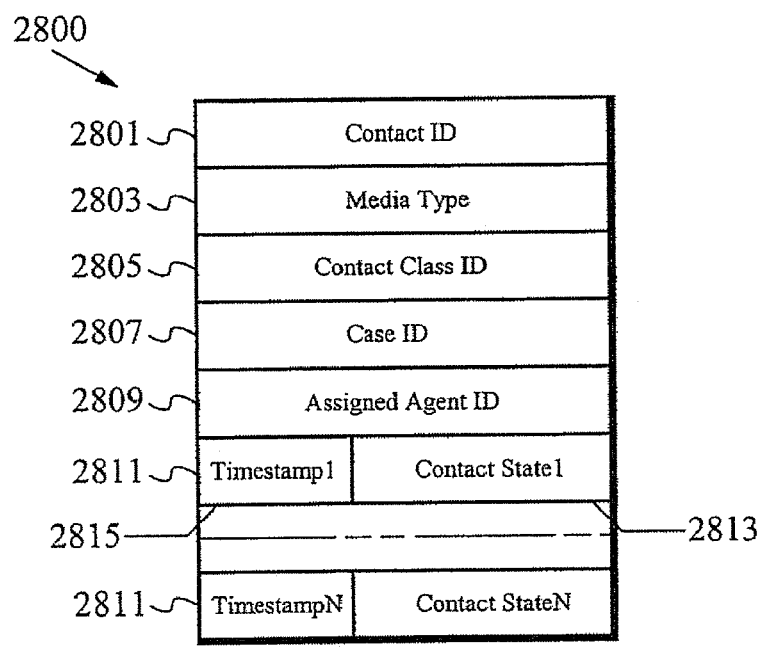
FIG. 10 is a diagram of a contact detail data structure for use in an implementation of the invention.

One embodiment of a data structure 2800 for CDR is illustrated in FIG. 10. The contact represented by the CDR 2800 identified through ID field 2801. The media type through which the contact has been entered the iCC is specified in a media type field 2803. Assuming the contact has been classified, the classification for the contact is stored in a contact class ID field 2805. If the iCC is implemented in conjunction with a standard customer relationship management system, the CRM case identifiers is store in a case ID field 2807 to allow tracking of the contact. The agent assigned to handle the contact is identified through an assigned agent ID field 2809. One or more fields 2811 collectively record the history of the contact as it is processed in the iCC. Each field 2811 contains a contact state 2813 and a timestamp 2815. Thus, the change in state of the contact can be tracked chronologically for the life of the contact. Exemplary contact states used by the iCC are shown in Table 1 below and it will be appreciated that more or fewer states may be used.

TABLE 1

| iCC Contact States | |
| --- | --- |
| State | Comment |
| Initially Created | |
| Escalated | |
| Being Addressed | |
| On Hold | |
| Archived | after wrap-up |
| In Wrap-up | |
| Terminated | no agent assigned |
| Abandoned | contact quits before being helped |
| Queued | |
| Demoted | |

Figure 11:
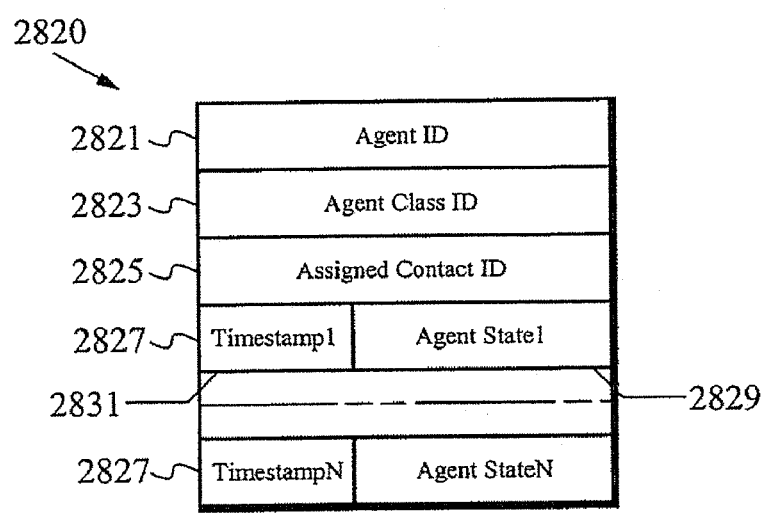
FIG. 11 is a diagram of an agent data structure for use in an implementation of the invention.

One embodiment of a data structure 2820 for an agent record is illustrated in FIG. 11. The agent represented by the agent record 2820 is identified by an agent ID field 2821. Assuming the agent has been classified, the classifications for the agent are stored in an agent class ID 2823. The contact identifier for the current contact the agent is handling is stored in an assigned contact ID field 2825. One or more fields 2827 collectively record the history of the agent while he or she is logged into the iCC. Each field 2827 contains an agent state 2829 and timestamp 2831. Thus, the change in state of the agent can be tracked chronologically during the workdays of the agent. The agent states used by the iCC are shown in Table 2 below and it will be appreciated that more or fewer states may be used.

| State | Comment |
| --- | --- |
| Logged Out | |
| On Break | |
| Available | Logged in and not assigned a contact |
| Busy | |
| Wrap-up | Post-contact processing |

Soft ACD

The iCC uses a software-implemented ACD to manage the allocation of all contacts and agents. The Soft ACD exists as a set of stored procedures in the contact center database that refer to special database tables used as the unordered lists of available agents and waiting contacts. The unordered lists may be further logically subdivided, e.g., by classification.

The Soft ACD also loads business logic and provisioning information (described below) when required. Each classification within the organization (e.g., Sales, Support, Customer Service, etc.) Is associated with a particular set of business logic. If any of this information changes, the Soft ACD is notified, it reloads this information, and immediately applies the new information to the iCC. While it is running, the Soft ACD maintains the state (classification, requirements, and attributes) of each entry in the list.

When a running workflow requests an agent or contact, the appropriate subsystem passes the request onto the Soft ACD as previously described. The Soft ACD determines the best match for the agent or contact by filtering the opposite list by classification and in light of any requirements specified in the request, and prioritizing the filter entries using one or more "priority expressions". Each priority expression contains a set of weighed contact/agent attributes that produce a priority from 0 to 100 when an entry is evaluated. The attributes and their weights exist as classes in the business logic sub-schema in the database unification layer and are described next. It should be noted that the Soft ACD dynamically performs the filtering and prioritizing for each request for a match.

While a contact or agent is waiting on a list, the requesting workflow is free to continue executing, but when an actual allocation occurs, a resource allocator notifies the corresponding subsystem, which then interrupts the requesting workflow to route the contact.

Business Logic

The business logic used by the iCC for a subscriber is defined through an email manager, a workflow editor, and an administrative interface. The email manager is used to create email rules that route email contacts into various predefined mailboxes. These rules may reference text in the form, to subject and body of the message as well as make database queries. Mailbox queues are separate message areas maintained by the email server. Agents retrieve messages from these queues. Individual queues can be set up e.g., for each agent or for separate products, and additions or deletions to the existing set of queues can be made necessary. For example, the subscriber would initially define one queue per product per classification (SalesPrinters" or "SupportPrinters") and add more as business grows. The system administrator grants Access to these queues on a per agent basis. An additional queue is defined for escalated email messages as previously described. After defining the queues, the rules which route messages into those queues are defined. Rules can also be specified that demote certain email messages into self-service by routing them to the auto-responder function.

The workflow editor defines a workflow for handling a contact or an agent. A subscriber may define any number of agent and contact workflows through the workflow editor. For example, each agent might have a particular workflow based on the agents's login identifier. The workflows and their related invocation information are stored for reference by the workflow engine 201 in an LDAP directory server or other directory structure that defines hierarchy directory entries. For example, a subscriber might define the following hierarchy in which the entries at levels (a) and (b) are the invocation information for the workflows specified.

```
1) subscriber.com
   a) iCC
      i) configuration
         (1) wfVoice
            (a) 1234
               (i) Workflow "SalesContact, WFE"
            (b) 1000
               (i) Workflow "SupportContact, WFE"
         (2) wfEmail
            (a) sales@asubscriber.com
               (i) Workflow "SalesContact.WFE"
            (b) support@asubscriber.com
               (i) Workflow "SupportContact.WFE"
         (3) wfWebCollaboration
            (a) http://asubscriber.com/sales
               (i) Workflow "SalesContact.WFE"
            (b) http://asubscriber.com/support
               (i) Workflow "supportContact.WFE"
```

The administrative interface uses the classes in the business logic sub-schema to define logins, passwords, agent skills and proficiencies, call center classification, service level objectives, email overdue/escalation thresholds, priority expressions, attributes, attribute weightings etc. The administrative interface starts up, it reads the system and subscriber business logic from the database using the business logic classes. When entities are changed, the relevant data is written back to the database through these same business logic classes. The administrative interface presents the subscriber with various graphical user interface (GUI) screen to assist the user in defining the subscriber business logic.

Through one of the GUI screens, the subscriber sets up the call center classifications, which define gross distinctions between contacts or between agents. The same set of classifications is used both for contacts and agents. Within a particular classification, the subscriber defines service level objectives for each media type. Service level objectives are defined as the percentage of contacts of a particular media type which must be handled in a specific time. Thus, the GUI screen for defining service level objectives presents the user with a list of the media types, an input area for a percentage value, and an input area for an elapsed time value.

Each agent has a set of skills and a proficiency within each skill, which are specified and modified through the administrative interface. When a contact requests an agent, certain skills/proficiencies may be specified as contact requirements. The requirements may also include aging information relaxing those requirements after a certain amount of time has elapsed without the contact being helped. For instance, the aging information might say that for the first 30 seconds a particular voice call will accept a proficiency of 5 for a particular skill, after 30 seconds a proficiency of 2 will be acceptable. This is referred to as "aging" requirement.

The iCC comes pre-configured with a number of system defined attributes including:

TimeInQueue—the time a contact has been waiting for a resource (available through a database stored procedure and calculated on the fly by the Software ACD.)

IsEmail—is this contact an email?

IsVoice—is this contact a voice call?

IsCollaboration—is this contact a web collaboration?

MediaServiceLevel—percentage of contacts of this media type handled within the specified media-specific service objective.

LastAgent—User Id of last agent this customerr talked to.

Subscriber-defined attributes that determine a contact-agent match are specified through the administrative interface. Attribute characteristics include name, type (Call center, Agent, Contact), value type (numeric, symbolic), values, default values, value normalization, and corresponding stored procedure. The subscriber defines the set of attributes using a GUI screen that prompts the user for input by displaying permitted choices or through visual clues, such as a choice of normalization curves. The stored procedure for an attribute calculates a value for the attribute when the attribute is used in a priority expression. The stored procedures can have been previously created or may be created when the attribute is created.

The agent and contact priority expressions are created through a graphical user interface that allows an administrator to drag-and-drop desired attributes into an expression and set their weighting through slider bars. There is one priority expression for agents and one for contacts within each classification. When a new priority expression is specified, a new stored procedure is generated in a database scripting language, such as PL/SQL, compiled, and added to the database. One exemplary priority expression is shown in the following pseudocode:

For each attribute:

Call the attribute's stored procedure passing ContactID and CustomerID;

If value returned is −1, use the attribute's default value;

If the attribute is symbolic, convert to a normalized value;

Multiply results by specified weighting and add this to the accumulated total.

For a more specific example, assume a subscriber specified two classifications "Sales" and "Support" and contact a attribute called "BusinessValue" (i.e., the value of this contact to the subscriber's business). For the Sales classification, the subscriber created a contact priority expression of:

BusinessValue*0.2+TimeInQueue*0.1+IsEmail*0.1+
IsVoice*0.4+IsCollaboration*0.2 and for the Support classification, a contact priority expression of:

$$BusinessValue*0.1+TimeInQueue*0.1+IsEmail*0.1+\\IsVoice*0.6+IsCollaboration*0.1$$

When the Soft ACD is prioritizing the waiting contacts for assignment to an agent, it evaluates the expression for each contact of the appropriate classification by calling the stored procedure associated with the BusinessValue attribute and multiplying the value returned by 0.2 for a Sales contact or 0.1 for Support contact. The weighted business value of the contact is then added to the appropriately weighted values of the system defined attributes to calculate the priority for the contact.

The Soft ACD can prioritize each agent/contact before deciding on the Appropriate match or alternately may employ an optimization scheme in which the first agent/contact that reaches a pre-determined priority value is chosen.

Provisioning Information

The underlying components of iCC must be set up and configured before the center is ready for operation. The email manager allows administrators to define agents, agent passwords, mailboxes, as well as the rules by which contacts are routed to these mailboxes. An Administration interface to the collaboration server is used to define agents, agent passwords, and agent extensions. The telephony server is set up by creating dial plans and associating phone numbers with applications, and agents with phone extensions.

Workflow Engine

The iCC uses workflows to process contact, manage agents, and control the overall contact center functions. Workflow steps are the basic building blocks of control in the iCC workflow engine. The workflow steps available to a designer depend on the type of workflow being developed. For example, voice workflow steps include answer, collects digits, and record. Exemplary agent workflow steps include allow break, handle contact, and wrap up. Some workflow steps are applicable to all contacts workflows, such as classify contact, request agent, and deliver contact. Control steps, e.g., end, wait, and if, are available for all workflows, along with a send email step. Additional steps for the contact and agent workflows will be readily apparent to one of skill in the art.

Figure 12:
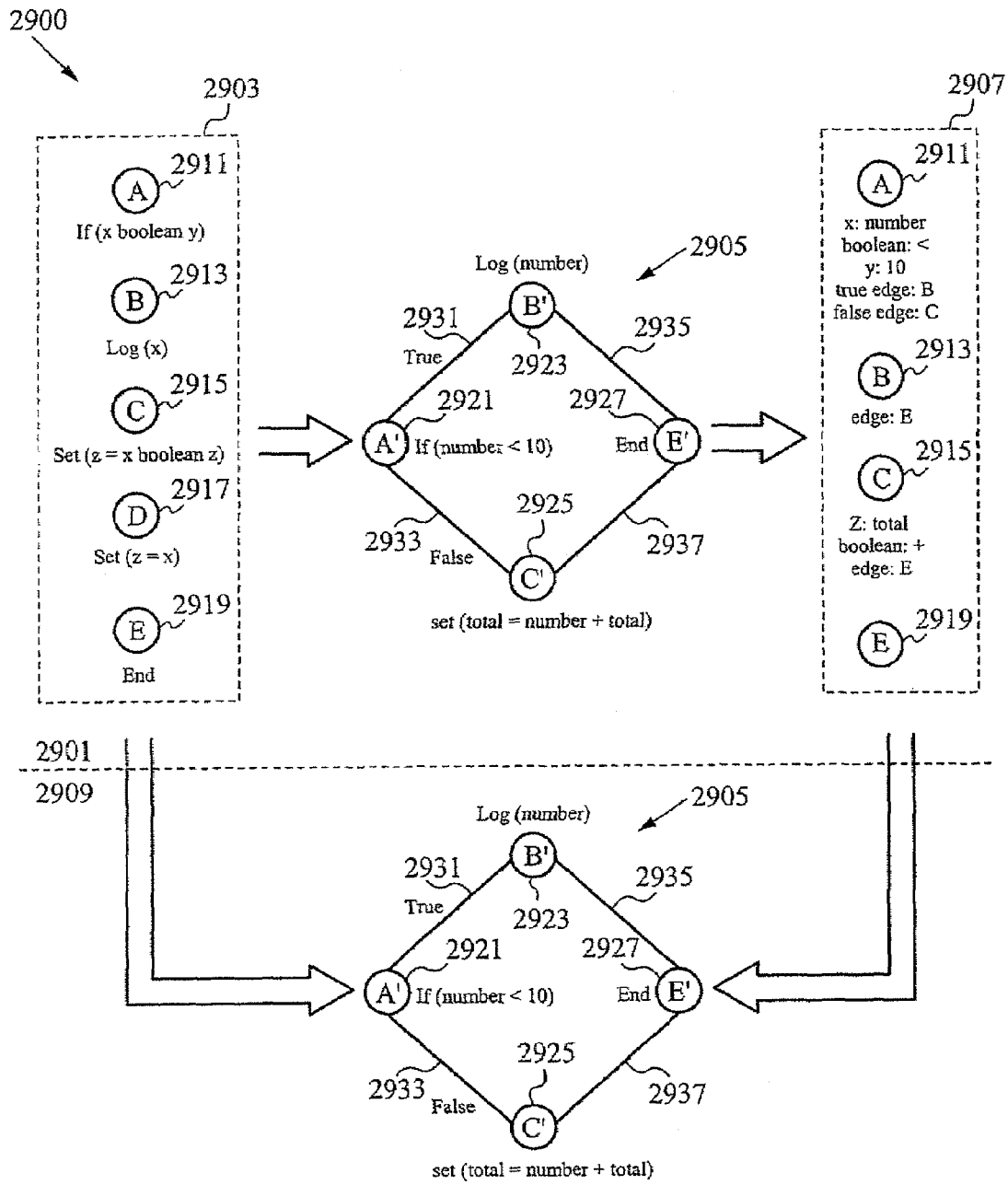
FIG. 12 is a diagram of a workflow engine for use in an implementation of the invention.

Instead of hard-coded scripts typically used to implement workflows, the iCC workflow engine 2900 dynamically creates a script for a workflow from two files as described in conjunction with FIG. 12. Definitions for prototype steps 2911, 2913, 2915, 2917, 2919 are stored in a template file 2903. Each step is associated with workflow code that implements a high-level, compound script action, such as "play menu with interruptible prompts" or "play music until an agent is available", that are available to the workflow engine 2900. The script actions are built from workflow steps. For ease of explanation, the script actions represented in FIG. 12 are simple, single commands, e.g., step A 2911 represents the function "if(x boolean y)," where "x," "boolean," and "y" are parameters that will be replaced by values specified by an instance of the step A 2911. It will be appreciated that the invention is not limited by the example or by the workflow steps shown herein.

When in configuration mode 2901, the workflow engine 2900 (or a supporting application) enables a user, such as a system administrator, to create a workflow 2905 by selecting the appropriate steps from the template file 2903, specifying the appropriate values for the parameters in the script command, and linking the steps together to form a directed graph that represents the desire workflow. Thus, for example, when step A 2921 is executed, the function "if (number<10)" is evaluated, with a true result causing edge 2933 to be followed to execute step C' 2925. A configuration file 2907 is created from the directed graph and specifies the structure for the workflow 2905. The configuration file 2907 contains an identifier for each corresponding prototype step, along with the values, edge information and other settings (configuration data) associated with each step in the graph. It will be appreciated that any of the common input methodologies used to obtain user input can be employed to create the directed graph for the workflow, including a graphical user interface that gives the user drag-to-drop capabilities to allow the placement and rearrangement of steps and edges, and dialog boxes that request the appropriate parameters.

When the workflow 2905 is to be executed by the workflow engine 2900 in runtime mode 2909, the workflow engine 2900 references the configuration file 2907 and reconstructs the directed graph for the workflow 2905 in memory by merging the corresponding prototype step from the template file 2903 with the configuration data associated with the steps in the configuration of 2907. The workflow engine initiates a new thread of execution to execute the workflow script represented by the directed graph. Thus, the workflow engine 2900 abstracts out the code and connectors when the user creates a workflow and subsequently reconstructs the workflow from the abstractions when it is to be executed.

Unlike typical workflow implementations, all iCC workflow steps can execute asynchronously by storing its results to a prioritized message queue in its thread of execution. Additionally, a step may spawn another execution thread to create a multithreaded workflow. Similar classes of steps may share one queue with one execution thread for all requests of that type from a single workflow or across workflows. As previously described, various workflow steps request a service from a subsystem. The subsystems inject service events into the workflow by placing event notifications in the message queue. The retrieval of messages from the queue is implemented using three special workflow steps: RegisterEvent, UnRegisterEvent, and GetMessage.

RegisterEvent and UnRegisterEvent modify handlers for events. By default, an event is handled-in-line in the step that caused the event. RegisterEvent specifies a target step that will handle the event instead (referred to as "chaining"). Handlers are stacks when a handler is registered using RegisterEvent, the target step for the that event is pushed onto the stack; when UnregisterEvent is called, the stack is popped.

The GetMessage step fetches a message from the queue. When the message is an event notification for which a registration (via RegisterEvent) has been made, the workflow engine branches to the target step to handle the event. If the event was not explicitly registered, the current step is pushed onto the stack to handle the event.

Figure 13:
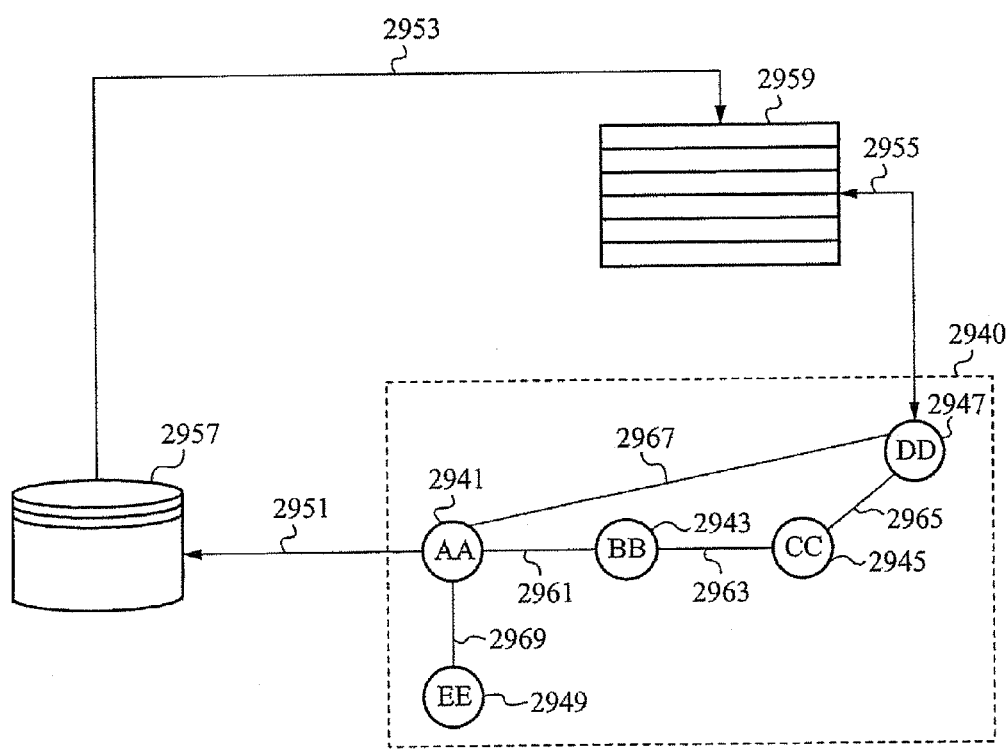
FIG. 13 is a diagram of an asynchronous workflow executed by the workflow engine of FIG. 12.

An example of the asynchronous processing of the workflow steps is illustrated in FIG. 13. A workflow 2940 begins at step AA 2941. As part of its codes, step AA 2941 requests (arrow 2951) that the database subsystem retrieve a record from the unified database 2957. When the record is retrieved, the database subsystem stores (arrow 2953) an event notification in a message queue 2959. Instead of waiting for the database subsystem to retrieve the record, the step AA 2941 registers itself as the target step to handle the event. The workflow continues processing, executing step BB 2943 and step CC 2945, before reaching step DD 2947, which requests (arrow 2955) messages from queue 2959. Assuming that the event notification is in the queue 2959, it will be returned (arrow 2955) to step DD 2947, which in turns, returns (edge 2967) the event notification to step AA 2941 for handling. Once step AA 2941 has received the record, it passes (edge 2969) it onto step EE 2949 for further processing.

In one embodiment, the template and configuration files are XML documents with the steps represented by XML elements and the code and configuration information stored as XML attributes for the corresponding XML elements. The code and configuration information are written in the JPython scripting language. A JPython aware execution proxy merges the information from the template and configuration files, and provides and interface between the thread of execution for the workflow and the actual workflow steps. Because the execution proxy insulates the thread of execution from the workflow steps, steps may use multiple languages simultaneously, allowing the developer of the prototype steps to chose the best code to perform a given function.

Operating Environment

Figure 14A:
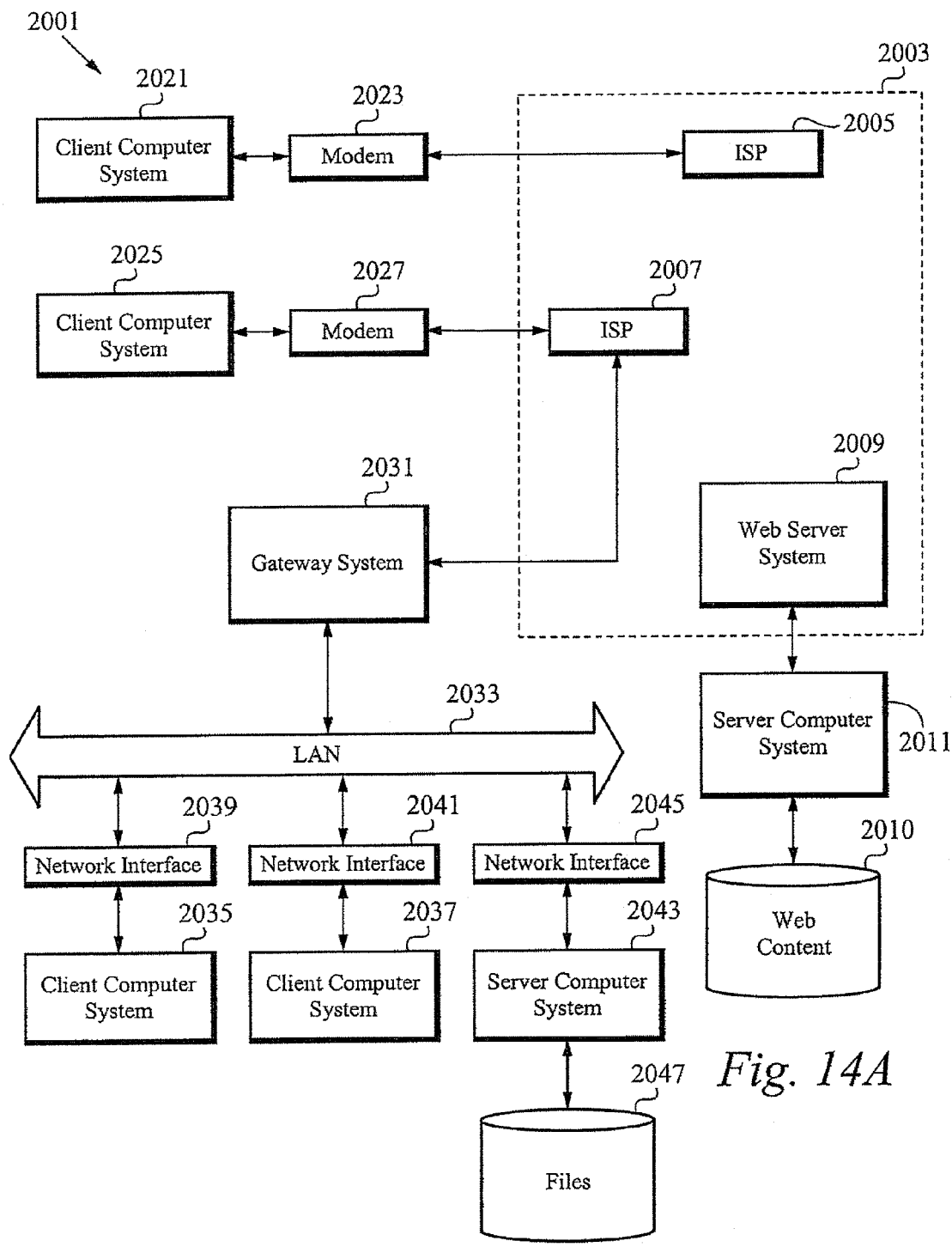
FIG. 14a is a diagram of one embodiment of an operating environment suitable for practicing the present invention.
Figure 14B:
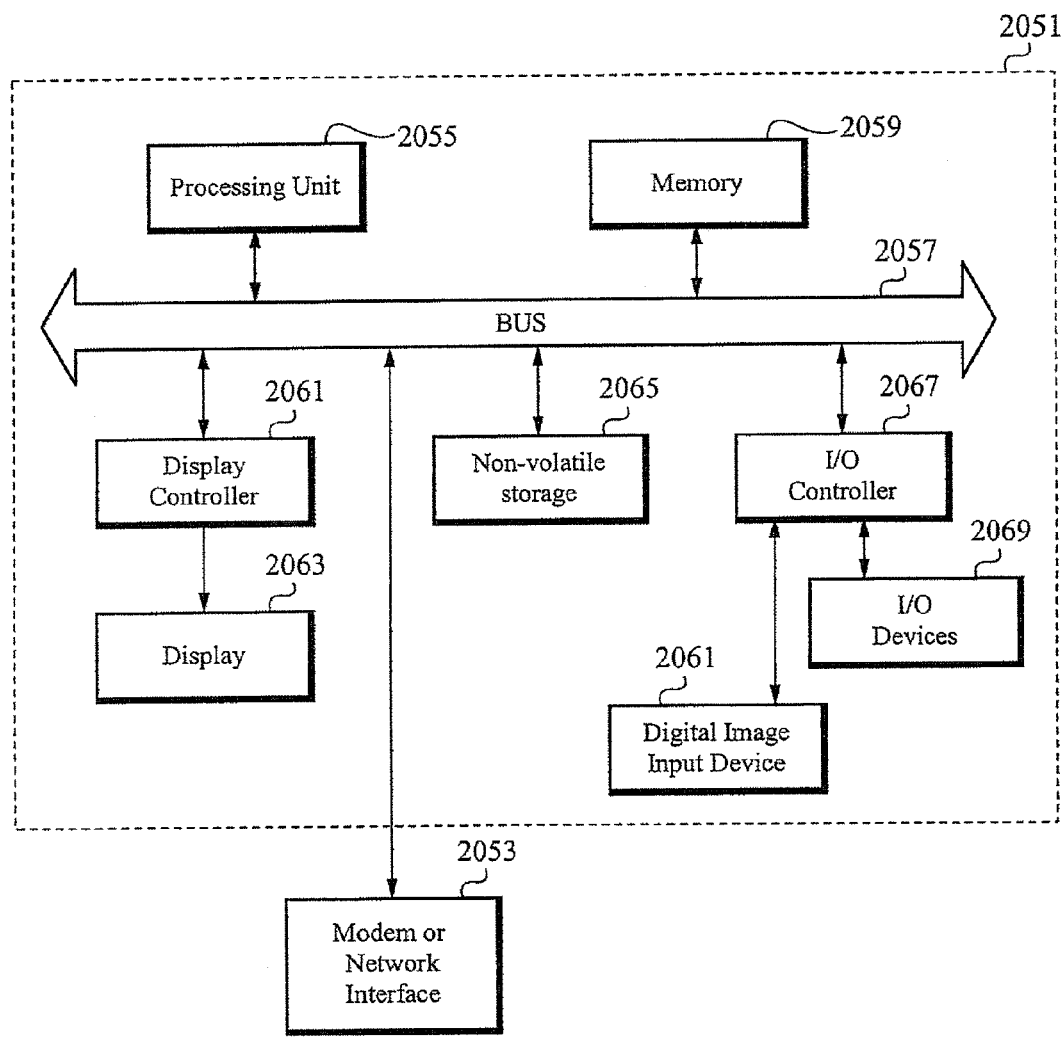

The following description of FIGS. 14A-B is intended to provide an overview of computer hardware and other operating components suitable for alternatively implementing the invention, but is not intended to limit the applicable environments. One of skill in the art will immediately appreciate that the invention can be practiced with other computer system configurations, including hand-held devices, multiprocessor systems, microprocessor-based or programmable consumer electronics, network PC's, mini-computers, mainframe computers, and the like. The invention can also be practiced in distributed computing environments where tasks are performed by remote processing devices that are linked through a communications network.

FIG. 14A shows several computer systems 2001 that are coupled together through a network 2003, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connection of the Internet and the protocols and communication procedures of the Internet are well known to those of skill in the art. Access to the Internet 2003 is typically provided by Internet service providers (ISP), such as the ISP's 2005 and 2007. Users on client systems, such as client computer system 2021, 2025, 2035, and 2037 obtain access to the Internet through the Internet service providers, such as ISP's 2005 and 2007. Access to the Internet allows users of the client computer systems to exchange information, receive and send e-mails, and view documents, such as documents which have been prepared in the HTML format. These documents are often provided by web servers, such as web server which is considered to be "on" the Internet. Often these web servers are provided by the ISP 2005, such ISP 2005, although a computer system can be set up and connected to the Internet without that system being also an ISP as is well known in the art.

The web sever 2009 is typically at least one computer system which operates as a server computer system and is configured to operate with the protocols of the World Wide Web and is coupled to the Internet. Optionally, the web server 2009 can be part of an ISP which provides access to the Internet for client systems. The web server 2009 is shown coupled to the server computer system 2011 which itself is coupled to web content 2010, which can be considered a form of a media database. It will be appreciated that while two computer systems 2009 and 2011 are shown in FIG. 14A, the web server system 2009 and the server computer system 2011 can be one computer system having different software components providing the web server functionality and the server functionality provided by the server computer system 2011 which will be described further below.

Client computer systems 2021, 2025, 2035, and 2037 can each, with the appropriate web browsing software, view HTML pages provided by the web server 2009. The ISP 2005 provides Internet connectivity to the client computer system 2021 through the modem interface 2023 which can be considered part of the client computer system 2021. The client computer system can be a personal computer system, a network computer, a Web TV system, or other such computer system. Similarly, the ISP 2007 provides Internet connectivity for client systems 2024, 2035, and 2037, although as shown in FIG. 14A, the connections are not the same for these three computer systems. Client computer system 2025 is coupled through a modem interface 2027 while client computer systems 2035 and 2037 are part of a LAN. While FIG. 14A shows the interfaces 2023 And 2027 as generically as a "modem" it will be appreciated that each of these interfaces can be an analog modem, ISDN modem, cable modem, satellite transmission interface (e.g. "Direct PC"), or other interfaces for coupling a computer system to other computer systems. Client computer systems 2035 and 2037 are coupled to LAN 2033 through network interfaces 2039 and 2041, which can be Ethernet network or other network interfaces. The LAN 2033 is also coupled to a gateway computer system 2031 which can provide firewall and other Internet related services for the local area network. This gateway computer system 2031 is coupled to the ISP 2007 to provide Internet connectivity to the client computer system. Also, the web server system 2009 can be conventional server computer system.

Alternatively, as well-known, a server computer systems 2043 can be directly coupled to the LAN 2033 through a network interface 2045 to provide files 2047 and other services to the clients 2035, 2037, without the need to connect to the Internet through the gateway system 2031.

FIG. 14B shows one example of a conventional computer system that can be used as a client computer system or a server computer system or as a web computer system. It will also be appreciated that such a computer system can be used to perform many of the functions of an Internet service provider, such as ISP 2005. The computer system 2051 interfaces to external systems through the modem or network interface 2053. It will be appreciated that the modem or network interface 2053 can be considered to be part of the computer system 2051. This interface 2053 can be an analog modem, ISDN modem, cable modem, token ring interface, satellite transmission interface (e.g. "Direct PC"), or other interfaces for coupling computer system to other computer systems. The computer system 2051 includes processor 2055, which can be a conventional microprocessor such as an Intel Pentium microprocessor or Motorola Power PC microprocessor. Memory 2059 is coupled to the processor 2055 by a bus 2057. Memory 2059 can be dynamic random access memory DRAM) and can also include static RAM (SRAM). The bus 2057 couples the processor 2055 to the memory 2059 and also to non-volatile storage 2065 and to display controller 2061 and to the input/output (I/O) controller 2067. The display controller 2061 controls in the conventional manner a display on a display device 2063 which can be a cathode ray tube (CRT) or liquid crystal display. The input/output devices 2069 can included a keyboard disk drives, printers, a scanner, and other input and output devices, including a mouse or other pointing device. The display controller 2061 and the I/O controller 2067 can be implemented with conventional well known technology. A digital image input device 2071 can be a digital camera which is coupled to an I/O controller 2067 in order to allow images from the digital camera to be input into the computer system 2051. The non-volatile storage 2065 is often a magnetic hard disk, an optical disk, or another form of storage for large amounts of data. Some of this data is often written, by a direct memory access process, into memory 2059 during execution of software in the computer system 2051. One of skill in the art will immediately recognize that the term "computer readable medium" included any type of storage device that is accessible by the processor 2055 and also encompasses a carrier wave that encodes a data signal.

It will be appreciated that the computer system 2051 is one example of many possible computer systems which have different architectures. For example, personal computers based on an Intel microprocessor often have multiple buses, one of which can be an input/output (I/O) bus for the peripherals and one that directly connects the processor 2055 and the memory 2059 (often referred to as a memory bus). The buses are connected together through bridge components that perform any necessary translation due to differing bus protocols.

Networks computers are another type of computer system that can be used with the present invention. Network computers do not usually include a hard disk or other mass storage, and the executable programs are loaded from a network connection into the memory 2059 for execution by the processor 2055. A Web TV system, which is known in the art, is also considered to be a computer system according to the present inventions, but it may lack some of the features shown in FIG. 14B, such as certain input or output devices. A typical computer system will usually include at least a processor, memory, and a bus coupling the memory to the processor.

It will also be appreciated that the computer system 2051 is controlled by operating system software which includes a file management systems, such as a disk operating system, which is part of the operating system software. One example of an operating system software with its associated file management system software in the Windows family of operating systems from Microsoft Corporation of Redmond, Wash., and the associated file management systems. The file management system is typically stored in the non-volatile storage 2065 and causes the processor 2055 to execute the various acts required by the operating system to input and output data and to store data in memory, including storing files on the non-volatile storage 2065.

A preferred embodiment of the present invention includes a system and method of escalating non-realtime communications in a contact center 100 having a hub and node architecture. An alternative tiered service model providing escalation and de-escalation of contacts in a multimedia digital contact center has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptions or variations of the present invention.

The terminology used in this application with respect to networks is meant to include all of network environments, including private wide-area networks and local-area networks. Therefore, it is manifestly intended that this invention be limited only by the following claims and equivalent thereof.

Referring to FIG. 2A, the preferred embodiment of the present invention describes a system and method to raise the effective availability of a VoIP subsystem both in call set-up and call continuation, thereby minimizing the last single point of failure to the gateway 110. The present invention addresses the problems listed above and overall substantially improves the availability of this solution over that of a standard VoIP solution.

FIG. 2A is an illustration of an interface between the PSTN 106 coupled to a contact center 100 by means of one or more gateways 110. The PSTN 106 is configured such that a contact 101 dialing in on a telephone 103 on a T1 or primary rate interface (PRI) circuit, may be connected to the contact center 100 through the Gateway 110. Alternative embodiments include any other TDM network 107 such as, but not limited to a private branch exchange (PBX) line or a tie-trunk circuit on a T1 or primary rate interface (PRI) circuit being connected to the contact center 100 through the gateway 10. The PSTN 106 transmits digital TDM data using one or more various protocols, including T1 protocol operating at 1.544 mHz, common to the United States, or an E1 protocol operating at approximated 2 mHz, and more common to Europe. At a T1 transmission rate of 1.544 mHz, an individual channelized T1 circuit can accommodate twenty-four separate channels at the G.711 voice encoding standard of sixty-four kilo-bits (64 kb) per second. As noted above, Europe commonly operates on the E1 protocol at a frequency of closer to 2 mHz. The E1 protocol is capable of supporting thirty two time division multiplexed channels using G.711 voice encoding for each channel. The circuit may also be an ISDN PRI circuit in one of many common formats.

A United States PRI typically has 23 B or bearer channels containing 64 kb encoded voice and one D or delta channel which contains signaling information. There are many minor variations of PRI signaling and variations within groups of digital circuits where redundant D channels may exist on two of the PRI circuits while other PR's in the group share these D channels so they can carry 24 B channels each.

Referring now to FIG. 2A, the function of the gateway 110 is to convert data from the PSTN 106, typically a twenty four channel time division multiplexed T1 signal to the data format of the contact center 100, and to convert signaling from the contact center 100 network back to a data format compatible with the PSTN 106. Because of the growing popularity of internet protocol due to operating cost reductions possible through the use of VoIP, gateways 100 are increasingly used to convert PSTN 106 data to a VoIP format within the communication network of a contact center 100. The twenty four channels of a T1 transmission are distinguishable by various digital codings separating the TDM channels. These digital codings contain channel information and some signalling information. The TDM G.711 transmission over the PSTN 106 can therefore be regarded as a TDM in 8-bit per time slot channels at 64 kb per second per channel transmission. That is, the amount of data used to distinguish channel breaks which distinguish one channel from another is minimal, and virtually all 64 kb per channel seconds are devoted to "real" data, such as voice data in a standard audio telephone call. TDM efficiently packs the voice data and signalling into a compressed and fixed format. In contrast, internet protocol is packetized and packet headers are required to separate and direct information to different "channels" or packets. IP packet headers comprise a moderate amount of overhead information. One reason that so little overhead data is needed in the T1 or PRI is that the twenty-four channels are addressed serially, in what could be considered a "fixed sequence" communication protocol, so that channel sixteen always follows channel fifteen. In contrast, internet protocol is not a fixed sequence format, but is based on availability of information that is in a packet ready to go with source and destination. Even among competing packets awaiting transmission from the same processing point, packet selection is limited to those packets that are queued. The system does not cycle through unused channels to examine whether they have any content. If a packet is not in a queue, no time is wasted on sending an empty channel. Accordingly, a specific "channel" (a packet defined by a packet header) is sent as often as it is queued and if the channel has capacity. Accordingly, if only four voice channels are queued, IP only needs to send packets for four channels and leaves the remainder of the data channel bandwidth available.

Still referring to FIG. 2A, the call data, including the calling number, the called number and possibly the forwarding number, is decoded by the gateway 10 and converted into SIP for use within the contact center. The gateway 110 will divide the encoded call from the PSTN 106 into an RTP portion and a SIP portion. The RTP portion will include the voice component of the encoded call to be changed to IP packets, while the SIP portion includes the call signaling data of the encoded call.

Packet networks have "from" and "to" destinations plus other overhead. In addition to the 64 kb per second per packet for real information such as voice data, the overhead information added to VoIP packet headers in the RTP stream can increase the total information for a channel to about eighty-four kilo-bits (84 kb) per second. When the T1 standard of 1.544 mHz is used within the contact center 100, it can be understood that, as a result of the large amount of overhead within packet headers of a VoIP network, the channel capacity of a VoIP network is typically reduced from twenty-four channels to about eighteen channels. However, it does permit sharing voice and data on the same circuit. This ability to share the same facilities can save operating costs. For example, ten agents could easily use a single wideband T1 for their voice and data needs with the voice component carried as VoIP all in the same T1. Traditional methods would have used two T1s, one for voice and the other for data.

The contact center 100 pictured in FIGS. 2A-2C includes several call centers which are accessible through HUB-A 115. The contact center 100 typically comprises a network configured for internal voice telephone routing. Most consumers are familiar with calling the "call-center" or "contact center" of various contact centers 100, such as service departments of software and computer companies, billing inquiries for cell phone usage, disputes and payments for credit cards, updates on claim processing of auto insurance claims, reservations with major air lines, etc. The interface and routing process begins when a customer calls the contact center 100 over the PSTN 106 through a telephone 103, or a customer is connected throught the PSTN 106 from a TDM network 107 such as a PBX or a tie-trunk circuit. Many enterprises are served by a "1-800" (toll free) exchange. According to the example of FIG. 2A, the contact center 100 interfaces with the PSTN 106 through an integrated services digital network (ISDN) 105. As discussed above, the voice channel capacity or PRI for a single ISDN 105 is typically twenty three or twenty four voice channels, depending on whether one of the channels has been reserved for call data as a D channel. The call enters the contact center 100 through the ISDN 105 into a gateway 110. The gateway 110 converts the G.711 protocol of the PSTN 106 into packetized data for transmission over an ethernet network serving the contact center 100. The ethernet packetization is divided into two forms, RTP and SIP. Voice components are transmitted in RTP and the call signaling data (source and destination of the call, busy signals, etc.) are transmitted in separate Ethernet packets according to the SIP.

As stated previously, the gateway 110 divides the stream into the SIP and RTP protocols. The SIP protocol containing the identification number (ANI) of the "A" phone (calling phone), and the dialed number identification (DNI) of the called phone is directed to the voice application server (VAS) 120. The VAS 120 is preferably an identical piece of hardware in each hub and node in the contact center and also preferably includes the services of a proxy 132, a media server contact bridge (media server) 134 and interface logic in the voice router 144 that interfaces the media server 134 with an application server 113. Every hub and node in the contact center 100 includes a VAS 120 and preferably, each VAS 120 includes the services described above. However, the VAS 120 of any hub or node can be configured with services tailored to the needs of the contact center 100. Also, each hub and node preferably includes an application server 113 having identical software, but not necessarily performing the same tasks.

Still referring to the preferred embodiment in FIG. 2A, the proxy 132 acts as a directory that is able to share information with the services included in the VAS 120. The gateways 110 associate with Hub-A must continually register with the proxy 132 in Hub-A to keep the proxy 132 current as to which gateways 110 are functioning and how they are functioning. In other words, the gateways 110 register with the proxy 132, as all gateways in any given hub must register with the proxy in that hub. Likewise, the local media server 134 of both the hubs and nodes are likewise registered with the proxy 132. If the services included in the VAS 120 do not continually register with the proxy 132 within pre-determined time periods as set by the contact center 100 administrator, the proxy 132 will assume that the resource is not available.

Various contact centers 100, from airlines to computer sales and support to credit card providers have different business needs and collect data relevant to the type of call being handled. These actions are stored in workflows in the application server 113. If the application server 113 in every hub is updated so as to have identical information, all hubs are, in a sense, equally equipped to handle an incoming call. However, the distribution of information depends on the policies of a given contact center 100. Therefore, in FIG. 2A, if the application server 113 is not competent to assist in a transaction, or the HUB-A 115 is not competent to assist a client, a call originally routed to HUB-A 115 can be re-directed to HUB B 117 (FIG. 2C) which is also equipped with a proxy sever 132, media server 134, and application server 113 in a manner similar to HUB-A 115. HUB-A 115 can also direct a caller to any of the nodes HOU, CHI, or STL (FIG. 2B), which are part of the contact center 100.

Within FIGS. 2A-2C, each node HOU, CHI, STL and B-1 through B-3 is connected to one or more agents 150. Although the present discussion is developed largely in terms of human agents 150, it will be readily understood that the use of personal agents 150 is not required in every application. An "agent 150" is simply designated herein as an end-unit which responsively acts to satisfy the caller's 101 request. Similarly, hubs and nodes are not required, but they offer more redundant locations to host workflow processing.

The function of a node is to channel a call to the proper agent 150, and to satisfy the needs of the agent 150 during the course of the call. Nodes are also able to function as hubs in certain situations, such as emergency routing, local voice traffic and contact reclassification. This can include accessing information stored in an application server 113 associated with each node or hub. Although it is possible that information required by HOU is spread out among computers associated with diverse hubs, according to the preferred embodiment, the application server 113 of HUB-A 115 comprises the information necessary to provide node HOU the necessary contact center 100 information to service callers 101 directed to its respective nodes HOU, CHI, STL. The node interfacing with the select agent 150 also updates the application server 113 continually with relevant information, including both caller 101 information (e.g., a caller 101 speaking with a specific agent 150 hangs up), and data (e.g., the caller 101 provides payment information for a credit card.). In operation, an incoming call is converted to RTP and SIP protocols by the gateway 110 and directed to a hub. Each gateway 110 also searches its own proxy table. The details of the operation of the proxy table will be discussed in further detail later in this description. The proxy table directs the gateway 110 to send a SIP inquiry to a particular proxy 132 in a particular hub. For explanation purposes, assume that the gateway 110 has determined that the proxy 132 in HUB-A 115 is the appropriate proxy 132 to send the SIP inquiry to, based on the information found in the proxy table in the gateway 110. The gateway 110 sends the SIP to the proxy 132. The proxy 132, having a directory of registered media servers 134 will forward the SIP inquiry to the appropriate media server 134 having properly and timely registered with the proxy 132. When this SIP inquiry reaches this assigned media server 134, the media server 134, through the voice router 144, will communicate with the application server 113, starting a workflow on that call in the application server 113.

Still referring to FIG. 2A, the gateway 110 will direct the RTP stream of the call to be connected to a particular media server 134. Again, for the purposes of explanation, the HUB-A 115 will be used. It should be noted that this operation as described may occur in any hub of the contact center 100. The application server 113 will then instruct the media server 134 in which the RTP is connected to transfer the RTP stream to the appropriate node. For illustrative purposes, the Node CHI (FIG. 2B) will be utilized as an example here. Again, the Node CHI includes a VAS 160 as depicted in HUB-A 115, and preferably includes the services as well, i.e., a proxy 162, a media server 164 with a voice router 166 having interface logic to an application server 170. The media server 164 of the Node CHI will instruct the gateway to disconnect the RTP stream from the media server 134 of HUB-A 115 and will direct the RTP stream to connect to the media server 164 of the Node CHI. This connection will start the application server 170 of the Node CHI, allowing the application server 170 to conference an agent 150 into the call by instructing the media server 164 of the Node CHI to connect with the agent 150. Still referring to HUB-A 115 and the Node CHI of FIGS. 2A-2B, as long as the RTP stream is connected to the media server 164 of the Node CHI, any agent 150 or supervisor or administrator with proper authority will be able to conference into that call by plugging into the media server 164.

When a call is inadvertently disconnected, a re-start call is required to put the call back to a place where it was when it was disconnected. For example, if the caller had already entered their account number and opted to speak to an agent that could handle billing inquiries, the caller, on re-start, would be placed in the next step in the workflow. That is, the SIP inquiry sent to the proxy would include key value pairs identifying that the caller had already entered his account number and selected a billing inquiry agent. While the concept of key value pairs will be explained in further detail later in this discussion, it should be noted that key value pairs are worked up, added and updated in the application server 113 and are transferred through the contact center 100 with the call. As this process is occurring, a copy of the key value pairs is forwarded to the gateway 110, the last single point of failure in the contact center 100.

Now going back to the routed call in the media server 164 of the Node CHI, the phone utilized by the agent 150 converts the RTP stream back into sound to facilitate a conversation between the agent 150 and the caller 101. According to one embodiment, the phone utilized by the agent 150 is a standard computer, and the conversion of the RTP stream is performed by software called a softphone and the use of a sound card. Alternatively, the RTP stream can be converted by an external plug-on USB adapter hooked up to a telephone head set of the agent 150.

Multiple Gateways

FIG. 2A discloses multiple gateways 110 available to interface between the PSTN 106 and HUB-A 115. Architectures incorporating only a single gateway are limited in that, if a single gateway 110 fails, the entire contact center 100 is shut down until the gateway 110 is brought back on line or replaced. The use of multiple gateways 110 therefore makes the contact center 100 less dependent on a single gateway 110.

According to a prior art model, a single gateway comprises twelve channels for interfacing between a PSTN 106 and a VoIP. In most real-world applications, the number of channels will be far greater than six or twelve channels. Because the prior art architecture utilizes a single gateway, if the gateway fails, all contact center 100 communications fail. It is the only interface between the PSTN and the VoIP.

Referring back to FIG. 2A, in the architecture of the preferred embodiment of the present invention, dual gateways 110, act to interface a total of ninety two channels. When both gateways 110 are operating at a full capacity of six callers 101 per gateway 110, their total capacity equals that of the gateway of the prior art. An advantage of utilizing multiple gateways 110 as illustrated by FIG. 2A is that if a gateway 110 fails, the contact center 100 will not experience catastrophic failure. The remaining gateway(s) continue to be functional. The illustration of a two gateway 110 network in FIG. 2A is illustrative. According to the multiple gateway 110 architecture, any number of parallel gateways 10 can be added. As more parallel gateways 10 are added, the failure of one gateway 110 accounts for a lower percentage of the total interface capability. For example, with only two gateways 110 as depicted in FIG. 2A, a failure of one gateway 110 reduced the channel interface capacity by 50%. In contrast, if a system comprised ten parallel gateways 110, the failure of one gateway 110 would only reduce the capability of the system by ten percent. Although the present invention envisions applications comprising as few as two or three parallel gateways 110, and as many as a thousand parallel gateways 110, according to the preferred embodiment, systems will advantageously comprise between four and twenty gateways 110.

Those skilled in the art will recognize that the numbers of channels contained in the gateways 110 depicted in FIG. 2A are exemplary only, and that in actual application, such interface architectures will advantageously provide interface capability for a far greater number of channels. Similarly, the number of complimentary gateways 110 is not limited to two gateways 110, a number selected for exemplary purposes only.

Referring to FIG. 2B, a third gateway 110 is illustrated as connected to the VAS media server 164 in the Houston Node, HOU. Although the architecture depicts nodes HOU, CHI and STL as components of HUB-A 115, this architecture can be nominal. The separate nodes can duplicate the functionality of the "master" components in HUB-A 115. An advantage to this can be understood by considering the centralized and de-centralized aspects of many modern contact centers 100. For example, ABC, a national automobile rental company, has a toll free number that it advertises on bill boards, free travel maps and other advertising media. According to the FIG. 2A, gateways 110 are located at the national center where some, or possibly all toll free calls are directed. A local telephone number (or several numbers) within the Houston area-code allows clients to call one or several Houston offices of ABC car rental company. Local calls are received directly through gateway 110 in FIG. 2B rather than over a LAN or WAN from the central office of HUB-A 115.

In this improved architecture of the present invention, the gateway 110 is the last single point of failure. The preferred embodiment of the present invention includes using a plurality of gateways 110 at each place where customer traffic connects to the PSTN 106. FIGS. 2A & 2B depict three gateways 110 in the VoIP architecture. Of course, more or less gateways 110 may be utilized as required. FIGS. 2A & 2B should in no way limit the present invention to three gateways 110. Referring back to FIG. 2A, the failure of a single gateway 110 will only reduce the overall capacity of this connection by a percentage of 20%-33%, depending upon the number of gateways 110, e.g., if one gateway 110 fails in a three gateway 110 system, a 33% reduction will be realized. The gateway 110 is designed to also be economically viable at this smaller size. A typical gateway 110 can be configured with one to four spans with each span capable of handling twenty three to twenty four live voice conversations. If a customer has a location with very low traffic that only needs part of one span, then they can order two spans and two one-port gateways to provide a solution that can tolerate the failure of either span and/or either gateway 110. Another example would be a customer that needed sixteen spans to carry their load who might buy twenty spans, and five four-port gateways 110. This would permit the failure of any single gateway 110 while still providing the needed capacity.

Prioritized Proxy Server Table

Referring first to FIG. 2A, multiple proxy servers such as proxy server 132 can be placed in parallel. When a call comes in, the SIP stream can then be routed to all parallel proxy servers simultaneously. Disadvantages of a parallel approach, however, a lot of unnecessary parallel work occurs. Moreover, both the incoming SIP stream, and the responsive traffic generated by multiple proxy servers increases the amount of network traffic. FIG. 15 illustrates a proxy server table 300 for selecting proxy servers among a plurality of proxy servers according to a priority scheme. As discussed in conjunction with FIGS. 15 and 16, when the gateway 110 in FIG. 2A receives an incoming call, it seeks an operational proxy server according to the prioritization of servers listed in table 300 of FIG. 15. Within the proxy table 300 of FIG. 15, each proxy server is identified by an address in the proxy address field 302. The proxy address field 302 is shown for exemplary purposes only and the table 300 should not be construed as having the only possible set of proxy addresses. In conjunction with each proxy address 302, the table 300 comprises a time-out value 304. The time-out values 304 are illustrated in milliseconds. If the first proxy server (in this example 192.168.0.1) in the proxy server table 300 does not respond within 36 milliseconds, the gateway increments to the next level 306 one proxy server address 302, which is address 192.168.0.2. The time-out value 304 for proxy 192.168.0.2 is listed as 120 milliseconds. If proxy 192.168.0.2 does not respond to the SIP inquiry from the gateway 108 in the allotted time, the system then seeks a response from proxy 192.168.37.1, which is shown to be a level 2 priority in FIG. 15. According to this system of prioritization, the contact center 100 (FIGS. 2A-2C) can insure that the most appropriate proxy server handles an incoming call. There are two level-one proxy addresses in the proxy table 300 of FIG. 15.

Still referring to FIGS. 2A-2C and 15, exemplary time-out values 304 are listed in the table 300 in correlation to their respective proxy servers, which are identified by address 302. The first proxy server, address 192.168.0.1 and further identified as the proxy server 132 of FIG. 2A has a time-out value 304 of only thirty-six milliseconds. According to the preferred embodiment, servers that can respond more quickly are located at a higher level in the level field 306, and servers that will respond more slowly are designated at a lower level in the level field 306, according to the level field 306 of table 300. As illustrated in table 300, in most applications of the present invention, proxy servers listed in the lower levels of the level field 306 will advantageously be assigned a longer time-out 304 period than the proxy servers listed at higher levels 306. Embodiments are envisioned however wherein some higher level 306 proxy servers will be assigned longer time-out 304 periods than some lower level 306 proxy servers. Proxy server of address 192.168.0.2, which may be located in the VAS media server of FIG. 2A, has been assigned a time-out 304 period of 120 ms according to the FIG. 15. Both proxy servers 192.168.0.1 and 192.168.0.2 are "level 1" 306 proxy servers and are not distinguished by pointers 308, the function of which is described in greater detail in conjunction with FIG. 16.

According to the preferred embodiment, when proxy servers of a same level 306 are not distinguished by a pointer 308, the process always begins with the first sequential proxy server, which is 192.168.0.1, and advances only to the next server at that level 306, 192.168.0.2, only if the previous server times out. In level 1 of the table 300, the proxy server addresses 192.168.0.1, 192.168.0.2. and any other address that may appear in level 1 more typically points to a local hub proxy. In level two of the table 300, the proxy server address 192.168.37.1 more typically points to a proxy in a remote hub, while the level 3 proxies point to a node. A table in a typical gateway may be different from other gateways in the same system because it may be more effective to speak to a proxy local to the gateway. As noted, the server in the VAS media server 134 in FIG. 2A is on the same local area network (LAN) as HUB-A 115, and is therefore more quickly accessed than the other proxy servers 162 which are accessible only through a wide area network (WAN). The proxy server in VAS media server 134 is therefore assigned a "level 2" 306 priority in FIG. 15, whereas proxy servers 162 are assigned a "level 3" 306 priority in FIG. 15. In the case where there are no additional entries in the proxy address field 302 with a corresponding number in the level field 306, the caller 101 will be routed to a default mode (as depicted in the proxy address field 302 of the proxy server priority table 300). Preferably, when a caller 101 enters the default mode, the caller 101 is notified that the contact center 100 is unavailable and therefore can not answer the caller 101 at this time. This notification is preferably followed by a "fast busy" signal indicating that the caller 101 has been disconnected and should call back at a later time. By managing the incoming calls from the gateway 110 according to a proximity server table 306 as in FIG. 15, redundancy is built into the system through the use of existing proxy servers, thereby increasing the reliability and overall speed of the system with little additional hardware or other expenses. By spreading the workflow through the use of pointers 308, the individual nodes will evenly share the unexpected load caused by the extra traffic that would normally have been handled by proxy servers at level 1 or 2.

Figure 16:
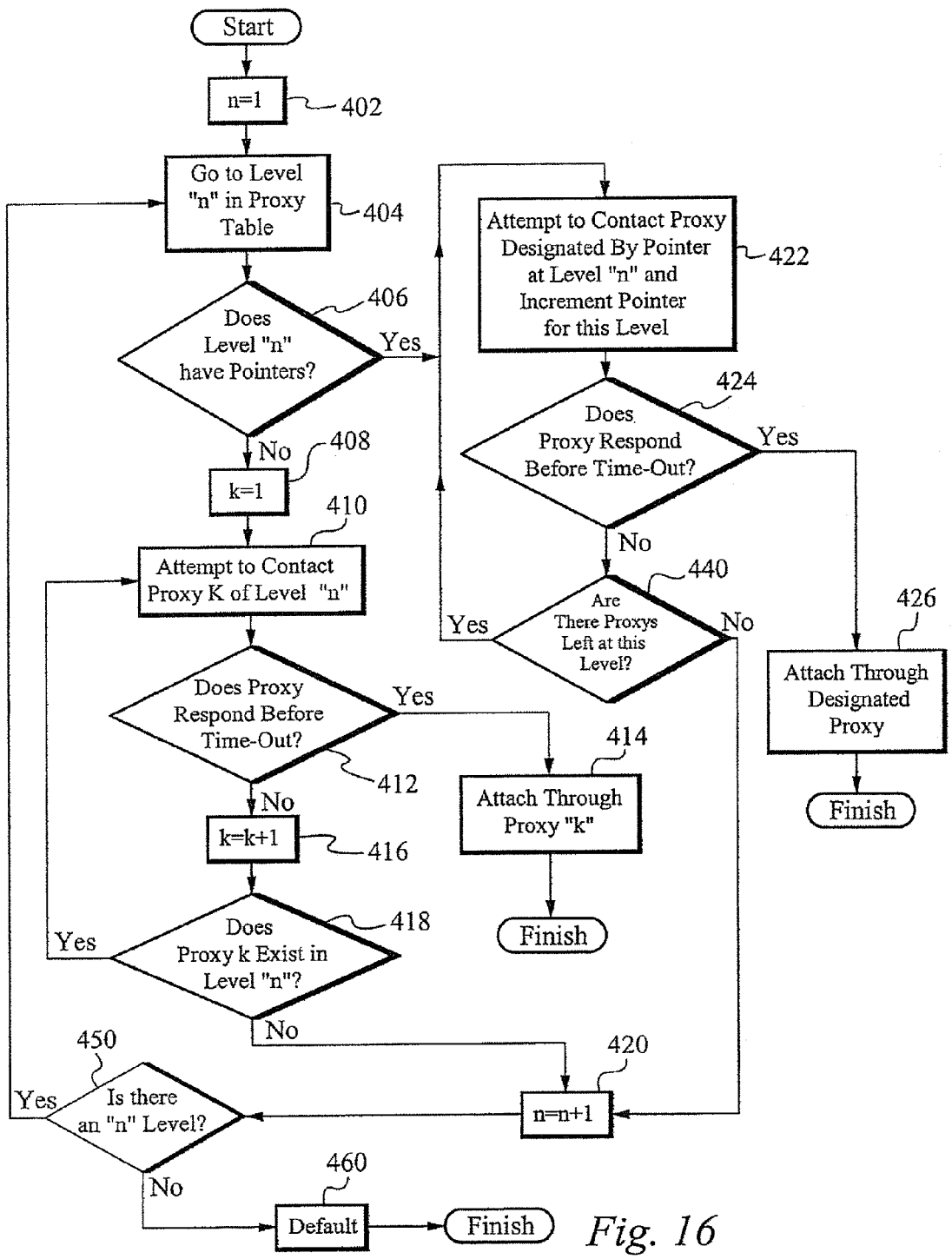
FIG. 16 illustrates a flow chart of an embodiment of the present invention.

The table of FIG. 15 is explained in conjunction with the method disclosed in FIG. 16. In the step 402, the level "n" (306) of FIG. 15 is set to "1." In the step 404, the level "n" proxy servers within the table are identified. In the step 406, if level "n" has pointers, the process advances to the step 422, wherein contact is attempted with the proxy designated by a pointer and the pointer is incremented to the next proxy for this level. In the step 424, if the proxy responds prior to the time out, the gateway attaches through the proxy designated by the pointer in the step 426 before the method ends. If the proxy does not respond before a time out in the step 424, it is then determined whether there are any proxies left at the current "n" level in step 440. If there are no proxies left, then the level is incremented in step 420. However, if there are proxies left, the method returns to the step 422, and attempts to the next proxy in that particular "n" level. The advantage of the steps 422, 424, 426 and 440 can be understood in that proxy servers at a level requiring pointers are not the primary proxy servers, and are only invoked when the primary or preferred proxy servers fail to answer. As a result, the proxy servers at level 3 (306) of FIG. 15 are connected by WANs to the gateway 110, which is a slower transmission medium than a LAN. Proxy servers 132, 162 have already been assigned different tasks associated with their nodes and ideally should not be overloaded with all incoming calls that have been dropped by an offline system. By assigning pointers and rotating through the available third level proxy servers, the system will avoid overloading one of the lower priority proxy servers and optimally share load when the primary proxies are not responding.

Returning back to the step 406 in FIG. 16, if level "n" does not have pointers, it is preferably a higher level proximity server and the method advances to step 408. However, embodiments are envisioned wherein higher level proxy servers are identified by pointers 308 as well. In the step 408, the sequential proxy number "k" is set to "1." This sequential proxy number is not to be confused with the proxy address, the proxy number being unrelated to the sequence of listing within the proxy table. In the step 410, contact is attempted with proxy "C" of level "n." If, according to the step 412, the proxy responds before the time out is reached, according to the step 414, the SIP stream attaches through the identified proxy, and the method is again finished. If according to the step 412 the proxy does not respond before the time out, then according to the step 416, the value "k" is incremented by "1." In step 418, if the sequential proxy "k" exists, the method returns to the step 410, and an attempt is made to engage the newly identified proxy. If no proxy "k" exists at that level, the level "n" is incremented by "1" in step 420. After the level "n" is incremented in step 420, it is determined in step 450 whether there is a level "n." If there is a level "n", then the step 404, identifying the next level of proxy servers. However, if no "n" level exists, the default step 460 starts. Preferably, the default step 460 notifies the particular caller that the system is experiencing technical difficulty. Preferably, this notification is followed by a "fast busy" signal and then the method is again finished.

Another aspect of the preferred embodiment of the present invention is realizing that network elements occasionally fail, and unlike a standard VoIP call that just hangs until one or the other parties disconnect, we would prefer to restart the call and if possible reconnect to the original agent 150 or party. In the contact center 100, time is spent when the contact initially is connected to the system identifying who they are, what they want to do, etc. This information is used to route the call to an appropriate person. In many cases there are multiple agents 150 who can help the person in an equivalent manner. The idea is to save application specific information about the call at the gateway as the call progresses through the system. If the call is broken by the failure of the network itself or by a network element such as a conference bridge or a rebooting PC, the gateway 110 can maintain the connection to the caller 101 and re-present the call to the system with the accumulated application specific data. The system can then determine this is not a "new" call, but instead is a call that was in progress and using this information restart the call, perhaps back to the original destination agent 150, or at least to one that has similar skills. Also, voice prompts could be played at the gateway, or by network devices along the way that inform the original caller 101 to the effect that "we are sorry to inform you that we are experiencing network difficulties but are attempting to re-route your call, please hold."

If a contact center 100 node went offline, a call being restarted via this method would likely need to be put on hold, waiting for an agent 150 with the right skills to become available elsewhere. In this case the call would ideally be given a high priority to be handled before others who were not unexpectedly disconnected, and an informative greeting would be played to the caller 101 telling them something to the effect that "we regret we were unable to re-connect your call but we are putting you on hold while we locate the next available agent 150. Using the SIP protocol, this scheme is implemented by using the session description protocol (SDP) body 503 and as the call progresses through various network devices such as media servers and conference bridges, application specific data is transmitted as it is accumulated to the gateway 110 using data in the SDP body 503 along with the call signaling.

Referring to FIG. 2A, the gateway 110 accumulates this information and optionally presents all information it has collected when a call is restarted. A new call that is initially connecting starts with only the incoming call's number dialed and the calling party's number (DNIS and ANI as well as trunkgroup, tunkid, etc.). As the call interacts with HUB-A 115, things such as an account number, a call type classification, customer ranking (gold, platinum), etc. are typically added to this information stored by the gateway 110. After a failure, which the gateway 110 detects by either a SIP message to that effect, timeouts of the SIP protocol to the connected element(s), or the interruption of the RTP to the gateway 110 will initiate this restart with the accumulated application data. In a regular VoIP network, if the RTP stream fails, the gateway will simply hang up or the caller 101 hears nothing and usually "gives up" and disconnects after waiting 20-50 seconds and then calls back. In this preferred embodiment, the restart sequence will initiate typically within 4 seconds. By the time 3 seconds of RTP is missing, something is seriously wrong, yet the caller 101 is still available to re-route the call. This concept is explained in further detail below.

Recovery After Loss of Signal

The ability to recover quickly and seamlessly from a voice connection failure is an important aspect in preserving satisfaction and good will among clients calling into a contact center. Referring again to FIG. 2A, assume that a call enters the contact center 100 from the PSTN 106 at gateway 110 and is routed to an agent 150 in the HOU node through the VAS media server 164. Assume further that the RTP stream carrying voice data that is routed through the VAS media server 164 fails. In such an event, both the calling party and the agent 150 hear nothing. The parties typically make inquiries for a few moments to see if they are still connected, and then hang up, as few as in ten seconds or less. Transmission faults of this nature are not uncommon to telephony, and can occur as a result of any number of faults, including a faulted VAS media server 164, a faulted data network, or a faulted telephone of the agent 150. Telephone faults are increasingly prone to occur as network contact centers 100 move toward computer based telephones. If an agent 150 is speaking with a customer through a computer or if the computer crashes, the connection is terminated. Moreover, many digital devices are repaired "on the fly" with replacement parts pulled out and re-inserted while the network is in use. Such repairs interrupt the data stream at least until the replacement part is re-inserted. If re-booting is required, the recovery time can be even longer. If, for example, a router is replaced in a span of forty-five seconds, thereby interrupting a data stream for that time period, most consumers will have hung up before service is resumed. For this reason, from consumer standpoint, on-the-fly repairs are virtually indistinguishable from system faults. Both constitute "apparent" system failure.

Private branch exchange (PBX) networks are the in-house telephone switching systems that interconnect telephone extensions to each other as well as to the PSTN 106. PBXs are increasingly incorporating VoIP capability. The digital faults of a VoIP network are therefore more commonly imposed on PBX networks. In contrast to the apparent system failure rate of software driven/router enabled internet and VoIP networks today, the historic failure rate of the PSTN 106 is relatively low. Because of this low level of system reliability over the PSTN 106, the average consumer expects high levels of system reliability from PBXs and VoIP networks. As noted, however, the typical means of fault correction in a VoIP network is for a party to hang up and re-dial. Moreover, for true system faults, such as a VAS media server 134 going down, this is basically the only means of recovery in a conventional VoIP design.

The costs of such a call to a consumer include actual monetary expenses, the time to dial, time spent on hold, which is often three to five minutes, and sometimes twenty to thirty minutes, the time spent explaining a problem or request to an agent 150, any time spent being re-routed to different agents 150, etc. In other words, customer satisfaction will suffer greatly. If a disconnect occurs, most often, there is no "quick" way back in the system. The customer must repeat the process. Moreover, no benefit typically inures to a caller 101 until the end of a call, wherein an order is placed or a grievance settled. For these reasons, when a customer is disconnected or forced to hang up prematurely, the cost/benefit ratio becomes infinite. That is, there have been costs in time, energy, and possibly monetary expenses, but no benefits to the caller 101. This can create extreme frustration, particularly if the delays or costs have been significant. The dialing, the waiting, the routing from operator to agent 150 to find a proper agent 150, and the discussion with the agent 150 must then be repeated by an already frustrated customer.

Call Restoration Data Tables and Key Value Pairs

Figures 17, 18:
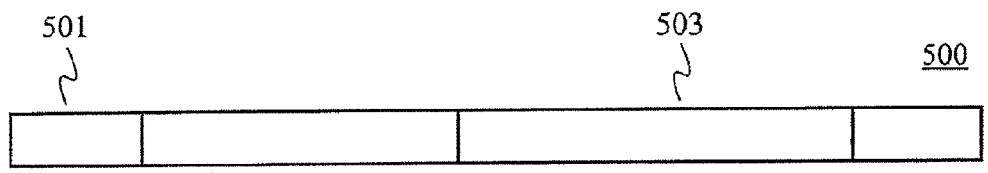
FIG. 17 illustrates SIP user data that is being accumulated during the contact's progress through the contact center of the present invention.
FIG. 18 illustrates exemplary call restoration data tables of the present invention.

The present invention envisions storing active call data in a data table, preferably within a gateway 110, so that if a call is interrupted through a system failure, the call can be re-connected with minimal difficulty. FIG. 17 illustrates a SIP packet 500 including header 501, and a SDP body 503. The data within the session description protocol (SDP) body 503 includes data essential to the connection, such as the ANI, the DNI, etc. It should be understood that the SIP packet 500 contains standard SIP data in addition to the header 501 and the SDP body 503. The SIP packet 500 as depicted is exemplary only and has been simplified for the purposes of this disclosure to show that the SDP body 503 is an extension to an existing SIP packet 500. The SDP body 503 will contain key-value pairs.

The following description of FIG. 18 will describe one of many embodiments of the present invention pertaining to the organization of the SDP body 503 containing key-value pairs in the gateway 110. FIG. 18 is one example of such organization and should not be construed as the sole embodiment.

Data from the SDP body 503 is stored in the call restoration data table 600 shown in FIG. 18. The call restoration data table 600 is preferably a digital memory table located within the gateway 110 on a calling user channel basis. As a result of storing back-up call data within a call restoration data table 600, if a component fails such that the voice connection between two parties is severed, even if the SIP stream fails, the call data can be retrieved from the call restoration data table to facilitate re-connection of the parties. FIG. 18 includes a call restoration table 600, illustrating the storage of values including those values stored within the SDP body 503 of the SIP packet 500.

FIG. 18 represents the data as stored in a digital storage device, typically each gateway 110, somewhere in the call center of the contact center 100. Because it is envisioned that the data within the table is provided by the SIP stream, according to one embodiment, the data in the table 600 is identical to the data in the SDP body 503 of a SIP packet 500. According to alternative embodiments, however, there can be data within the table 600 which was not received from the SIP stream. These figures are therefore discussed concurrently. Table 600 embodies dual codes or "key-value pairs," wherein the left hand registers 602-612 define the purpose or function of the values in the right hand registers 612-622.

The fields or registers of table 600 can be of varying sizes depending on the amount of data required. According to the present invention, as a call comes into the gateway 110, the ANI and DNI are inserted into the table 600. As illustrated in FIG. 2A, the SIP stream is routed from the gateway 110 to the VAS 120. Data added to the table 600 is drawn from a variety of sources. Within table 600, the left hand fields 604-611 represent "field option" codes, and the right hand "value" fields represent the corresponding values assigned to the field options. For example, "Incoming Caller" defines a function as a calling party number or ANI number in field 604. The adjacent value field includes "214-555-1212" which represents the actual phone number of the incoming caller 101. The second field option in table 600 is the "call purpose" field 606, represented here by "Billing Inquiry." The purpose of the incoming call 602 is a billing inquiry 616. The determination that the caller's 101 purpose was a "billing inquiry" could have been made according to menu options selected by the caller 101. Alternatively, the phone number through which the caller 101 contacted the enterprise could be a line reserved for billing inquiries. Credit card companies, for example, often have dedicated lines to report lost or stolen credit cards.

The field option 611 contains "DNI" (dialed number identification) indicating that the adjacent field 622 contains the phone number originally dialed, illustrated as a toll-free number "(1-800-246-1000)." The fields in table 600 are exemplary only, and any number of other fields can be present as well. According to the preferred embodiment of the present invention, however, table 600 will always include the ANI or calling number, and the DNI or called number.

An important function of the data depicted in FIGS. 17 and 18 relates to restoring communication when the RTP stream is cut off. According to the present invention, the gateway 110 is configured to detect that the RTP stream has been interrupted. In the event that the gateway 110 determines that the RTP stream has been interrupted, the gateway 110 re-sends the call to the VAS 120 complete with the data in table 600. The caller 101 would be given a warning such as ". . . we are currently experiencing technical difficulties . . . " or ". . . please hold while we re-route your call . . . " and then the call would be re-presented to the VAS 120 for handling using the collected data. A copy of the data is stored as key-value pairs at the gateway 110 for emergency recovery use. The actual variables are stored and passed within the regular workflow. Similarly, if any element failed other than the gateway 110, the data record would identify that the call had been to agent 150 in the HOU node. The call center could route the RTP stream of the call to the VAS/media server 164. Detection of a line fault and re-routing facilitated by a data table such as table 600 can be accomplished so quickly that the inconvenience to the caller 101 and the agent 150 is minimized.

The ability to recover quickly and seamlessly from a voice connection failure is an important aspect in preserving satisfaction and good will among clients calling into a contact center. Referring again to FIG. 2A, assume that a call enters the contact center 100 from the PSTN 106 at gateway 110 and is routed to an agent 150 in the HOU node through the VAS media server 164. Assume further that an element in the path of the RTP stream carrying voice data that is routed through the VAS media server 164 fails. Such element may be an RTP endpoint, namely the agent 150 in the HOU node or the VAS media server 164, or a network infrastructure element—a router or a switch. In such an event, the gateway 110 will immediately receive a notification from the closest functioning router, or in the case of an RTP endpoint application failure—from the operating system that was hosting that application. Such notifications are dispatched using internet control message protocol (ICMP). Once the gateway 110 receives an ICMP notification that one or more of the RTP packets it dispatched has failed to reach its intended destination, it takes steps to restore the call.

Because gateways are often designed with more hardware and less loadable software, gateways are often one of the lower failing members of a network. Accordingly, a call data table 600 can advantageously be stored in each gateway, thereby minimizing the possibility of losing the call data table 600 due to a component or system level failure. Moreover, by maintaining parallel gateways as discussed above, and recording the table 600 in multiple parallel gateways, even if one gateway 110 fails, a table 600 exists in each gateway. By this redundancy, if some part of the network other than the gateway 110 fails, the RTP signal can still be re-established by the table 600 in the gateway.

Remote Agent Access

The preferred embodiment of the present invention addresses the problems that occur when an Agent 150 takes customer calls while not in the high QoS environment provided by the Contact Center 100. In other words, the present system and method address the QoS problems associated with remote Agent 150 access to the Contact Center 100.

Figure 19:
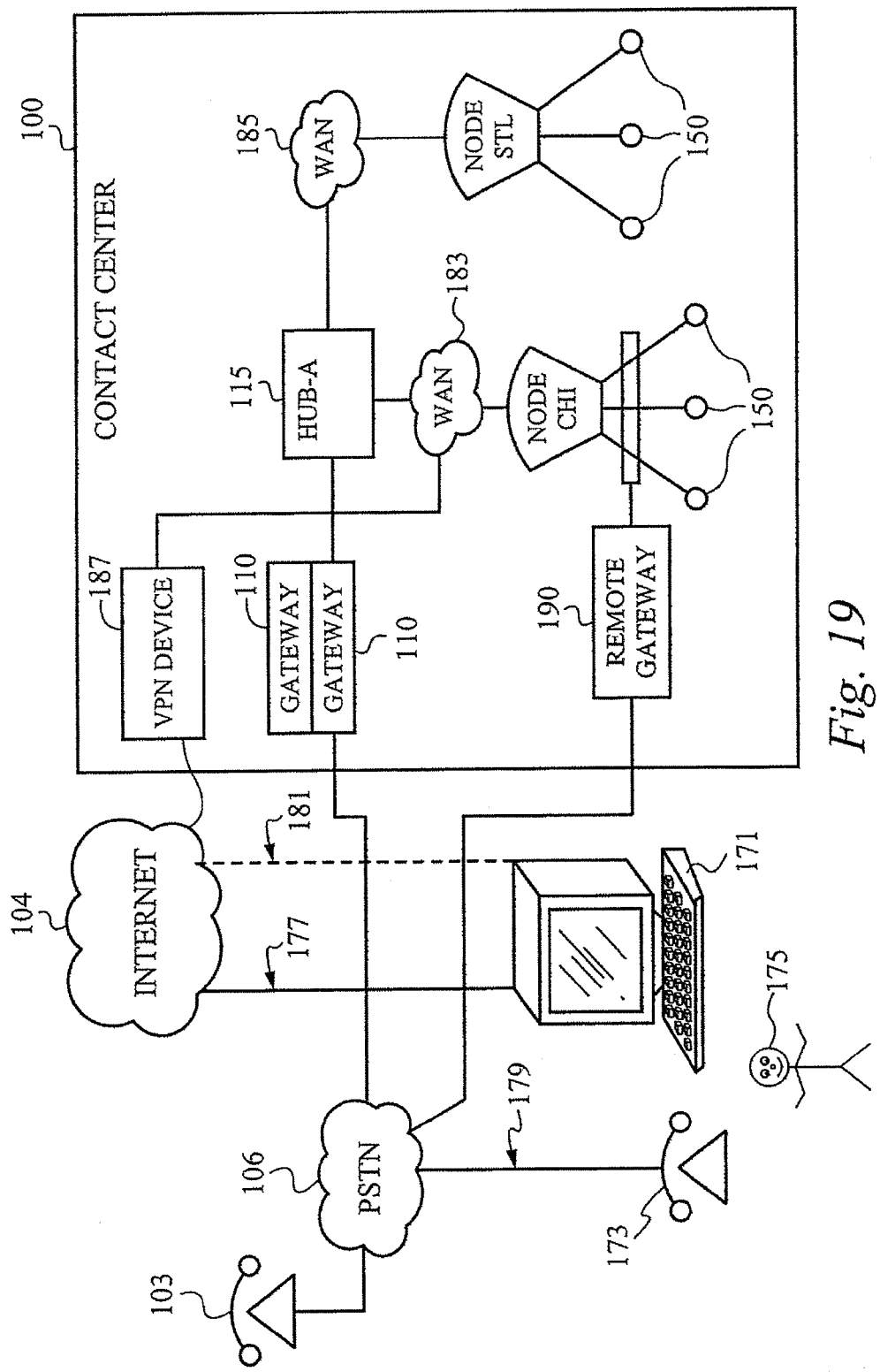
FIG. 19 illustrates a graphical representation of remote agent access to a contact center of the preferred embodiment of the present invention.

FIG. 19 describes a system and method to interface a remote Agent 175 to a VoIP Contact Center where the Agent 175 does not have economically viable access to the high QoS digital network provided in the Contact Center 100. For illustrative purposes, the Contact Center 100 in FIG. 19 is a simplified version of the Contact Center 100 in FIGS. 2A-2C. It should again be noted that an Contact Center 100 of the present invention can include any number of Hubs 115, Nodes (Node CHI, Node STL), Agents 150 and Gateways 110, depending on the specific needs of the Contact Center 100.

Still referring to FIG. 19, the system and method of the present invention includes splitting the voice and data traffic apart and carrying the CRM Application data from the Remote Terminal 171 on regular Data Circuits 177 such as DSL or Broadband Cable using VPN Software and a remote data access device 187 to access the Contact Center 100 over the internet, while moving the Agent's 175 voice component back through a Phone Line 179, to the PSTN 106 and into a Remote Gateway 190. The Remote Gateway 190 is connected to the WAN 183 or a LAN depending on the particular node. This is accomplished by taking the VoIP voice component called the Real Time Protocol (RTP) data stream that would normally go to the Agent's 175 softphone in the Remote Terminal 171 or IP hardphone (in a non-remote configuration such as that of an Agent 150 in FIG. 2A) and redirect it back to the Remote Gateway 190 that can make phone calls on the PSTN 106.

When the Agent 175 logs into the Contact Center 100 through the remote data access device 187, the Agent 175 can indicate that he or she is operating remotely and specify the phone number of the Phone Line 179. This number would then be called by the Gateway 110 and all RTP traffic normally headed for the Agent's 175 softphone or hardphone will go to the Gateway 110 and then through the PSTN 106 to the remote Agent 175 via the Phone Line 179 and the Phone 173. In a preferred embodiment, this call would remain connected until the Agent logged out at the end of an Agent's work shift, and all the various call controls, both audible on the Phone 173 and/or audible and visual controls on the Agent's 175 Remote Terminal 171 desktop would control the beginning and end of calls.

However, an alternative embodiment may include the Remote Gateway 110 calling the Agent 175 through the PSTN 106 and Phone Line 179 and disconnecting for each and every call, thereby initiating a new call for every customer call.

Also in the preferred embodiment of the present invention, the operation of the remote Agent 175 access of FIG. 19 will include the Agent 175 logging into the Contact Center 100 through the remote data access device 187 as described above. However, in instances when a Remote Gateway 190 exists, i.e., the Agent 175 is logging in to a Node (such as NODE CHI in FIG. 19) that is within a local phone call range of the Agent 175, the Node will connect to the PSTN through the Remote Gateway 190. This ability to connect remotely to local nodes is able to save the Contact Center 100 administrator money while reducing traffic in the hub (HUB-A).

The data portion of the communication between the Agent 175 and the Contact Center 100 to provide the client side of the CRM Application and to operate the Contact Center 100 call handling can be covered by consumer grade high speed access to the Internet 104 at relatively low prices.

The system and method described in FIG. 19 make it possible for the Agent 175 to operate from anywhere a Data Circuit 177 and an Analog Phone Line 179 exist. Obviously one example would be an Agent 175 who works from home, but a more interesting one would be an Agent 175 who has a wireless network enabled PC and happens to be somewhere they can access both an Analog Phone Line 179 and a wireless network having a Wireless Data Circuit 181 to the Internet 104. In this scenario, an Agent 175 at an airport could connect to the Contact Center 100 by going to one of the wireless access points at the airport that also has a telephone, such as an airline club lounge or use their cellphone.

Referring again to FIG. 19, the preferred embodiment of the present invention includes the Contact Center 100 incorporated by reference previously in this document. As stated earlier, FIG. 19 depicts a simplified version of the Contact Center 100 incorporated by reference for simplicity of description. However, it should also be noted that further embodiments may include Contact Center 100 architectures that differ from that of the preferred embodiment as depicted in FIG. 2A and FIG. 19 as the present invention of a system and method of providing high QoS to a remote Agent 175 may also be applied to other Contact Center 100 topologies.

In the preferred embodiment of the present invention, the Contact Center 100 includes, in addition to the Hub and Node topology incorporated by reference, a remote data access device 187 such as, but not limited to, a Virtual Private Network (VPN) Device and a Remote Gateway 190. The remote data access device 187 is coupled to the Internet 104. An Agent 175, working remotely from a Remote Terminal 171 having VPN Software compatible with the remote data access device 187, logs into the Contact Center 100. The Remote Terminal 171 is coupled to the Internet 104 with a high speed connection including a Data Circuit 177 such as DSL or Broadband Cable, or a high-speed Wireless Data Circuit 181. Such a connection allows an Agent 175 to access the Contact Center 100 via the remote data access device 187.

After the Agent 175 accesses the remote data access device 187, the Agent 175 logs into the particular Node (NODE CHI, NODE STL) to which they would normally be connected when they are not working remotely, but rather as an in-house Agent 150. For illustrative purposes, the Agent 175 logs into the Node (NODE CHI) through the remote data access device 187 via a Data Circuit 177 connection to the Internet 104. After the Agent 175 has logged in by providing the Node (NODE CHI) with the telephone number of the Remote Telephone 173 the Agent 175 will be using to conduct customer calls from, the Remote Gateway 190 will call the Remote Telephone 173 through the PSTN 106. Once the Agent 175 answers the call, the Remote Gateway 190 will send the Agent 175 a customer call and the Node (NODE CHI) will simultaneously send the Agent 175 the data for that particular customer via the Internet 104 connection to the Agent's 175 Remote Terminal 171. Alternatively, the Gateway 110 will send the Agent 175 a customer call and the Node (NODE CHI) will simultaneously send the Agent 175 the data for that particular customer via the Internet 104 connect. It should be understood that both the Remote Gateway 190 and any other Gateway 110, may initiate the call to the Agent 175 in further embodiments of the present invention.

In a preferred embodiment, the Remote Gateway 190 only makes one call to the Remote Telephone 173, allowing the Agent 175 to serially answer multiple customer calls on one long phone call from the Contact Center 100 in an "always connected" mode. Alternatively, the Agent 175 may disconnect the call from the Remote Gateway 190 (or Gateway 110) after every customer call, thereby requiring the Remote Gateway 190 to make a separate call to the Remote Telephone 173 for every customer call received in the Node (NODE CHI) from the PSTN 106 in a "connect on demand" mode. This is possible because all the Agent 175 call signalling is controlled through the graphical user interface of the Agent's 175 Remote Terminal 171. While these calls may be initiated by the Agent 175 it is preferable that the Contact Center 100 call out to the Agent 175 in both the "always connected' mode and the "connect on demand" mode, as corporate calling plans will typically allow a less expensive cost for phone connection, and will group billing costs together for the corporation to pay on a single bill. This eliminates the need for employees creating expense reports for any monetary phone usage charges.

Referring still to FIG. 19, when the Agent 175 is done with his or her shift or cannot stay remotely connected, the Agent 175 logs out of the Contact Center 100 through the Remote Terminal 171 and hangs up the current call on the Remote Telephone 173. The Agent 175 prevents additional calls from the Remote Gateway 190 or Gateway 110 by logging out of the Contact Center 100.

Figure 20:
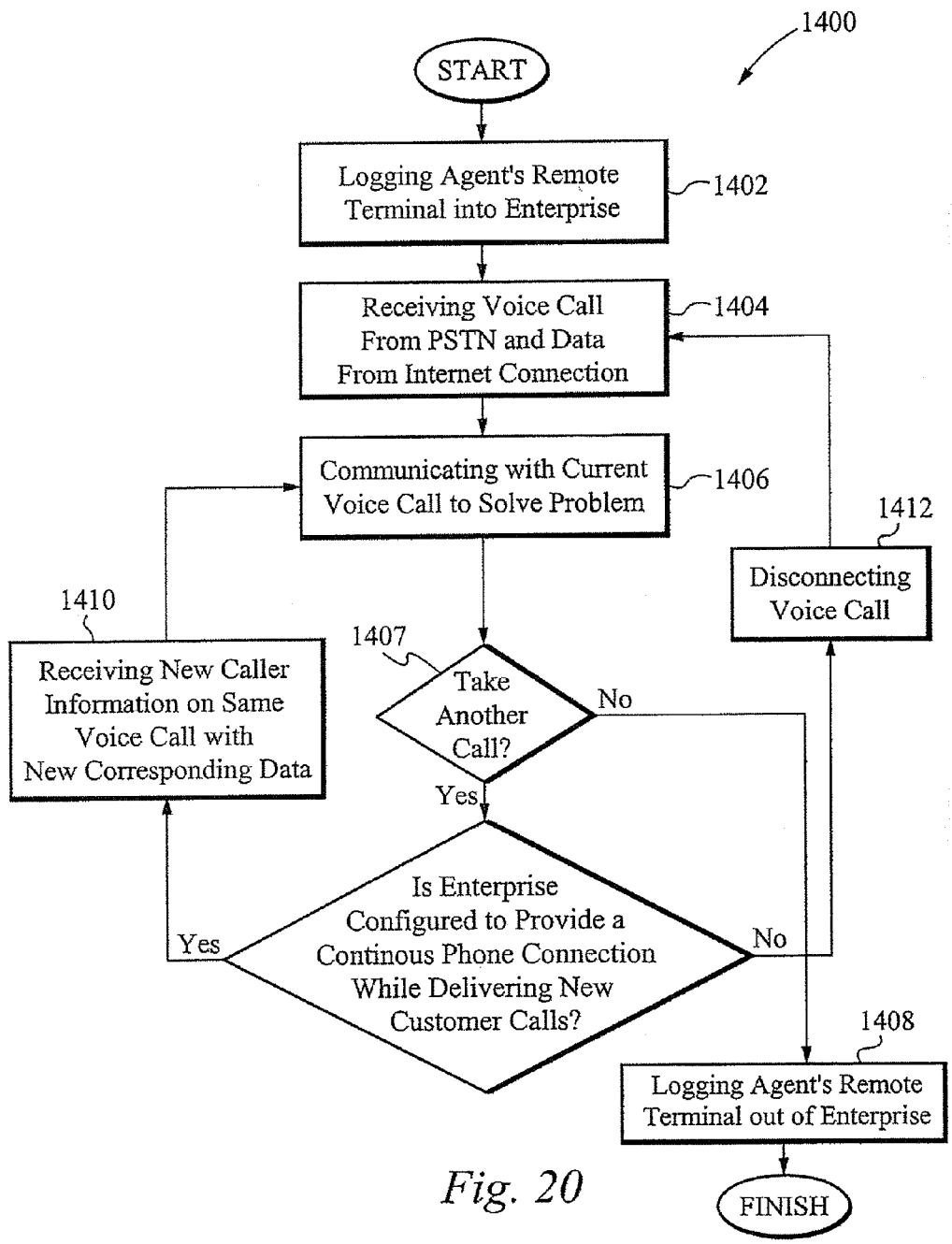
FIG. 20 illustrates a flow chart representation of the method of remote agent access of the preferred embodiment of the present invention.

A method of the preferred embodiment of the present invention is depicted in FIG. 20. A remote agent initiates a customer call session 1400 by logging a remote terminal into the Contact Center in Step 1402. The agent then receives a voice call from a PSTN connection to the Contact Center, and corresponding data from the internet connection to the enterprise in Step 1404. The agent then communicates with the customer to answer that customer's questions, solve a particular problem, etc., in Step 1406. After the agent completes a call, the agent must decide whether he or she would like to take another call in Step 1407. If not, the agent's remote terminal is logged out of the enterprise and the customer call session 1400 is completed in Step 1408.

Still referring to FIG. 20, if the agent does wish to take another customer call, in the preferred embodiment of the present invention, the enterprise is configured to provide multiple calls over one continuous phone connection. In this case, the agent will receive another voice call and corresponding data in Step 1410. Again, these two components will be received just as in Step 1404. After receiving the new customer call, the agent will again communicate with the caller in Step 406. Alternatively, if the enterprise is not configured to provide a continuous phone connection for multiple customer calls, the current customer call will be disconnected in Step 1412 and a new customer call will be initiated by a new and separate phone call to the agent in Step 1404.

Escalation

In the preferred embodiment of the present invention, the Contact Center 100 depicted in FIGS. 2A-2C is preferably used to implement the present invention. Contacts 101 access the Contact Center 100 through the Internet 104 using any type of personal computer or other personal internet interface 102 connected to the Internet 104. The Contacts 101 are routed to appropriate Agents 150 by the Hubs 115, 117 and Nodes (Node CHI, Node STL, Node HOU, Node B-1, Node B-2. Node B-3), so that the Agents 150 may assist the Contacts 101 with a variety of goods and services, depending on the particular Contact Center 100. Likewise, other realtime customer contacts such as chat and web collaboration requests are also routed to the Agents 150 in this manner. For simplicity in explanation, all of these possible contact types will be referred to as "communications" in describing the preferred embodiment of the present invention.

Referring again to FIGS. 2A-2C, the preferred embodiment of the present invention is a hybrid approach that places incoming non-realtime communications in a deferred workflow, which will transfer communications having immediate service tier requirement such as communications from a preferred (e.g. "Platinum") customer or some other immediate service tier requirement to an immediate workflow, where the communication will be routed to designated Agents 150. Those communications not having immediate assistance requirements are placed in shared file folders in the particular Hub (Hub-A, Hub-B) for which the communication is assigned for Agents 150 to pick from, and when that communication is nearing it's SLA limits, e.g., a callback having a one hour SLA limit might be at fifty minutes, the communication is escalated to the immediate workflow. It should be noted that each media type, e.g., email, fax, voicemail callback request, etc., may have different SLA requirements, so the escalation could typically occur at different times depending on the media. Further, when an Agent 150 is not actively interacting with a contact via a voice, video, or web collaboration call, they can be working on background actions such as responding to email, voicemail or FAX. In some cases this may happen concurrently during a live call or web chat session; perhaps due to the caller's lengthy wait periods during the contact session, such as a support desk waiting for a customer to reboot a PC, etc. This means that an Agent 150 can be working on several things at once, and on work that is as difficult as they feel they are capable, while the operator of the Contact Center 100 knows that if a communication ages to the point of nearing the SLA, it will be escalated.

Still referring to FIGS. 2A-2C, when the communication is escalated, it is presented to the Agent 150 as an exclusive piece of work to be completed immediately and will not be interrupted with any live contact. However, only certain Agents 150 as designated by the operator of the Contact Center 100, may be assigned such an escalated communication. The concept of designated Agents 150 will be discussed in greater detail below. The Agent 150 is expected to answer the communication immediately without accepting additional work, just as they would if a new live communication was presented to them. This permits the Contact Center 100 to operate at the highest possible efficiency.

Still referring to FIGS. 2A-2C, when a communication arrives it is marked in the E-mail Server 120 as to indicate when it will be escalated allowing for an Agent 150 to know which contacts are about to be escalated. The Agent 150 is then notified by a visual indication on the desktop as to which contacts are about to be escalated and the date and time when the contacts will be escalated. This permits the Agents 150 to manage workloads efficiently. When a communication that is being worked on becomes aged to the point where it is near the limit of missing the SLA, or perhaps when an escalated communication becomes aged further while an Agent 150 is working on it, and for some reason is slow to complete a response, further action is taken to ensure the SLA is met. In both of these cases, the Contact Center 100 monitors the age of all communications that are actively being worked on by Agents 150, and after noticing it is in danger of not being completed in a timely manner, it presents a prompt to the Agent 150 asking if the Agent 150 is still working on the communication or whether the Agent 150 is even presently working. If the Agent 150 is present and the communication is being actively worked on, the Agent 150 can indicate whether they wish to keep the communication or let it be escalated into an immediate workflow and be presented to another Agent 150. If the Agent 150 can complete the work, they may indicate that they want to keep the communication and continue to work on it. If the Agent 150 can't complete it, they may indicate that it should be escalated to an immediate workflow for another Agent 150 to handle. A timeout, i.e., if the Agent 150 does not respond to the original prompt, will default, thereby escalating the communication to the immediate workflow and presenting the communication to another Agent 150. This will keep communications that are in process with Agents 150 who for some reason cease to actively work on them from failing to meet SLAs.

Figure 21:
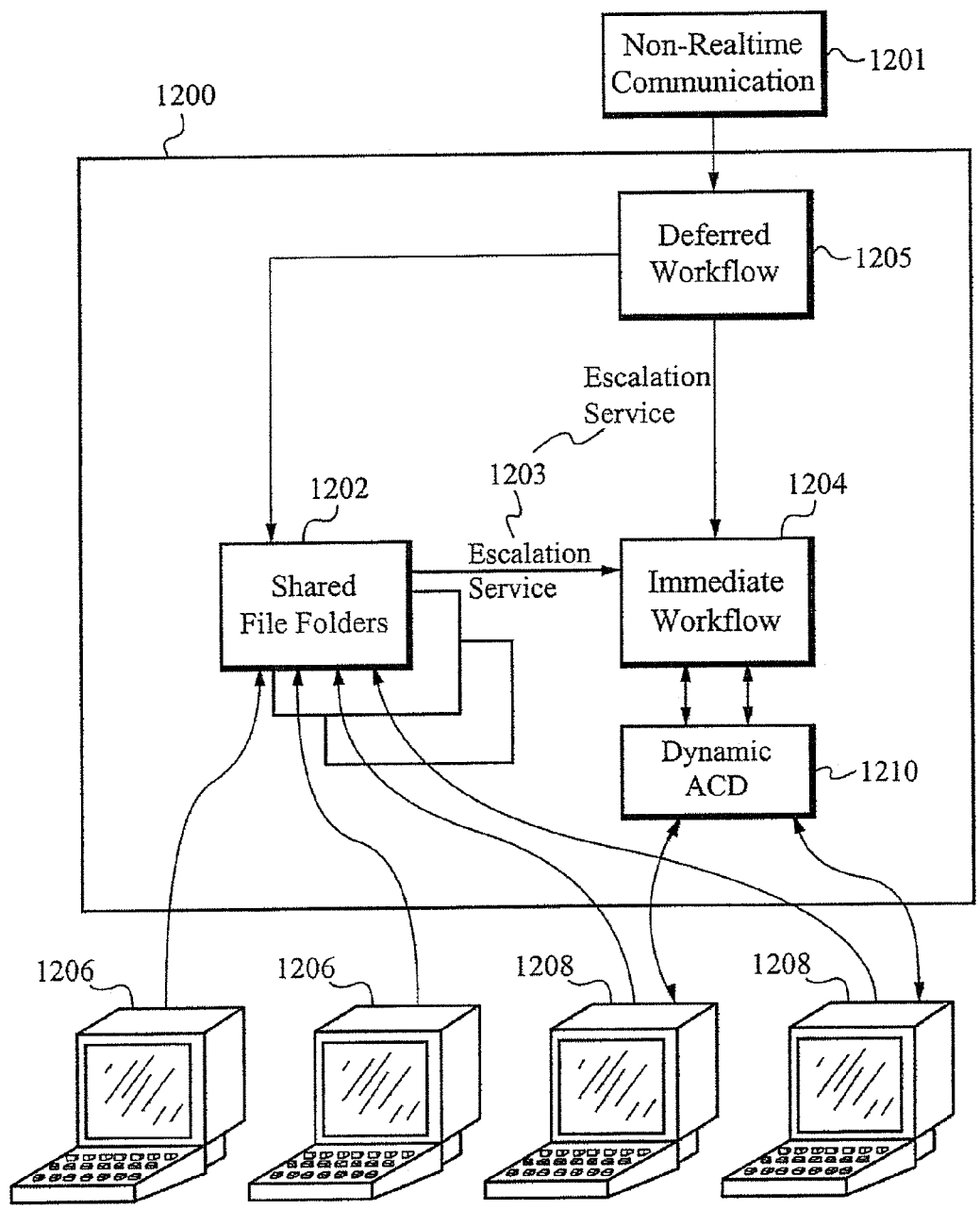
FIG. 21 illustrates a graphical representation of a node architecture of the preferred embodiment of the present invention.

Referring now to FIG. 21, a Central Processing Area 1200 of the preferred embodiment of the present invention is depicted to show the operation of escalated communications in the Contact Center 100 of FIGS. 2A-2C. It should be noted that FIG. 21 is that of a typical Central Processing Area (CPA) 1200 that has been simplified to illustrate only the Shared File Folders 1202, the Deferred Workflow 1205, the Immediate Workflow 1204, the Escalation Service 1203 and the Dynamic Automatic Contact Distributor (ACD) 1210 of the preferred embodiment of the present invention. It should be understood that the CPA 1200 of the preferred embodiment of the present invention may and usually will include additional features and components. Further, the CPA 1200 of the present invention can be any Hub (Hub-A, Hub-B) in the Contact Center 100 as described previously.

Still referring to FIG. 21, Non-Realtime Communications 1201 arrive in the CPA 1200 and enter a Deferred Workflow 1205. In the Deferred Workflow 1205, if the Non-Realtime Communications 1201 require immediate service, they are escalated to the Immediate Workflow 1204, where they will be routed to Designated Agents 1208 through the Dynamic ACD 1210. Such Non-Realtime Communications 1201 include such items as emails and voice messages from "Platinum" customers, etc. This will be discussed in greater detail below. The Non-Realtime Communications 1201 in the Deferred Workflow 1205 that are not required to have immediate service are placed in Shared File Folders 1202, where all appropriate Agents 1206, 1208 have access to them. There can be many Shared File Folders 1202 presorted with emails based on content of the "subject" field, "from" or "to" addresses, hidden "headers," etc. The Agents 1206, 1208 are able to access the Shared File Folders 1202 and answer communications of their choice or as assigned by the Dynamic ACD 1210. As discussed previously, this system allows for some of the communications to remain in the Shared File Folders 1202 until near their SLA limit, which in some cases could be several days. Because Agents 1206, 1208 tend to select communications that are better tailored to their expertise, interests or communications requiring a simple or short response, a number of the communications in the Shared File Folders 1202 are neglected and need to be answered when nearing their SLA limit. These communications then need to be escalated.

Also in FIG. 21, the escalation service as described above allows for a maximum number to be set as a ceiling to limit the number of immediate escalated workflows that may run simultaneously. This limit takes into account the large numbers of contacts that may threaten to flood the agents handling immediate contacts. In such situations an outgoing message may be sent to reset customer expectations for the delay in processing the original message. It thus enables a manageable solution for the system administration of the Contact Center 100.

Still referring to FIG. 21, when a communication becomes an aged communication as defined by its proximity to missing its SLA, the aged communications are removed from the Shared File Folders 1202 and are delivered by the Escalation Service 1203 to the Immediate Workflow 1204. All data collected before the communication is escalated, is retained and sent by the Escalation Service 1203 to the Immediate Workflow 1204. The Dynamic ACD 1210 routes the escalated communication to a Designated Agent 1208. Designated Agents 1208 are those Agents 1206, 1208 that are qualified and selected by the operator of the Contact Center 100 (FIGS. 2A-2C) to respond to communications which become aged or, more generally, any communications with an Immediate Workflow 1204. Typically, the Designated Agents 1208 are those Agents 1206, 1208 that have more experience in handling all types of communications, perhaps have special skills such as additional languages or technical experiences or are specialized Agents 1206, 1208 that handle solely escalated communications from the Immediate Workflow 1204.

While either class of Agents (Designated or not Designated) 1206, 1208 are authorized to select and respond to communications from the Shared File Folders 1202, only the Designated Agents 1208 are available for receiving escalated communications from the Dynamic ACD 1210 as depicted in FIG. 21. In addition to routing the escalated communications to the Designated Agents 1208 after a communication becomes aged while waiting in the Shared File Folders 1202 or is escalated directly from the Deferred Workflow 1205, the Dynamic ACD 1210 is also able to reassign escalated communications that were previously assigned to Designated Agents 1208, but need to be reassigned when the Designated Agent 1208 is unavailable or unable to respond to the escalated communication.

In such a case as described above, the escalated communication is monitored after being routed to the Designated Agent 1208. After a predetermined time of inaction in responding to the escalated communication, the CPA 1200 will prompt the Designated Agent 1208 assigned to the escalated communication to determine whether the Designated Agent 1208 is still working. If the Designated Agent 1208 is not currently available, the Immediate Workflow 1204 will re-route the escalated communication to another Designated Agent 1208. Likewise, if the first Designated Agent 1208 is unable to effectively respond to the escalated communication or does not want to respond to it, the Immediate Workflow 1204 will also re-route the escalated communication to another Designated Agent 1208.

Figure 22:
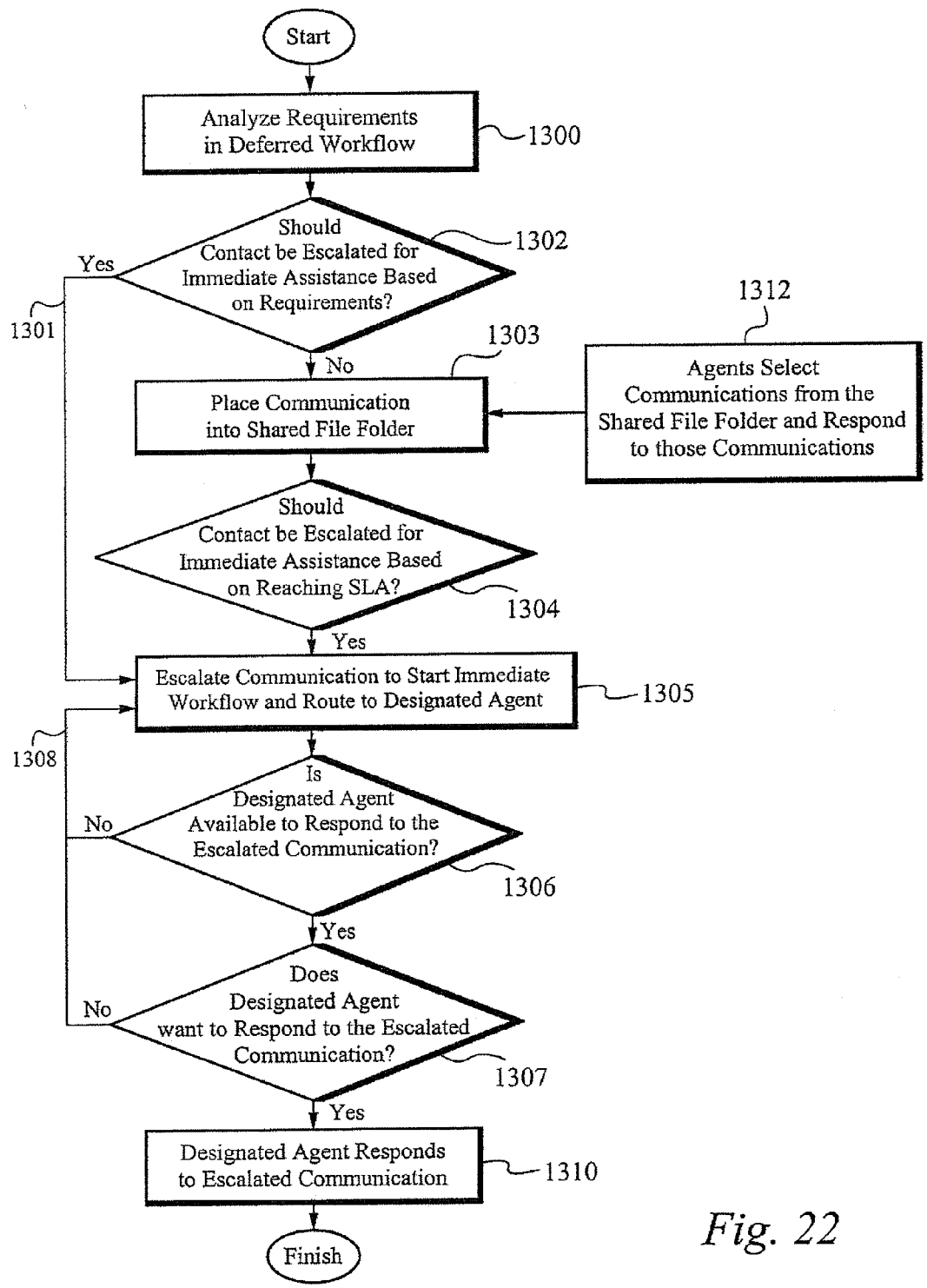
FIG. 22 illustrates a flow chart representation of the method of escalation of the preferred embodiment of the present invention.

FIG. 22 is a flow chart depicting a preferred method of the present invention. Referring to FIG. 22, the method begins at step 1300 when communications enter the central processing area (CPA) and are placed in a deferred workflow. In step 1302, the deferred workflow determines whether the contact should be escalated for immediate assistance based on requests in the contact such as "Platinum" customer, etc. If the contact should not be escalated in step 1302, the contact is placed into a shared file folder in step 1303. Communications enter the shared file folders, which are configured in a CPA of the contact center of the present invention. In step 1304, after communications collect in the shared file folders in step 1303, it is determined whether any aged communications are in the shared file folders, i.e. whether any communications need immediate assistance based on reaching a SLA. If there is an aged communication in the shared file folders, the aged communication is escalated to start the immediate workflow in step 1305. This escalated communication is then routed to a designated agent as an immediate contact. Whether an agent is designated is predetermined by the operator of the contact center. Referring back to step 1302, if the deferred workflow determines that the communication should be escalated based on business requirements, then step 1301 escalates that communication in step 1305 directly to the immediate workflow for routing to a designated agent.

Still referring to FIG. 22, the escalated communication is monitored and it is determined in step 1306 whether the designated agent is available to respond to the escalated communication. If the designated agent is available, it is then determined in step 1307 whether the designated agent is able or even wants to respond to the high priority communication. If in either step 1306 or 1307, the designated agent is unavailable, unable or unwilling to respond to the escalated communication, then path 1308 returns the escalated communication to the immediate workflow in step 1305 for routing as an immediate contact to another designated agent. However, if the designated agent is able and willing to respond to the escalated communication, the designated agent will respond in step 1310, before the method is finished. Step 1312 displays how agents, designated as well as non-designated, select communications from the shared file folders and respond to them as they wish while the preferred escalation method occurs in the present invention depicted in FIG. 22.

Priority Return to Queue

The Contact Center 100 depicted in FIGS. 2A-2C is preferably used to implement the present invention. Contacts 101 access the Contact Center 100 through a Public Switched Telephone Network (PSTN) 106 using any type of Telephone 103 connected to the PSTN 106. It should be understood that the Contacts 101 may also enter the Contact Center 100 by way of web collaboration or as a chat contact. The details concerning these contacts have been described above. The Contacts 101 are routed to appropriate Agents 150 by the Hubs 115, 117 and Nodes (Node CHI, Node STL, Node B-1, Node B-2. Node B-3, Node HOU), so that the Agents 150 may assist the Contacts 101 with a variety of goods and services, depending on the particular Contact Center 100. Alternative embodiments of the present invention may include an advanced queuing system as applied to Contact Centers other than the Contact Center depicted in FIGS. 2A-2C.

The present invention is an advanced queuing system and method that is used when the number of incoming Contacts 101 exceeds the number of Agents 150, resulting in perceived long hold times for the Contact 101. When the Contact 101 first enters the queue and the contact router can see a significant delay is likely, the Contact 101 is advised that the hold time is long and is offered the opportunity to continue to hold, or to call back at a later time and be put at the head of queue. This allows more efficient operation of the Contact Center 100 and allows the Contact 101 to plan their time without being "tapped" holding on a line for long periods.

The solution is to offer the Contact 01 an opportunity to call back in to the Contact Center 100 at a pre-arranged time and receive almost immediate service. The present invention will free the Contact 101 to do other things, it will help to balance the Agent 150 load in the Contact Center 100, and it will substantially reduce network access costs, both of which save the Contact Center 100 operator money while raising Contact 101 satisfaction. The Contact 101 no longer has to wait, listen to unwanted messages, nor sit by the phone waiting for the Contact Center 100 to call back. The Contact 101 feels more in control and the implied feeling that the Contact Center 100 is "more important and too busy to service me" is gone.

The present invention may be implemented in several embodiments. One embodiment includes a Contact 101 dialing the Contact Center 100 and selecting a function, e.g., customer service for widgets, that has a long hold time. The Contact Center 100 analyzes the estimated hold time and after seeing it would exceed 4 minutes (a human would view anything over 4 minutes as a "long time" for this specific application) informs the Contact 101 what the estimated hold time is and offers them the option to keep holding, or for the Contact 101 to call back for almost immediate service at the first available time that it knows the capacity exists to move the Contact 101 to the status of the next party to be handled. This time is given as a suggestion and if not acceptable to the Contact 101, they can negotiate for later times. The Contact 101 is given an identification number to use when they call back, and in alternative embodiments, a new telephone number to call. This identifies the contact to the system when they call at the new time and the system then moves them to the status of the next caller to be handled.

While it is easy to see how the Contact 101 would interact with this system, the actual implementation can be fairly complex. The following are a few of many implementation examples for calculating an immediate callback time and should not limit the present invention to these specific examples. The difficult part is to predict the workload of the Contact Center 100 over the next 6-12 hours of operation, by looking at the scheduled staffing and finding dips where excess capacity exists. Implementation of the present invention will operate to smooth out dips and crests in call traffic volume by predicting the traffic volume and assigning calls in a crest to a dip in volume. Software currently exists to make such predictions. Implementation of such software includes consulting the outputs created by the software, the output being based on historical behavior. This concept shall be explained further later in this document.

Another approach to creating capacity for this system would be to reserve a maximum number of allowed system starts per time slot for reassigned calls. The work shifts could be broken up into 15 minute time intervals, and depending on the predicted arrival of non system traffic that typically arrives in one of these time intervals, and considering the Agent 150 staff available, each time slot is allowed a certain amount of system call starts. Note that as the ratio of system Contacts 101 in a time slot approaches the number of actual Agents 150, random Contacts 101 that are not part of the system and choose to "just keep waiting" will need to wait longer and longer for service. Over time, the Contact Center 100 will be able to predict better how many Contacts 101 will "just keep waiting", as opposed to those who will use the SRQP system. Then, depending on the performance statistics for each group, the "waiters" and the system Contacts 101, the Contact Center 100 can tune its staffing level and what percentage of capacity should be reserved for the system. The means for calculating an immediate callback time may incorporate several different methods and algorithms, and should not be limited to those disclosed herein.

Most Contact Centers 100 measure their performance with a system that works like this: "X percent of the calls were answered in Y seconds." Commonly, these values are: "80% of the calls were answered in 20 seconds." These values can be very misleading because if an average wait report is generated for the span of an 8 hour work day, the aforementioned "80/20" goal can be met while still having a significant number of Contacts 101 waiting 10 or more minutes. This is an unwanted scenario. Since the typical Agent 150 work shift is 8 hours, and peak loads are often 3 times that of off peak loads, there is considerable capacity in the Contact Center 100 that is wasted to meet the performance criteria at peak load, or it is likely that if the numbers are averaged over the shift that a number of Contacts 101 are experiencing long waits at peak times. Also, many Contact Center 100 applications have call arrivals in peaks that are driven by unpredictable events (such as a new virus outbreak, or perhaps a new product release). In this case the staffing of the Contact Center 100 cannot keep up with the calling requirements without seriously overstaffing which leads to great expense. The system and method of the present invention can leave the Contact 101 in control, and allow performance of each of the groups to be measured separately where the standards for each group are purposely set appropriately.

Note that many Contact Centers 100 use an application called "Workforce Management" that is designed to help predict needed staffing. This application looks at common historical call patterns from similar time intervals (i.e. what happened on the same day last week), the available Agent 150 staff, available work hours and allowable work times (some employees might be hired to only work a 4 hour shift) and it will schedule each employee's start time, end time, lunch time, and break times. It would be possible to feed the system data into such an application, or to enhance the workforce management system to predict the amount of system capacity that should be offered during any time interval, based on call load and staffing.

Figure 23A:
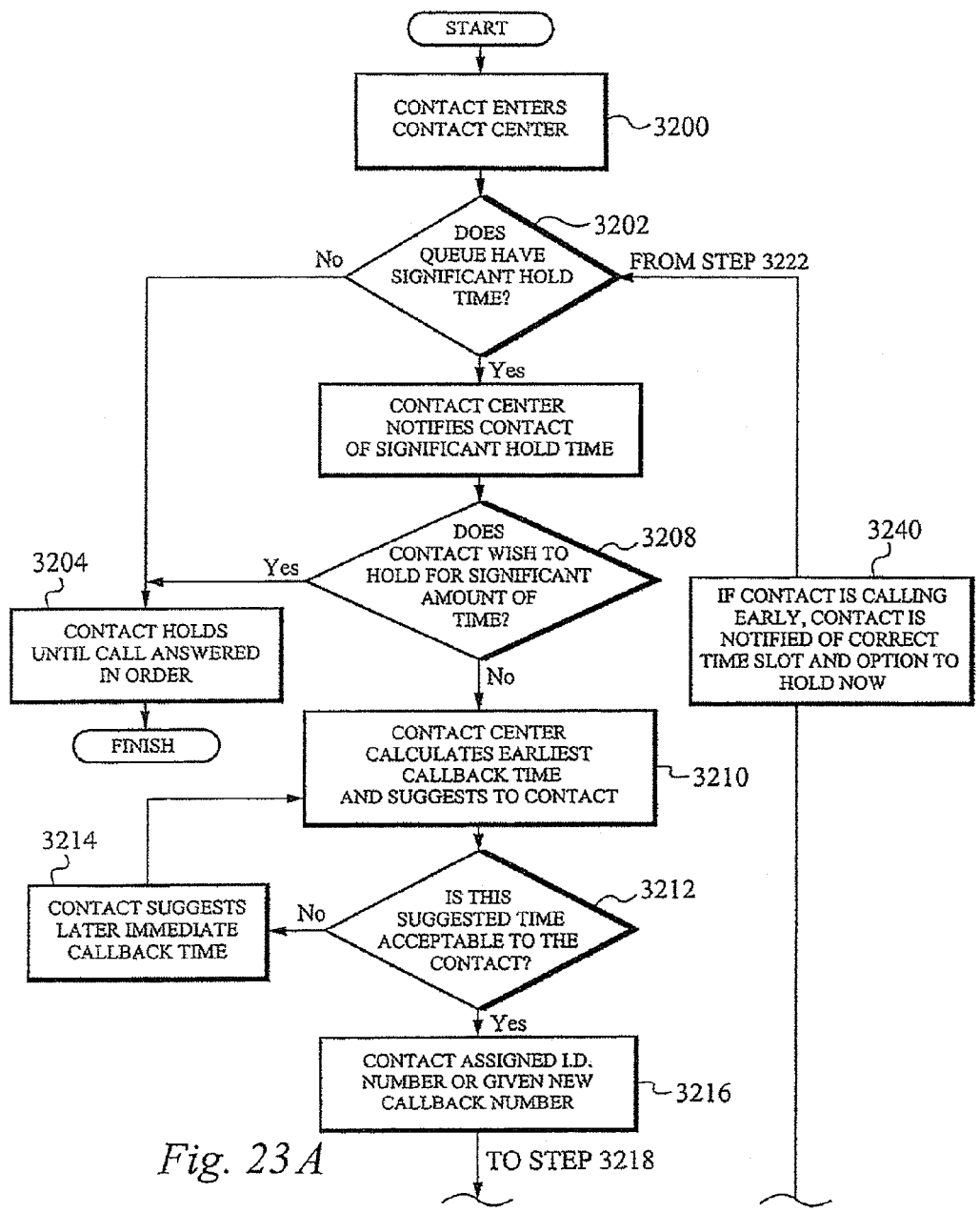
FIG. 23 illustrates a flow chart representation of the method of high priority return to queue of the preferred embodiment of the present invention.
Figure 23B:
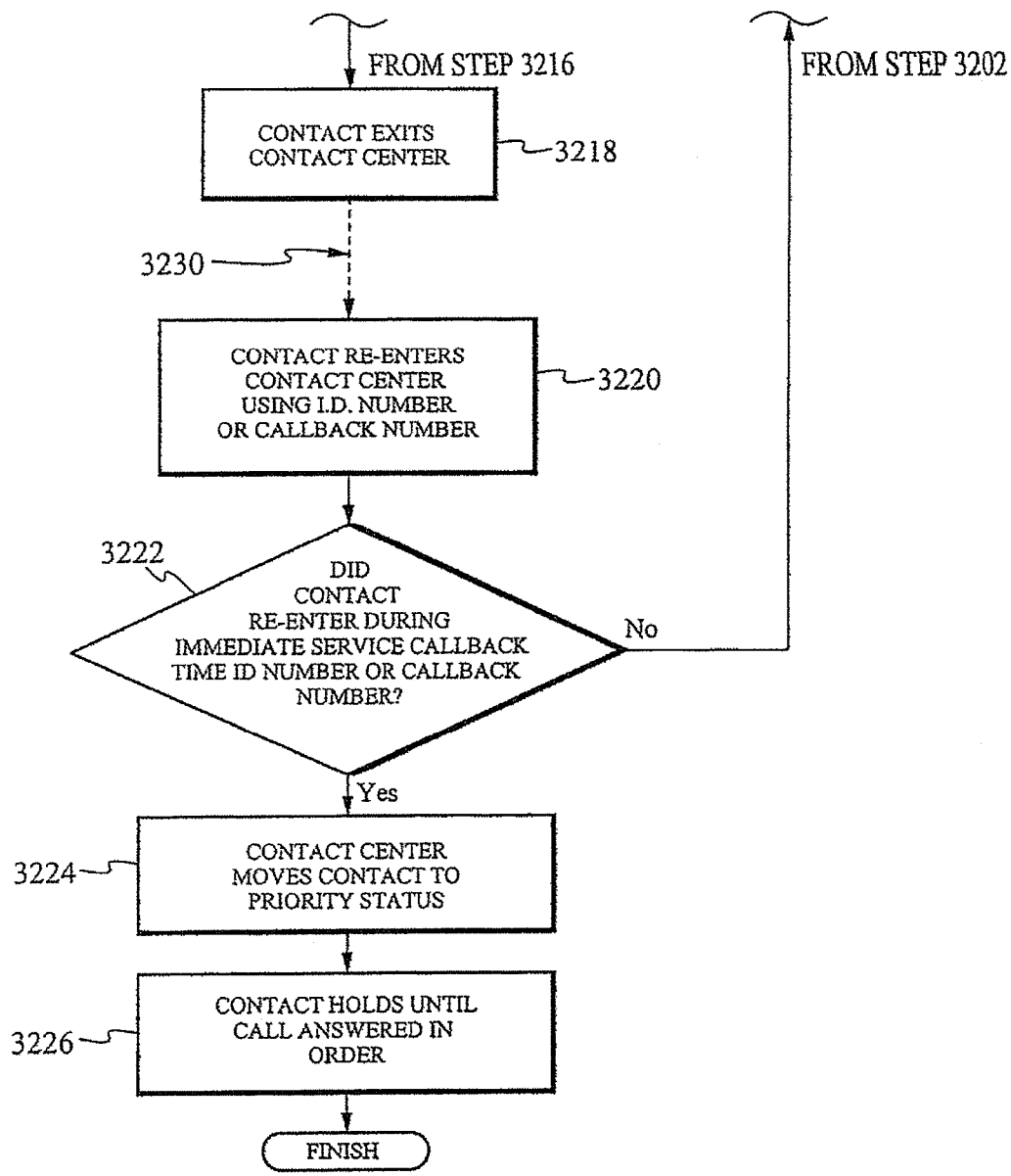

FIG. 23 illustrates a flowchart of a method of the present invention. In the first step 3200, a contact enters the Contact Center 100 (FIGS. 2A-2C) by calling in through a public switched telephone network. After the contact enters the Contact Center 100, the next step 3202 includes the Contact Center 100, through its routing and queuing system, determining whether the queue has a significant hold time. A significant queue time may vary depending on the particular Contact Center 100 and the amount of traffic currently in the Contact Center 100. Some Contact Centers 100 may consider any hold time greater than 30 seconds a significant amount of time, while others may consider 4-6 minutes and greater a significant amount of time. This can also vary by the type of call or media of access. If the queue does not have a significant hold time, the next step 3204 puts the contact on hold until the contact's call is answered in order, thus completing the call.

If in step 3202, the queue does have a significant hold time, the Contact Center 100 will notify the contact of this significant hold time in step 3206. In step 3208, the contact will then be asked whether the contact would like to continue holding for a significant amount of time. If the contact responds affirmatively to the step 3208 inquiry, the contact will hold until the call is answered in step 3204, again completing the call. However, if at step 3208, the contact does not wish to hold for a significant amount of time, the Contact Center 100 will calculate the earliest immediate call back time and suggest this time to the contact in step 3210. In step 3210, the Contact Center 100 will use a model of the number of Contacts accessing the Contact Center 100 throughout the day, and compare this model to the customer contact capacity of the Contact Center 100. Through this comparison, the Contact Center 100 can utilize an algorithm to calculate the earliest immediate callback for the contact in step 3210.

After suggesting this earliest immediate callback time to the contact in step 3210, the Contact Center 100 will ask the contact whether the suggested immediate callback time is acceptable in step 3212. If the suggested immediate callback time is not acceptable to the contact, the contact may suggest a later immediate call back time in step 3214 or choose from the other times offered by the Contact Center 100, after which, the Contact Center 100 will again calculate an earliest immediate callback time in step 3210 based on the contact's suggestion from step 3214. If the original suggested immediate callback time is acceptable to the contact in step 3212, the contact is assigned an identification number or given a new callback number in step 3216.

Still referring to FIG. 23, after receiving an identification number or a new callback number in step 3216, the contact will exit the Contact Center 100 in step 3218. In this step, after the contact receives the identification number from the Contact Center 100, the contact may hang up the phone, disconnecting him or herself from the Contact Center 100. After the contact disconnects from the Contact Center 100 in step 3218, the contact will then be free to perform any personal tasks while disconnected. This disconnected state is illustrated by the dashed line in path 3230. In other words, disconnecting in step 3218 after receiving an immediate callback time in step 3216 allows a contact the highest convenience so that the contact is not required to stay on the phone holding for a long time, and further the contact will not be required to wait for a callback from the Contact Center 100. In fact, the contact may incorporate the immediate callback time into his or her own personal schedule.

Still referring to FIG. 23, at the assigned immediate callback time, the contact will re-enter the Contact Center 100 at step 3220 using the callback code assigned by the Contact Center's 100. This callback code may be implemented in a number of ways. The contact may dial the Contact Center 100 at the same phone number originally used to access the Contact Center 100 and enter an assigned code when prompted to do so. Alternatively, the contact may be instructed to call a new phone number to customer service line and enter an assigned code. Further, for added security, the Contact Center may assign the contact a unique telephone number that can be reused for other customers later. All of these methods provide the Contact Center 100 and the contact with a capable alternative to re-entering the Contact Center 100 at step 3220, while providing the Contact Center 100 with security, i.e., a contact not assigned the callback code would have a difficult time entering the Contact Center 100 by guessing the assigned contact's callback code. Preferably, the Contact Center 100 will utilize a combination of the aforementioned callback codes, such that a unique telephone number will be assigned to the contact and the contact would also be required to enter a code when prompted. This preferred method provides the Contact Center 100 with the most security in step 3220.

After re-entering the Contact Center 100 with the callback code in step 3220, in the step 3222 the Contact Center 100 will determine whether the contact re-entered in the pre-assigned time slot. If the contact did not, a contact calling late, i.e., after his assigned time window, will return to step 3202 and the Contact Center 100 will then determine whether the queue has a significant hold time. If the contact called in early, i.e., before his assigned time slot, the contact will be notified in step 3240 of the appropriate time to call giving the contact an opportunity to hang before being returned to step 3202. If the contact did re-enter the Contact Center 100 at the appropriate time, then the Contact Center 100 moves the contact to "next call handled" status in step 3224. The contact will then hold for a relatively short time (again, depending on the particular Contact Center 100) before his or her call is answered in order in step 3226.

Figure 24A:
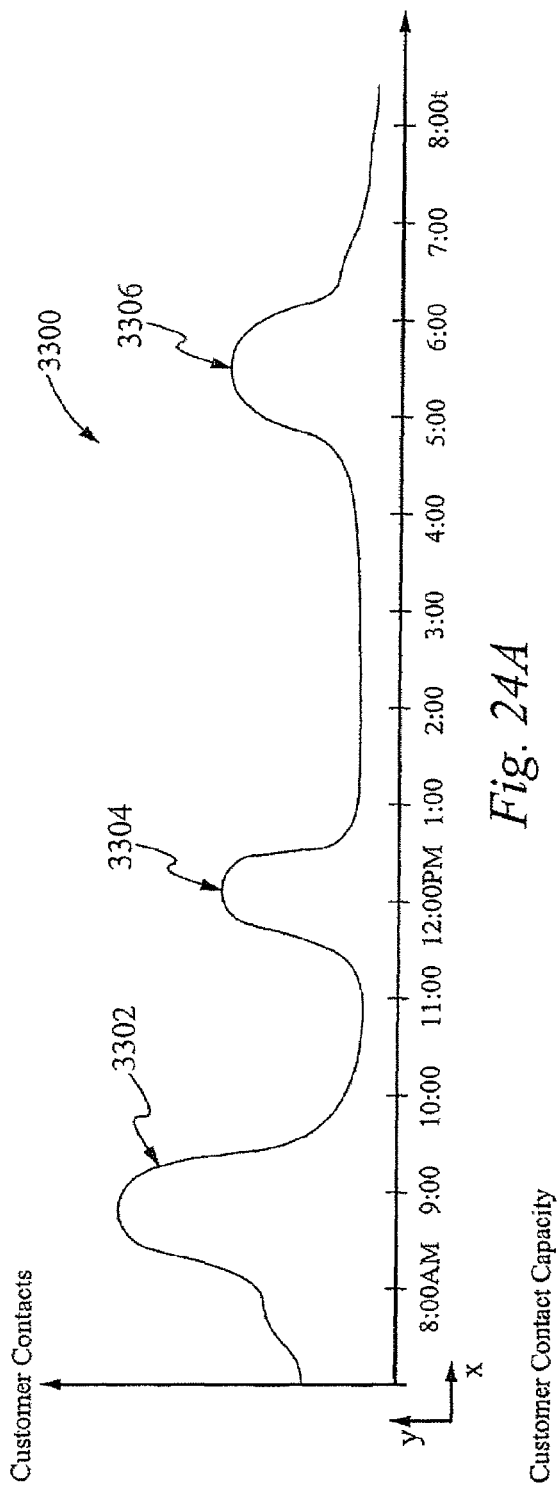
FIG. 24a illustrates a graphical representation of a typical contact load.

Referring now to FIG. 24*a*, the Contacts Graph 3300 depicts a typical Contact load on the vertical axis during the course of a Contact Center's 100 work day on the x-axis. While this Contacts Graph 3300 is merely representation of a typical day and does not contain values for the number of contacts on the y-axis, it is of the utmost importance that the peak time in this Contacts Graph 3300 are realized. In other words, this Contacts Graph 3300 is intended to depict a typical day having typical peak times, and should not be read as the only possible Contact load that is possible. For some applications, the contact load peaks in a Morning Peak 3302, a Lunch Peak 3304 and an Evening Peak 3306. Typically, the morning hours leading up to the Morning Peak 3302 show a sharp incline in Contact load while the hours after the Evening Peak 3306 show a steady decline.

Figure 24B:
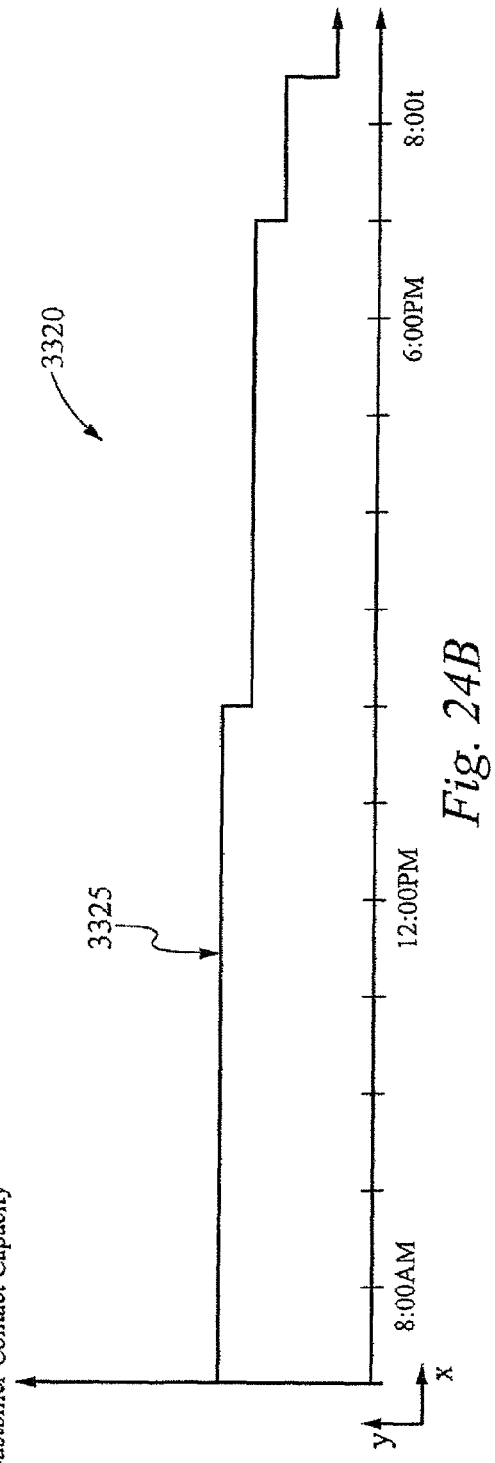
FIG. 24b illustrates a graphical representation of a contact capacity of an embodiment of the present invention.

Referring now to FIG. 24*b*, the Contact Capacity along the y-axis of the Capacity Graph 3320 represents the number of agents currently accepting calls. As can be seen by the Agent Capacity 3325 as graphed throughout the course of an entire day (as shown in the x-axis), shift scheduling causes the Agent Capacity 3325 to be at a constant rate during the course of a day. Of course there may be slight agent overlap during a shift change. However, the Agent Capacity 3325 generally remains at a relatively constant level, while shifting according to shift changes and shift overlaps, thereby typically creating an Agent Capacity 3325 that is relatively horizontal and varying in amplitude as depicted in FIG. 24*b*.

Figure 25A:
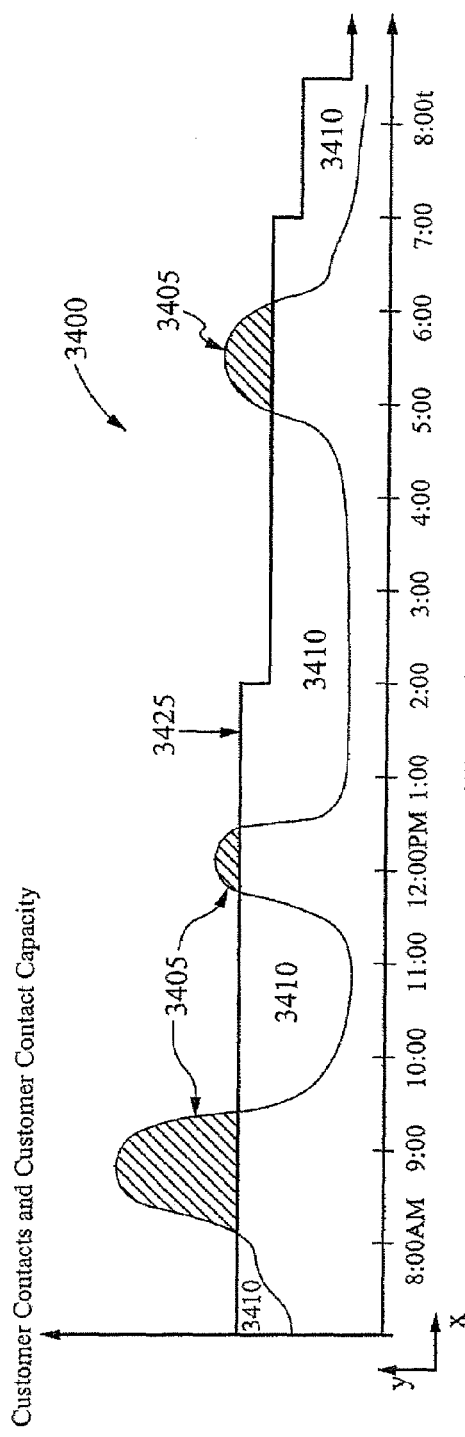
FIG. 25a illustrates a graphical representation of a typical contact load and capacity of an embodiment of the present invention.

FIG. 25*a* combines the Contacts Graph 3300 with the Capacity Graph 3320 to create a Comparative Graph 3400 that demonstrates the Contact Surplus 3405 as well as Agent Surplus 3410 that occurs due to normal Contact Center 100 (FIGS. 2A-2C) operation. A Contact Surplus 3405 occurs when a Contact Peak 3302, 3304, 3306 (FIG. 24*a*) causes the number of contacts to exceed the Agent Capacity 3425. A Contact Surplus 3405 is precisely the type of event that triggers relatively long hold times for the contacts. As is depicted in FIG. 25*a*, a decrease in the Agent Capacity 3425 creates an even larger contact Surplus 3405 in some areas.

Conversely, when the Agent Capacity 3425 is much greater than the Contact load, an Agent Surplus 3410 is realized. An Agent Surplus 3410 is economically inefficient as agents are being paid to essentially sit and do nothing. Oftentimes, an Agent Surplus 3410 may also affect the productivity of an agent as more down time allows for breaks in concentration. Because the Agent Surplus 3410 in any given Contact Center 100 is ordinarily much greater than the Contact Surplus 3405, the present invention should operate in relative ease to redistribute the Agent Surplus 3410 to the Contact Surplus 3405, as will be shown in FIG. 25*b*.

Figure 25B:
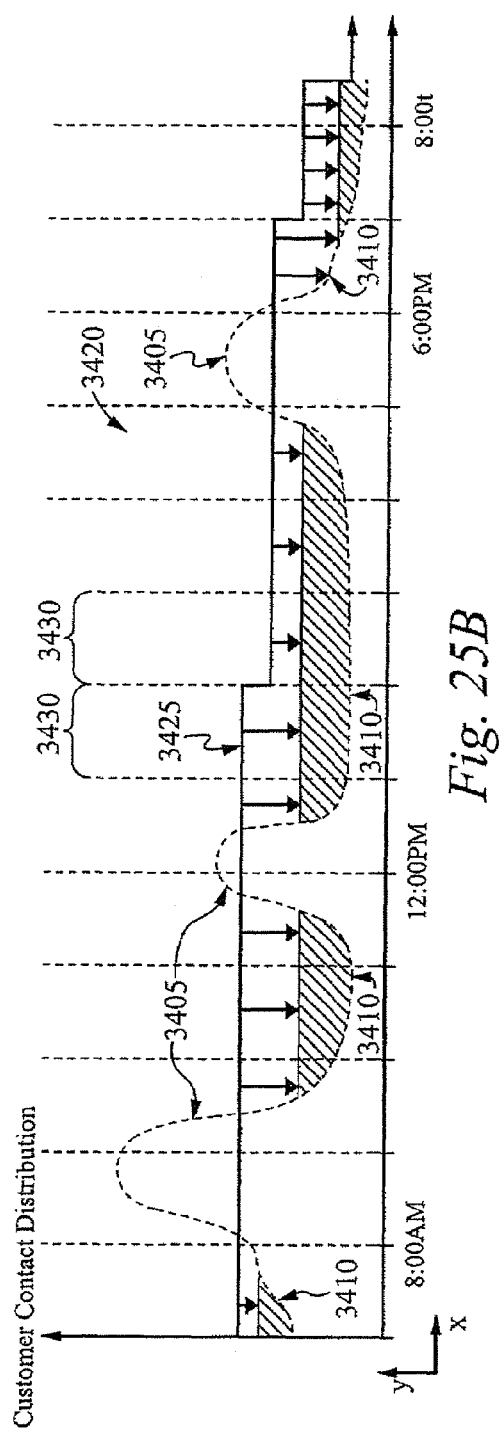
FIG. 25b illustrates a graphical representation of a contact distribution of an embodiment of the present invention.

The outcome of implementing the present invention is depicted in FIG. 25*b*. Here, according to a predetermined algorithm, contacts in a Contact Surplus 3405 are given the opportunity to call back at a later time, thereby attempting to eliminate the Contact Surplus 3405 by redistributing this Contact Surplus 3405 in to the Agent Surplus 3410 by scheduling the Contact Surplus 3405 calls into the Agent Surplus 3410 times. In a preferred embodiment of the present invention, eliminating the Contact Surplus 3405 and redistributing this Contact Surplus 3405 into the Agent Surplus 3410 will significantly lower the need for the present Agent Capacity 3425. It should be noted that in a typical Contact Center 100, the Agent Capacity 3425 will decrease over the course of a typical eight hour work day. The redistributed Contact Surplus 3405 is shown here in FIG. 25*b* as cross hatching in the Agent Surplus 3410. It is realized by this aspect of FIG. 25*b* that the present invention will allow the Agent Capacity 3425 to be lowered to reduce the overall staffing levels and costs to the Contact Center 100, while still meeting performance goals such as "80% of the calls were answered in 20 seconds." The reduced agent staffing level is depicted in FIG. 25*b* with the Reduced Agent Capacity 3450 level, illustrated as a dashed line. The Reduced Agent Capacity 3450 represents the ability of the Contact Center 100 to reduce the overall staffing levels by implementing the present invention. Therefore, still referring to FIG. 25*b*, implementing the present invention will allow the Contact Center's 100 staffing to lower the Agent Capacity 3425, thereby reducing costs.

It is also important to note that the graphical representations in FIGS. 24*a*-25*b* may also be extrapolated to incorporate a method and solution for a 24 hour time frame. This extended time frame may be of great importance when applied to an international call center and/or international Contacts 101 dialing into a domestic call center, where time zone differences may create a Contact Surplus 3405 at other times of day.

Still referring to FIG. 25*b*, a preferred embodiment will include deriving an algorithm to efficiently predict contact volume by breaking a work day into Time Slots 3430. The number and duration of the Time Slots 3430 are dependant upon the particular Contact Center 100. Of course, additional embodiments my include several different algorithms better able to predict contact volumes in order to properly schedule callback times for contacts that call during a Contact Surplus.

Automatic Management of the Visual Space While Performing a Task

Referring to FIGS. 2A-2C, 26 and 27 simultaneously, generally the Task bar 4212 and Shutter Icons 4210 are a feature of the Contact Center 100 implemented in an Agent's 150 Graphical User Interface 4200 in order to manage a large part of the usable Graphical User Interface 4200, particularly the Shutters Managed Display Area 4206 of the Graphical User Interface 4200 in concert with the Agent's 150 work state defined by the Agent Workflow 4300 and the Contact Workflow 4301. The Contact Center 100 controls the progress of a contact from its initial presentation to its ultimate completion at the Agent's 150 desktop through the use of the Agent Workflow 4300 and the Contact Workflow 4301. This Contact Center 100 information is illustrated in the Contact Center Control Panel 4202 of the Graphical User Interface 4200. The Agent Workflow 4300 may include a number of various states, depicted in FIG. 27 as Agent Steps 4305, such as Available 4310, Presenting a Contact 4312 of a specific media type, In a Contact 4314, Disconnect 4316 and Wrap Up 4318. These Agent Steps 4305 all can be enhanced by adding Agent Steps 4305 or deleting Agent Steps 4305 to trigger desired behavior of the Graphical User Interface 4200. The Contact Workflow 4301 may include a number of various states, depicted in FIG. 27 as Contact Steps 4306, such as Show Email Application 4320, Shrink Email 4322 and Show Order Entry Application 4324. Likewise, these Contact Steps 4306 all can be enhanced by adding Contact Steps 4306 or deleting Contact Steps 4306 to trigger desired behavior of the Graphical User Interface 4200.

In this implementation, applications such as the customer's CRM are put on a list of managed applications or "CRM Applications", each CRM Application's visual experience is controlled by the Task bar 4212, and its corresponding Shutter Icon 4210. The Task bar 4212 sends messages to the windowing system to reveal, hide and reposition Shutters Managed Applications 4208, and intercepts and reinterprets all windowing messages sent via the windowing system that would otherwise control the size, visibility and location of the Shutters Managed Applications 4208. The Task bar 4212 may or may not have a visual representation on the Desktop 4204. In a preferred embodiment, when a contact arrives to the corresponding Contact Step 4306 in the Contact Workflow 4301, the Contact Workflow 4301 can specify which Shutter Managed Application 4208 is to be opened for viewing and positioned to the current contact's records in the Shutters Managed Display Area 4206. This combines a traditional CRM "screen pop" with the management of the Graphical User Interface 4200 at the same time. In alternative embodiments, when the Agent 150 arrives to the corresponding Agent Step 4305 in the Agent Workflow 4300, the Agent Workflow 4300 can specify which Shutter Managed Application 4208 is to be opened for viewing and positioned in the Shutters Managed Display Area 4206. Also in alternative embodiments, Shutters Managed Applications 4208 can also be configured by the contact center administration to open in a separate window. Such a configuration is often desired when a contact center utilizes a high number of managed applications. Any number of the managed applications may be configured in this manner as desired by the contact center administrator. When a Shutters Managed Application 4208 is launched in or opened either manually or by an Agent or Contact Workflow 4300, 4301, a corresponding Shutter Icon 4210 appears in the Task bar 4212. When a Shutters Managed Application 4208 is closed, either manually or by an Agent or Contact Workflow 4300, 4301, its corresponding Shutter Icon 4210 disappears from the Task bar 4212.

Figure 26:
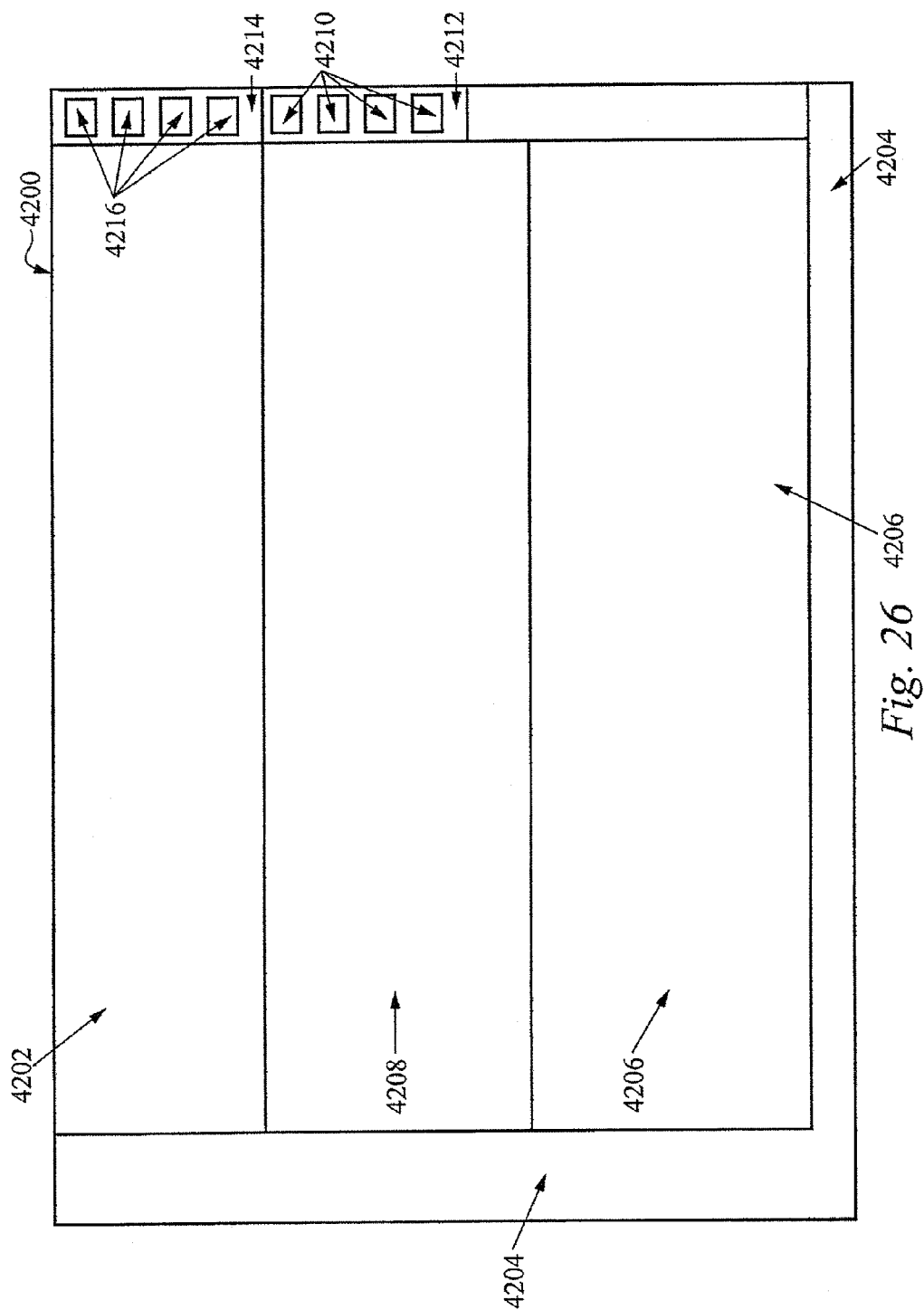
FIG. 26 illustrates a graphical user interface of the preferred embodiment of the present invention.
Figure 27:
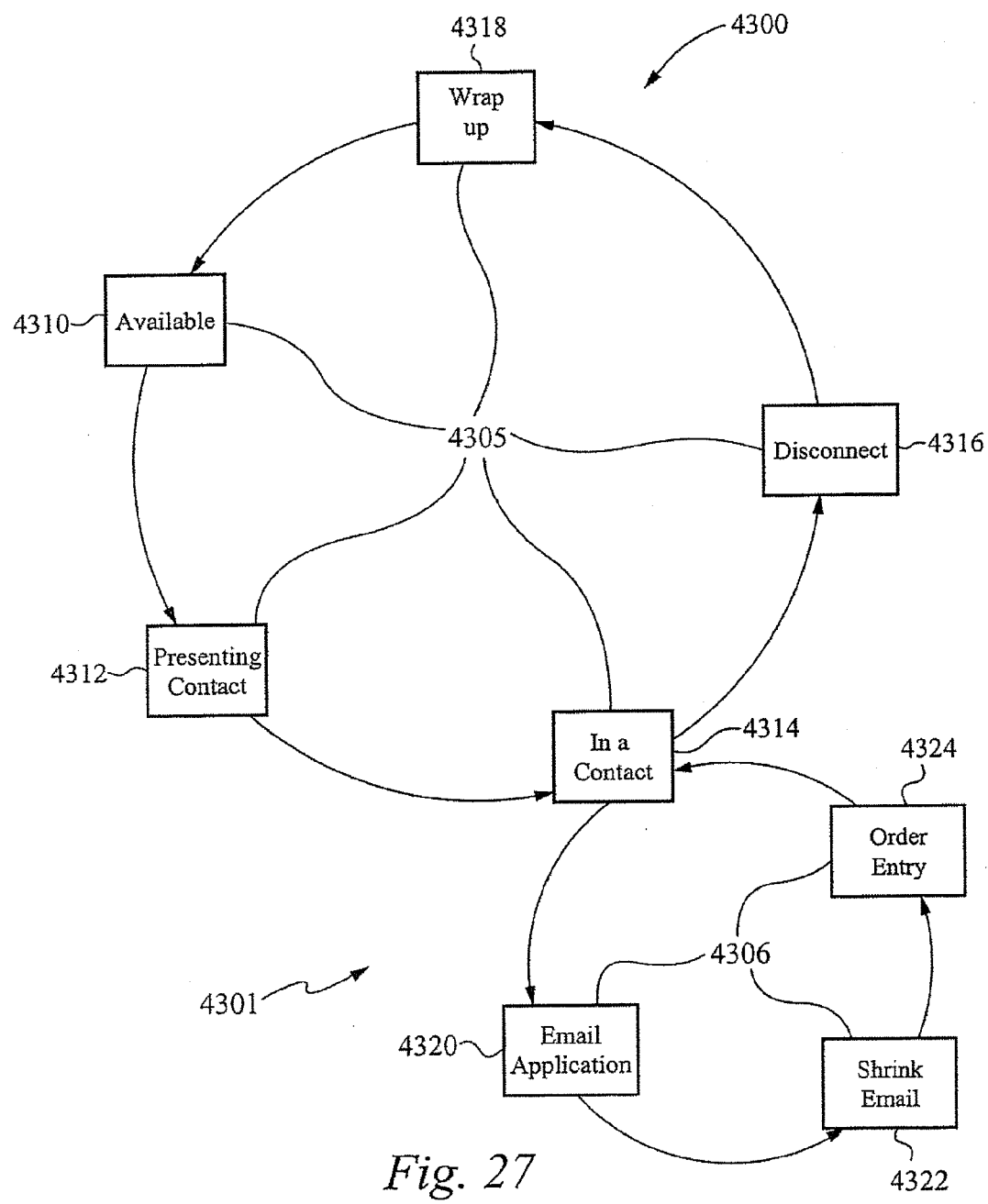
FIG. 27 illustrates a graphical representation of an agent workflow of the present invention.

Still referring to FIG. 26 and FIG. 27, when the data entry is finished in the CRM Application of the opened Shutter Managed Application 4208, the Agent or Contact Workflow 4300, 4301 can be set to minimize the CRM Application and expand another Shutter Managed Application 4208 application according to the current Agent or Contact Step 4305, 4306 of the Agent or Contact Workflow 4300, 4301 in handling the customer, as long as the subsequent CRM Application was also registered for control by Shutter Managed Applications 4208. Similarly, if an email is escalated to an immediate contact, the email client under control of the Shutter Managed Application 4208 can expand and display the escalated email. After an email is sent, the CRM Application can automatically contract, and possibly expand another application where customer status is entered. If the Agent 150 is using this Graphical User Interface 4200 and needs access to a CRM Application out of sequence with the pre-programmed Agent or Contact Workflow 4300, 4301, Shutters Icons 4210 exist in the Task bar 4212 to permit manual control of the expansion and contraction of the Shutter Managed Applications 4208. Additionally, if at any time the Agent 150 wishes to work with an application that is not controlled by Shutter Managed Applications 4208, commonly referred to as a "non-managed" applications, the Desktop 4204 is always active and visible. However, the use of non-managed applications may overlay the Shutters Managed Display Area 4206.

Still referring to FIGS. 2A-2C, 26 and 27, the CRM Applications having Shutter Managed Applications 4208 that are expanded and contracted in the Shutters Managed Display Area 4206 can vary depending on the next Agent or Contact Step 4305, 4306 of the Agent or Contact Workflow 4300, 4301. For example, if the Agent 150 can handle both sales and service calls but the customer has already specified that they are making a service call, perhaps by calling a service number or selecting it from a menu, the Agent Workflow 4300 knows that the service management CRM Application is what should be opened to the correct contact record. Similarly, if certain events happen during the course of the call, the Contact Workflow 4301 can cause other Shutter Managed Applications 4208 to open, causing its corresponding CRM Application to open in the Shutters Managed Display Area 4206. Therefore, it is the logic of the Agent or Contact Workflow 4300, 4301 that decides which CRM Applications will be open at what times and how they are sequenced for any particular Agent or Contact Step 4305, 4306 of the Agent or Contact Workflow 4300, 4301.

Referring now to FIG. 26, a Graphical User Interface 4200 is displayed on an Agent's 150 PC desktop in order to organize non-managed applications as well as managed [CRM] Applications in an Agent's 150 Agent or Contact Workflow 4300, 4301 (FIG. 27). The PC desktop may display the Graphical User Interface 4200 on viewing devices including a cathode ray tube (CRT) monitor, a liquid crystal display, a flat panel monitor, etc., or any display device allowing an Agent 150 to view the Graphical User Interface 4200 and interact accordingly. In a preferred embodiment, the Graphical User Interface 4200 is 1,280 wide and 1,024 pixels high or larger. However, additional embodiments may include Graphical User Interfaces 4200 of various dimensions. The Contact Center Control Panel 4202 illustrates the pertinent Contact Center 100 information.

Still referring to FIG. 26, the Contact Center Control Panel 4202 is configured at the top of the Graphical User Interface 4200 and extends to the Desktop 4204. Again, additional embodiments may include variations of this configuration. The Contact Center Control Panel 4202 includes the status of multichannel control calls entering the Graphical User Interface 4200. Such control calls include voice channels, e-mail, web collaboration and chat. Channels may be deleted or added as desired. The Contact Center Control Panel 4202 also may include information as to how to greet an incoming contact as what language the contact uses, a particular interest that customer has had previously purchased, whether that customer is a "VIP" customer, etc. Any information concerning how to greet a particular customer is included in the Contact Center Control Panel 4202.

The Desktop 4204 presents the non-managed applications that may be accessed by an Agent 150 while using the Graphical User Interface 4200. Preferably the Desktop 4204 is located on the left edge of the Graphical User Interface 4200 with a strip extending along the bottom of the Graphical User Interface 4200 as depicted in FIG. 26. Of course, dimensional variations of the Desktop 4204 may be realized in additional embodiments of the Graphical User Interface 4200. The non-managed applications included in the Desktop 4204 are not found in the Agent or Contact Workflow 4300, 4301 (FIG. 27). Rather, the non-managed applications include those applications that an Agent 150 may choose to use outside and separate from handling contacts. These applications will often include applications that are packaged with the operating system as well as corporate e-mail applications and calendaring applications such as Outlook@. In the current embodiment, a quick start bar 4214 is provided that includes Application Icons 4216 for both managed and unmanaged applications. If these Application Icons 4216 are selected, then the corresponding application is launched. If the application is a Shutters Managed Application 4208, then its window will be managed withing the Shutters Managed Display Area 4206.

Referring still to FIG. 26, the design of the Graphical User Interface 4200 allows the non-managed applications in the Desktop 4204 to be accessed at any time. Accessing an application in the Desktop 4204 may cause that application to overlay the Graphical User Interface 4200 as depicted here in FIG. 26. Because one window can overlay another without closing or shrinking, such a non-managed application must be overlayed, shrunk or closed down before the Agent 150 may again access the remainder of the Graphical User Interface 4200, including the Contact Center Control Panel 4202, the Shutters Managed Display Area 4206, the Shutter Managed Applications 4208 and the Shutter Icons 4210.

The Shutters Managed Display Area 4206 illustrates the current Agent or Contact Step 4305, 4306 of the Agent or Contact Workflow 4300, 4301 of the Agent 150 and, if one is being accessed, the current CRM Application. In a preferred embodiment, the Shutters Managed Display Area 4206 is typically about 1024 pixels wide and 768 pixels tall as depicted in FIG. 26. Again, additional embodiments may include a Shutters Managed Display Area 4206 having modified dimensions. Each one of the Shutter Controlled Applications 4208 are assigned an Agent or Contact Step 4305, 4306, and in some cases, a CRM Application. The CRM Applications controlled by the Shutter Managed Applications 4208 must be assigned prior to operating the Graphical User Interface 4200. The CRM Applications, also referred to as managed applications, may include an order entry application, a trouble ticket application, an email application or a web collaboration application. The list of possible CRM Applications is virtually endless and those designated as Agent or Contacat Steps 4305, 4306 in the Agent or Contact Workflow 4300, 4301 (FIG. 27) will be assigned a Shutter Icon 4210.

Still referring to FIG. 26, while referring to FIG. 27, in the preferred embodiment when a contact arrives at any Contact Step 4306 in the Contact Workflow 4301, the Shutter Managed Application 4208 corresponding to the CRM Application found in that particular Step 4306 will open up, allowing the Agent 150 to access that CRM Application in the Shutters Managed Display Area 4206. In the event that an Agent 150 wishes to open a particular Shutter Managed Application 4208 that does not currently represent the current Contact Step 4306 in the Contact Workflow 4301. In this case, the Agent 150 may select any one of the Shutter Icons 4210, opening the attached Shutter Managed Application 4208, thereby opening the corresponding CRM Application into the Shutters Managed Display Area 4206. Likewise, the Agent 150 may minimize the Shutter Managed Application 4208 by selecting the appropriate Shutter Icon 4210.

In a preferred embodiment, Shutters Managed Applications 4208 will "share" the space of the Shutters Managed Display Area 4206. Each Shutters Managed Application 4208 is allocated all of the required horizontal space, and the remaining vertical space is split up and shared between them as described below. Application focus may be directed to a specific Shutters Managed Application 4208 according to the Contact Workflow 4301, or manually specified by the Agent 150 by whatever focus shifting mechanisms the windowing system provides. Typically, this includes clicking with the mouse, or by using keyboard shortcuts. In this way, the Agent 150 has simultaneous access to all of the Shutters Managed Applications 4208. Such an embodiment allows an Agent 150 to work on multiple CRM Applications at the same time.

The percent of utilization of the Shutters Managed Display Area 4206 may be automatically allocated on an even percentage basis or it may be specifically controlled such as one-third given to email and two-thirds given to a CRM Application. When multiple applications appear, the Shutter Icons 4210 still allow an Agent 150 to filly expand or contract any Shutter Managed Applications 4208 within the Shutters Managed Display Area 4206. Furthermore, when multiple applications appear, an Agent 150 may assign a minimum vertical space for each Shutter Managed Application 4208 such that when any particular Shutter Managed Application 4208 is selected, the non-selected Shutter Managed Applications 4208 will resize to allow the selected Shutter Managed Application 4208 to be displayed with the assigned minimum vertical height. It should also be noted that any managed application may include a standard scroll bar when the managed application is larger than the allotted space given to that managed application in the Shutters Managed Display Area 4206.

Referring now to FIG. 26 and FIG. 27, typical Agent and Contact Workflows 4300, 4301 are depicted. The Agent and Contact Workflows 4300, 4301 are typical as they show one possible representative model of Agent and Contact Workflows 4300, 4301 that may be modified by adding or deleting any number of Agent and Contact Steps 4305, 4306 depending upon the needs of the Contact Center 100. In this particular Agent Workflow 4300, when an Agent 150 receives a Contact 4314, the Agent Workflow 4300 sends a message to the Task bar 4212 to open a Shutters Managed Application 4208 (typically the CRM) to display the detailed contact information. The Task bar 4212 determines the size, and placement of the window for the Shutters Managed Application 4208, and sends the appropriate messages to the Windowing system. The windows are then displayed in the Shutters Managed Display Area 4206. If the Agent 150 accepts the Contact 4314, then the Contact Workflow 4301 sends a message to the Task bar 4212 to open a shutters managed Application 4208 such as an Email Application 4320 that allows the Agent 150 to communicate via the appropriate medium.

Alternatively, when an Agent 150 becomes available to handle contacts of a particular media type, the Contact Workflow 4301 sends a message to the Task bar 4212 to open a Shutters Managed Application 4208 in the Shutters Managed Display Area 4206, that allows the Agent 150 to communicate via the appropriate medium. The Task bar 4212 determines the size, and placement of the window for the Shutters Managed Application 4208, and sends the appropriate messages to the Windowing System. When the Agent 150 is presented with a new contact, the Contact Workflow 4301 sends a message to the Task bar 4212 to open a Shutters Managed Application 4208 to display the detailed contact information. If the Agent 150 accepts the Contact 4314, the Contact Workflow 4301 sends a message to the Task bar 4212 to open a Shutters Managed Application 4208 to best process the issues of that contact.

Still following the Contact Workflow 4301 in FIG. 27, when the Agent 150 is done communicating with the contact in the email application, the application will minimize or close as shown in the Shrink Email 4322 step. The Agent 150 may then wish to Show Order Entry Application 4324 before Disconnect 4316 and Wrap Up 4318. Again, at every Agent or Contact Step 4305, 4306 in the Agent or Contact Workflow 4300, 4301, the Agent or Contact Workflow 4300, 4301 sends a message to the Task bar 4212 to manage a Shutters Managed Application 4208. The CRM Application will open as long as the Agent or Contact Workflow 4300, 4301 includes a corresponding Agent or Contact Step 4305, 4306 and a Shutter Controlled Application 4208 is assigned to that Agent or Contact Step 4305, 4306.

Also in the preferred embodiment of the present invention, a contact history viewer is included. The contact history viewer is a managed application that allows the agent 150 to view the transaction data, e.g. historical data, contact detail records, for any given cutomer on the agent 150 desktop. The contact history viewer allows the agent 150 to organize, sort and search this data as the agent 150 requires.

Graphical Control for Simultaneously Editing an Array of Values that Sum to a Fixed Value The new GUI 5200 having the graphical control called a "Pie Slider" has been created to solve the problems described previously. A "Pie Slider" allows a user to directly manipulate an independent variable, and graphically is able to see how those manipulations affect the dependent variables. The data model is an array that sums to a fixed value where the component values sum according to $Y=\Sigma X_{1-n}$, the controller is a set of algorithms that receives inputs and manipulates the data model according to the inputs and the view is the particular pixels that are colored to depict the GUI.

Figure 28:
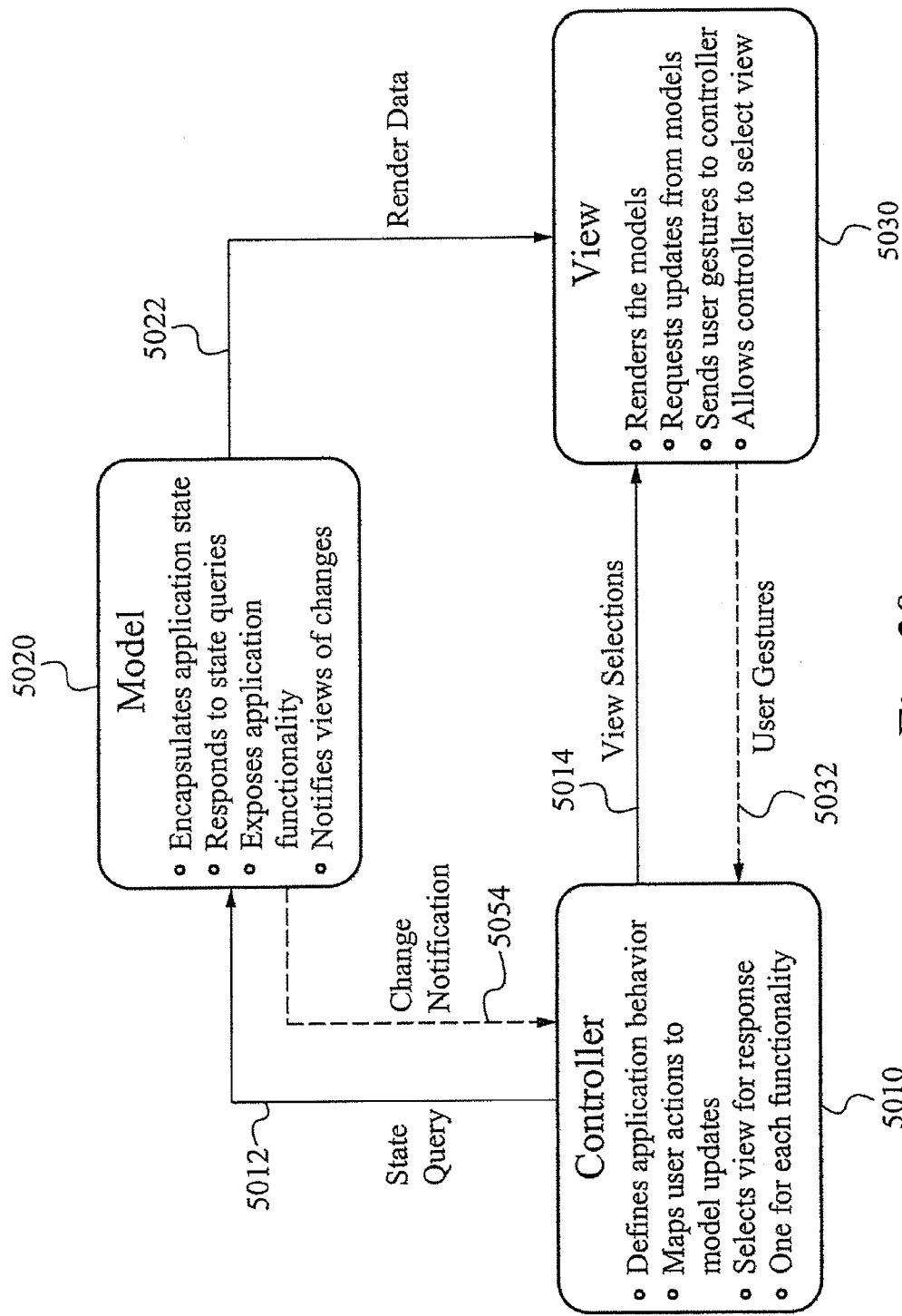
FIG. 28 illustrates a block diagram of the model view controller structure of the pie slider graphical user interface of the preferred embodiment of the present invention.
Figure 29:
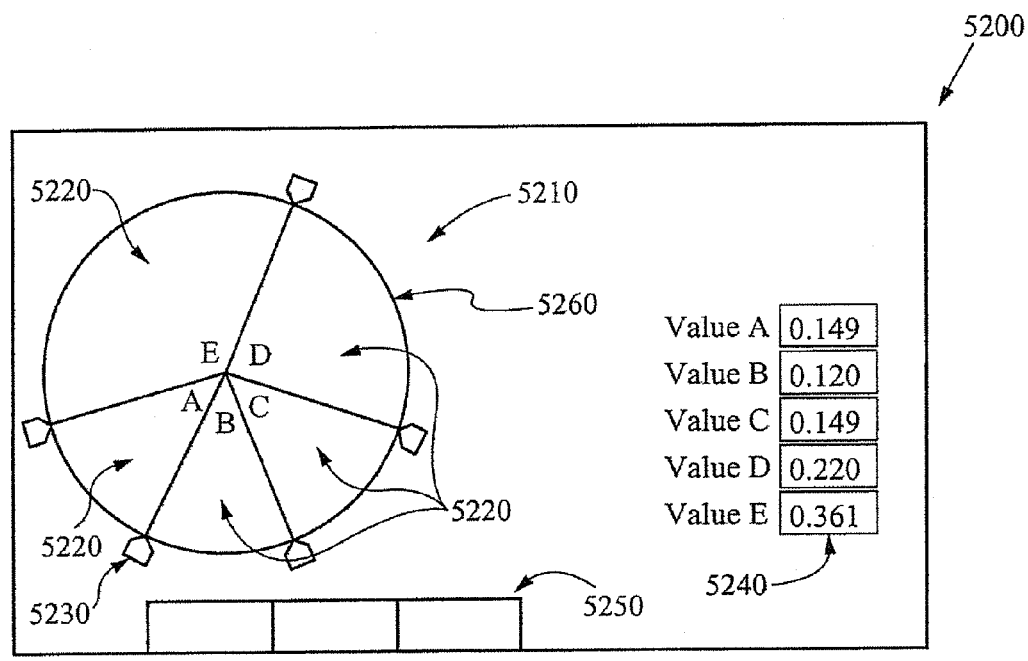
FIG. 29 illustrates a pie slider graphical user interface of the preferred embodiment of the present invention.

Referring to FIG. 28 and FIG. 29, the preferred embodiment of the present invention utilizes a Controller 5010, Model 5020, View 5030 to implement the GUI 5200. There is one of each of a Controller 5010, Model 5020 and View 5030 for each functionality in the GUI 5200. For the purposes of explanation, the following description of FIG. 28 will describe a GUI 5200 having a single functionality. The Controller 5010 defines the behavior, maps a user's action to Model 5020 updates and selects the appropriate View 5030 for response. The Controller 5010 States a Query 5012 to the Model 5020 and Selects a View 5014 if a number of Views 5030 exist. After receiving the application behavior from the Controller 5010, the Model 5020 encapsulates the application state, responds to state queries, exposes application functionality and notifies the View 5030 of changes.

The Model 5020 sends Render Data 5022 to the View 5030 and a Change Notification 5024 to the Controller 5010. Finally, the View 5030 renders the Model 5020, requests updates from the Model 5020, allows the Controller 5010 to select the View 5030 and sends User Gestures 5032 to the Controller 5010. It will be readily known to one skilled in the art that other implementations of the GUI 5200 may be used that differ than that of the implementation in FIG. 28.

Referring to FIG. 29, in the preferred embodiment of the present invention the GUI 5200 includes a data model, where each wedge 5220 of the view 5210 represents a value in an array in a data model that sums to a constant. On the ends of each arc of each wedge 5220 is a thumb 5230, the thumb 5230 being where the user can grab with the pointer, and make the wedge 5220 take up more or less of the view 5210 by dragging the thumb 5230 along the track 5260 in the view 5210. A numerical value of the segment of the wedge 5220 is instantly updated, and may be displayed in a corresponding text box 5240. The text boxes 5240 depicted here in FIG. 29 contain fixed values for exemplary purposes only. The values depicted here in FIG. 29 will change when a wedge 5220 is changed in size as described herein. As any thumb 5230 is manipulated, the wedge 5220 it borders is selected as the independent variable, and all the other wedges 5220 are designated as dependent variables. The values of the dependent variables change to keep the sum constant. Therefore, the sum of the values in the text boxes 5240 will always remain constant.

Still referring to FIG. 29, the preferred embodiment of the present invention includes the view 5210 in the GUI 5200. The view 5210 includes a number of wedges 5220, also designated by letter in FIG. 29 for further discussion. As stated previously, each wedge 5220 represents a value in an array. Additionally, each wedge 5220 corresponds to a text box 5240, e.g., the wedge 5220 designated as "E" corresponds to the text box 5240 labeled "Value E". The text boxes 5240 display the current value of each wedge 5220 and the distribution of the wedges 5220, and can be in decimal form as shown in FIG. 29, or in alternative embodiments, in percentage format.

The values contained in the text boxes 5240 in FIG. 29 preferably may be changed by changing the size, and thus the value, of the wedges 5220 as described above. For example, making the wedge 5220 labeled "E" smaller by moving the thumb 5230 nearest the top of the GUI 5200 of FIG. 29 will cause the value "0.361" in the text box 5240 labeled "Value E" to decrease accordingly. How the other wedges 5220 will react to a change in the value of one wedge 5220 will be discussed later in this document. Conversely, the value and size of any particular wedge 5220 may be changed by manually entering a value into a text box 5240. For example, entering the value "0.500" in to the text box labeled "Value E" will cause the wedge 5220 labeled "E" to increase to half the total view 5210. By the selecting any one of the wedges 5220 by clicking on that wedge 5220, the value and size of that particular wedge 5220 may be locked, thereby preventing the value and size of the locked wedge 5220 from being changed. A locked wedge 5220 will not change values even when the size and value of another wedge 5220 is changed. A locked wedge 5220 may be unlocked by merely selecting that wedge 5220 again. The status of a wedge 5220 with respect to locking may be shown by highlighting a wedge's 5220 corresponding thumb 5230 when the wedge 5220 is locked.

To further illustrate the above description, when a wedge 5220 is locked, that wedge 5220 does not change, even as the thumbs 5230 corresponding to that wedge 5220 are manipulated. The wedge 5220 will seem to slide around the circle, as the other values and corresponding wedges 5220, shrink and grow. In the preferred embodiment, the user can toggle a wedge 5220 between variable and locked by simply clicking on it.

Still referring to FIG. 29, when the independent variable wedge 5220 is resized, the other wedges 5220 are instantly resized as well, according to the "variability" of each dependent variable. In one embodiment, the variability of a wedge 5220 may be shown as the color of its border. Black could perhaps mean variable, while white may indicate the value is currently a constant, regardless of the values of the other variables. Also in the preferred embodiment, allocation algorithms may be used to determine the value of any given wedge 5220. For example, referring again to FIG. 29, the following simple algorithm creates an automatic value adjustment for the "B" wedge 5220 or the "D" wedge 5220 if the value of any one of the wedges 5220 is changed:

$$B=2D$$

In other words, if the value of the "D" wedge 5220 is "0.220," the value of the "B" wedge 5220 must be "0.440." Likewise if the "D" wedge 5220 is changed to "0.250," the value of the "B" wedge 5220 will change to "0.500." Even if changes to the remaining wedges 5220, in this case wedges 5220 A, C and E, are made, the values of the "B" wedge 5220 and the "D" wedge 5220 must adjust while still satisfying the algorithm. Of course, the algorithm given above is for exemplary purpose only, as other algorithms including more variables may be implemented as well.

Also in the preferred embodiment depicted in FIG. 29, the control buttons 5250 have multiple purposes in the general control and format of the view 5210 of the GUI 5200. For example, a control button 5250 may be designated as the "New Wedge" control button 5250. Naturally, such a control button 5250 would be selected when a user wants to add a wedge 5220 to the view 5210. Also, commonly used allocation algorithms may be designated to a control button 5250 so that a user may quickly and easily assign such algorithms to existing wedges 5220. Other functions available to the control buttons should not be limited to these examples, as the control buttons 5250 may be used for any control or format of the view 5210 as desired by the user.

Still referring to FIG. 29, the preferred embodiment of the present invention also includes a track 5260 that makes up the curved edge of every one of the wedges 5220. By "clicking" on the track 5260 a user may, in a preferred embodiment, move the nearest thumb 5230 a predetermined distance toward the point of the track 5260 clicked. By dragging the track 5260 away from or toward the center of the view 5210, the user may increase the total value of the array represented by the view 5210 while retaining the current percentages of the wedges 5220 as displayed in the text boxes 5240.

An example to illustrate the functionality of this concept can be shown in that of a retirement fund or "401(k)" distribution application incorporating the present invention. Here, a user could allocate his or her fund contribution by utilizing the view 5210 as shown in FIG. 29. If the user contributed $100 per month to this fund, the allocation of that $100 to several different funds could be controlled by dragging the thumbs 5230 adding and removing wedges 5220 using the control buttons 5250 and providing allocation algorithms to ensure that the user is allocating his or her $100 contribution to the finds as the user wishes in a simple and organized fashion. Furthermore, expanding this example, if the same user wants to increase his or her contribution from $100 to $200, the user may do so by dragging the track 5260 of the view 5210 away from the center of the view 5210, thus increasing the size of the view 5210 to reflect the larger contribution to the 401(k) fund. Of course, the present invention is not limited to the example given above, but rather is intended as an exemplary model of the operation of the GUI 5200.

Figure 30:
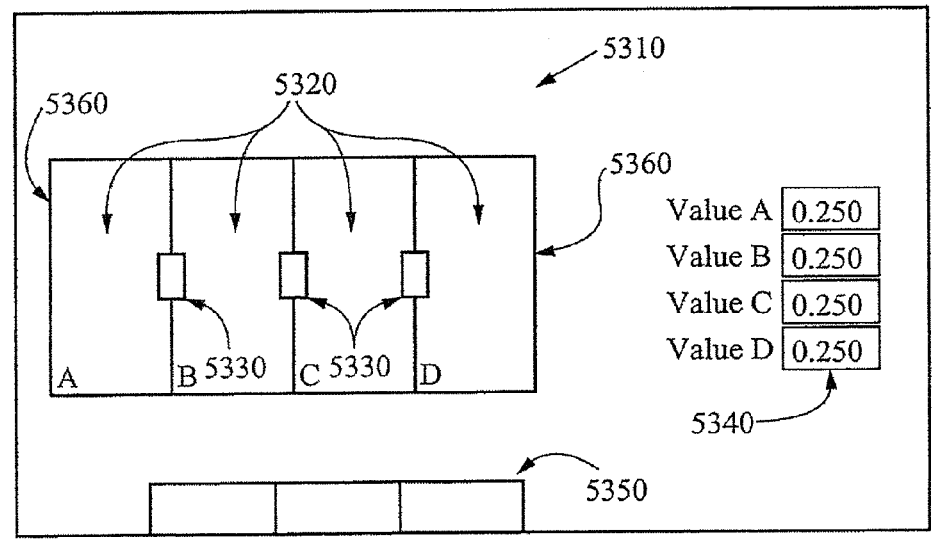
FIG. 30 illustrates a pie slider graphical user interface of an alternative embodiment of the present invention.

FIG. 30 depicts an alternative embodiment of the present invention. The GUI 5300 in this embodiment includes similar text boxes 5340 as well as control buttons 5350 that operate as the text boxes 5240 and the control buttons 5250 taught in the preferred embodiment in FIG. 29. However, the view 5310 of this alternative embodiment is not the "pie" shape of the preferred embodiment, but is bar-shaped, where the wedges 5320 are similarly "sub-bars" within the larger bar-shaped view 5310. Of course, the view 5310 of this embodiment is not limited to the bar-shaped one depicted in FIG. 30. Alternative embodiments of the present invention may include a view 5310 of any shape that is able to be shown as a whole, constant, single value having a distribution (wedges 5320) that may change in size with or without the entire view 5310 getting larger or smaller.

Still referring to FIG. 30, the operation of such a view 5310 is similar to that of the preferred embodiment in that the size of the wedges 5320 may be changed by dragging a corresponding thumb 5330, while the text boxes 5340 display the percentage of each wedge 5320 dynamically as they are changed. Likewise, allocation algorithms may also be used to control the distribution of the wedges 5320, and wedges may be locked as described in the preferred embodiment as well. However, here the thumbs are located inside the view 5310 and not on the track 5360 as was described in the preferred embodiment. A user of the GUI 5300 in FIG. 30 may still increase the volume of the entire view 5310 by dragging the track 5360, which in this embodiment is limited to the two ends of the view 5310 as depicted in FIG. 30.

Figure 31:
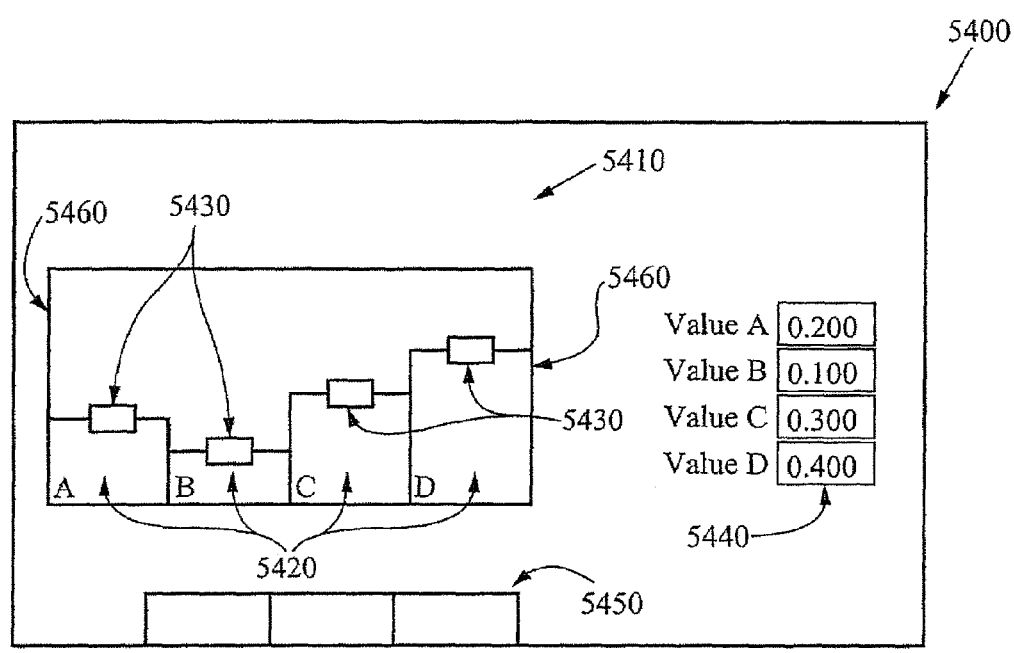
FIG. 31 illustrates a pie slider graphical user interface of an alternative embodiment of the present invention.

A further embodiment of the present is depicted in FIG. 31. In this embodiment, the GUI 5400 includes a view 5410 not constructed as a whole, but rather in a standard bar graph model. In this embodiment, each wedge 5420 of the view 5410 still represents a value in an array that sums to a constant. The operation of the text boxes 5440 and the control buttons 5450 in this embodiment are the same as those in previous embodiments. However, in this alternative embodiment, the view 5410 including the wedges 5420, thumbs 5430 and the track 5460 are configured such that the view 5410 has the appearance of a bar graph, thereby not having the structure of a whole as depicted by the embodiments in FIG. 29 and FIG. 30.

Still referring to FIG. 31, in this embodiment, the thumbs 5430 are used to adjust the size of the wedges 5420 by adjusting the height of each wedge 5420. In other words, instead of adjusting the wedge to take up a particular portion of the constant sized data model in the other embodiments, the wedges 5430 in FIG. 31 show the distribution by height of each wedge 5430. The wedges 5420 are not a piece of a pie or even a rectangular shaped data model. However, it should be noted that the sum of the heights of the wedges 5430 in this embodiment will likewise sum to a constant value, which can be changed as in other embodiments by dragging the track 5460. Dragging the track 5460 will make the entire data model 5410 larger, thus representing a larger constant value.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention.

What is claimed is:

1. A contact center for receiving and routing communications from a customer to a plurality of agents to elicit a response, the contact center comprising:
   a. at least one hub configured to receive and route the communications from the customer, the at least one hub including:
      i. at least one server configured to receive the communications from the customer;
      ii. at least one gateway configured to receive a voice call from the customer;
      iii. at least one router coupled to the at least one server, the at least one router configured to normalize the communications from the customer; and
      iv. an application server coupled to the at least one router, the application server configured to route the communications based upon a set of predetermined routing criteria, the application server configured with ACD software that matches at least one node to the communications; and
   b. the at least one node coupled to the at least one hub, the at least one node configured to receive the communications, the at least one node further configured to route the communications to the plurality of agents.

2. The contact center as claimed in claim 1 further comprising a node router configured to interface between the at least one hub and the at least one node, wherein the node router provides the application server with the availability status of the at least one node and the plurality of agents.

3. The contact center as claimed in claim 1 further comprising an immediate workflow engine configured in the application server, wherein the immediate workflow engine includes the predetermined routing criteria.

4. The contact center as claimed in claim 3 further comprising at least one corporate CRM database coupled to the at least one hub, wherein the immediate workflow engine is configured to a set of CRM data from the at least one corporate CRM database.

5. The contact center as claimed in claim 1 wherein the at least one server includes:
   a. an email server configured to receive non-realtime communication including emails and voice messages;
   b. a web collaboration server configured to receive real-time communications including web collaboration requests; and
   c. a voice server coupled to at least one gateway, the voice server configured to receive the voice call from the at least one gateway.

6. The contact center as claimed in claim 5 wherein the at least one router includes:
   a. an email router corresponding to the email server;
   b. a web collaboration router corresponding to the web collaboration server; and
   c. a voice router corresponding to the voice server.

7. The contact center as claimed in claim 5 further comprising:
   a. a plurality of shared file folders configured in the email server where non-realtime communications are received and stored, wherein an aged communication is extracted from the plurality of shared file folders based on a set of predetermined escalation criteria;

b. an escalation service coupled with the plurality of shared file folders such that the escalation service routes the aged communication to the immediate workflow engine; and c. a plurality of designated agents such that the aged communication is displayed on a desktop of a first designated agent after receiving the aged communication from the immediate workflow, wherein the first designated agent provides an immediate response to the aged communication on the desktop and further wherein the escalation service escalates an immediate communication to the immediate workflow engine for routing to the first designated agent.

8. The contact center as claimed in claim 7 wherein the first and second designated agents may select non-realtime communications from the plurality of shared file folders that are not designated as aged, and further wherein the first and second designated agents respond to those non-realtime communications not designated as aged.

9. The contact center as claimed in claim 7 wherein an agent is designated based on a set of predetermined designation criteria.

10. The contact center as claimed in claim 7 wherein the first designated agent is prompted when the first designated agent does not respond within a predetermined timeout period after the aged communication is displayed on the desktop.

11. The contact center as claimed in claim 7 wherein the set of predetermined escalation criteria are variable such that the set of predetermined escalation criteria will change while the first designated agent responds to the aged communication.

12. The contact center as claimed in claim 7 wherein the desktop includes a visual indicator, further wherein the visual indicator includes an expiration time for the aged communication in the plurality of shared file folders.

13. The contact center as claimed in claim 7 wherein the communication is designated as immediate based on the set of predetermined escalation criteria before the communication becomes aged.

14. The contact center as claimed in claim 7 wherein the escalation service checks a present threshold for a maximum number of immediate workflows and delays escalating the communications designated as immediate until the number of immediate workflows is below the threshold.

15. The contact center as claimed in claim 7 further comprising a second designated agent, wherein when the first designated agent does not answer the aged communication, the immediate workflow routes the aged communication to the second designated agent.

16. The contact center as claimed in claim 15 further comprising sending an acknowledgment message when the first and second designated agents are unavailable.

17. The contact center as claimed in claim 15 wherein the aged communication is routed to the second designated agent after the first designated agent does not answer the prompt.

18. The contact center as claimed in claim 15 wherein the aged communication is routed to the second designated agent after the first designated agent answers the prompt by declining to respond to the aged communication.

19. The contact center as claimed in claim 1 wherein the software ACD optimally matches the plurality of agents to the communications.

20. The contact center as claimed in claim 19 wherein a first one of the at least one nodes match the communications to a second one of the at least one nodes when a plurality of nodes exist, and the at least one hub is not operational, and further wherein the at least one node matches the communications to the plurality of agents when the at least one hub is not operational.

21. The contact center as claimed in claim 19 further comprising a database, coupled to a workflow engine, the database configured to record a set of transaction data produced by the workflow engine.

22. The contact center as claimed in claim 21 further comprising a contact history viewer, the contact history viewer configured to allow the plurality of agents to view the set of transaction data.

23. The contact center as claimed in claim 1 herein the software ACD calculates a contact priority value for every communication when one of the plurality of agents is available.

24. The contact center as claimed in claim 1 wherein the at least one node includes:

a. a node voice server configured to receive a local voice call from a local gateway;

b. a node voice router coupled to the node voice server and configured to receive the local voice call from the node voice server; and c. a node application server coupled to the node voice router and the at least one hub, wherein the node application server is configured to receive the local voice call from the node voice router, and further wherein the node application server is configured to receive the communications from the at least one hub.

25. The contact center as claimed in claim 1 further comprising a graphical user interface for displaying on an agent desktop, the graphical user interface including:

a. a shutters managed display having a task bar, wherein the task bar includes at least one managed application;

b. at least one shutter icon corresponding to each one of the at least one managed applications; and c. a workflow having at least one step corresponding to each one of the at least one shutter icons, wherein one of the at least one shutter icons is selected according to the corresponding step of the workflow, and the managed application corresponding to the selected shutter icon is displayed in a managed application display area, wherein a predetermined set of rules determines the size, placement and visibility of the at least one managed application in the managed application display area.

26. The contact center as claimed in claim 25 further wherein the managed application corresponding to the selected shutter icon is displayed outside of the managed application display area.

27. The contact center as claimed in claim 25 further comprising a quick start bar, wherein the quick start bar includes at least one non-managed application.

28. The contact center as claimed in claim 25 further comprising a contact center control panel illustrating current contact information.

29. The contact center as claimed in claim 25 wherein the graphical user interface is displayed on the agent desktop having a display and an input device.

30. The contact center as claimed in claim 29 wherein the input device is used to selectively input data in to any one of the at least one managed applications.

31. The contact center as claimed in claim 25 wherein when one of the plurality of agents select any of the at least one shutter icons, the corresponding managed application is displayed in the managed application display area.

32. The contact center as claimed in claim 1 further comprising a second graphical user interface for displaying in an application on the agent desktop, the second graphical user interface including:
  a. a view including a plurality of wedges, wherein each of the plurality of wedges represents a value;
  b. a thumb corresponding to each of the plurality of wedges, the thumb configured to allow a user to change the value of the corresponding wedge; and
  c. a track forming an outside edge of the view, the track configured to allow the user to change an attribute of the second graphical user interface,
  wherein when the user changes the value of any of the plurality of wedges, the remaining wedges adjust their values according to a set of predetermined allocation criteria.

33. The contact center as claimed in claim 32 wherein the thumb is configured such that the user changes the value of one of the plurality of wedges by dragging the thumb.

34. The contact center as claimed in claim 32 wherein the thumb and the track are configured such that the user changes the value of one of the plurality of wedges by clicking on the track.

35. The contact center as claimed in claim 32 wherein the sum of the values of the plurality of wedges is a constant value.

36. The contact center as claimed in claim 35 wherein the track is configured such that the user changes the attribute of the graphical user interface by dragging the track.

37. The contact center as claimed in claim 36 wherein the attribute of the second graphical user interface is the constant value.

38. The contact center as claimed in claim 32 wherein any of the plurality of wedges can be locked by the user such that the value corresponding to the locked wedge will not change.

39. The contact center as claimed in claim 32 further comprising an allocation algorithm, wherein the allocation algorithm creates a relationship between any of the values of the plurality of wedges.

40. The contact center as claimed in claim 32 further comprising a plurality of text boxes corresponding to each of the plurality of wedges, wherein the text boxes include the value of each of the plurality of wedges, and further wherein the user may change the value of any of the plurality of wedges by entering a new value into any of the plurality of text boxes.

41. The contact center as claimed in claim 32 further comprising a plurality of control buttons, wherein the control buttons are programmable, thereby allowing the user to customize the function of the control buttons.

42. The contact center as claimed in claim 32 wherein the view is a circle.

43. The contact center as claimed in claim 32 wherein the view i a rectangle.

44. The contact center as claimed in claim 32 wherein the view is a bar graph.

45. The contact center as claimed in claim 1 wherein the plurality of agents have a common set of controls for receiving and responding to the communications.

46. The contact center as claimed in claim 45 further comprising a softphone, wherein the plurality of agents utilize the softphone for receiving and responding to the communications.

47. A contact center for receiving and routing communications from a customer to a plurality of agents to elicit a response, the contact center comprising:
  a. at least one hub configured to receive and route the communications from the customer, the at least one hub including:
    i. at least one server configured to receive the communications from the customer;
    ii. at least one gateway configured to receive a voice call from the customer, the at least one gateway including a proxy table configured in each of the at least one gateway, wherein the at least one gateway sends the voice call to one of at least one proxy serve; and a call restoration data table configured in each of the at least one gateway, wherein the call restoration data table provides data to restore a lost call;
    iii. at least one router coupled to the at least one server, the at least one router configured to normalize the communications from the customer; and
    iv. an application server coupled to the at least one route, the application server configured to route the communications based upon a set of predetermined routing criteria; and
  b. at least one node coupled to the at least one hub, the at least one node configured to receive the communications, the at least one node further configured to route the communications to the plurality of agents.

48. The contact center as claimed in claim 47 wherein the voice call is divided by the at least one gateway into a session initiation protocol portion and a real time protocol portion.

49. The contact center as claimed in claim 48 wherein the at least one hub includes the at least one proxy server, the at least one proxy server configured to receive the session initiation protocol portion of the voice call.

50. The contact center as claimed in claim 48 further comprising at least one media server configured in the at least one hub, the at least one media server configured to receive the real time protocol portion for the voice call.

51. The contact center as claimed in claim 47 wherein the at least one node are coupled to each of the at least one hub with a local area network connection.

52. The contact center as claimed in claim 47 wherein the at least one gateway is configured such that when one of the at least one gateway hills, the remainder of the at least one gateway remains operational.

53. The contact center as claimed in claim 47 wherein the proxy table selects the appropriate proxy server based on a priority scheme.

54. The contact center as claimed in claim 47 wherein the data provided to the call restoration data table is transmitted to the call restoration data table in a session initiation protocol packet, further wherein the session initiation protocol packet includes a header and an SDP body.

55. The contact center as claimed in claim 54 wherein the data provided to the call restoration data table is stored as a key value pair, further wherein the key value pair is derived from the header and the SDP body.

56. A contact center for receiving and routing communications from a customer to a plurality of agents to elicit a response, the contact center comprising:
  a. at least one hub configured to receive and route the communications from the customer, the at least one hub including:
    i. at least one server configured to receive the communications from the customer;
    ii. at least one gateway configured to receive a voice call from the customer;

iii. at least one router coupled to the at least one server, the at least one router configured to normalize the communications from the customer; and
iv. an application server coupled to the at least one router, the application server configured to route the communications based upon a set of predetermined routing criteria;
b. at least one node coupled to the at least one hub, the at least one node configured to receive the communications, the at least one node further configured to route the communications to the plurality of agents;
c. a remote data access device;
d. a remote terminal coupled with the remote data access device through a data circuit; and
e. a remote telephone coupled with the at least one gateway through a telephone circuit,
wherein when a remote agent logs the remote terminal into the contact center, a voice component of the voice call is transmitted from the at least one gateway to the remote telephone and a data component of the voice call is transmitted from the contact center to the remote terminal.

57. The contact center as claimed in claim 56 wherein when the remote terminal logs into the contact center, the remote terminal provides a phone number to direct the transmission of the voice component of the voice call from the at least one gateway to the remote telephone.

58. The contact center as claimed in claim 56 wherein the remote agent can respond to the voice call using the remote telephone and the remote terminal.

59. The contact center as claimed in claim 56 wherein the telephone circuit is a public switched telephone network.

60. The contact center as claimed in claim 56 wherein the data circuit is a high speed internet connection.

61. The contact center as claimed in claim 56 wherein the data circuit is a high speed wireless internet connection.

62. The contact center as claimed in claim 56 wherein the remote data access device is a VPN device.

63. A method of distributing communications in a contact center to elicit a response, the method comprising:
a. receiving realtime and non-realtime communications in at least one hub, wherein the at least one hub includes at least one server configured to receive the communications;
b. normalizing the communications, wherein at least one media router is configured for normalizing the communications; and
c. routing the communications, wherein an application server is configured to route the communications to at least one node based upon a set of predetermined routing criteria, further wherein the at least one node is configured to route the communications to at least one destination; and
d. receiving a voice call from a customer wherein at least one gateway is configured to receive the voice call.

64. The method as claimed in claim 63 further comprising interfacing between the at least one hub and the at least one node with a node router, wherein the node router provides the application server with the availability status of the at least one node and the plurality of agents.

65. The method as claimed in claim 63 further comprising configuring an immediate workflow engine in the application server, wherein the immediate workflow engine includes the predetermined routing criteria.

66. The method as claimed in claim 65 further comprising extracting a set of CRM data from at least one corporate CRM database, wherein the at least one corporate CRM database is coupled to the at least one hub, and further wherein the immediate workflow engine is configured to extract the set of CRM data from the at least one corporate CRM database.

67. The method as claimed in claim 63 further comprising:
a. configuring an email server in the at least one server to receive non-realtime communication including emails and voice messages;
b. configuring a web collaboration server in the at least one server to receive realtime communications including web collaboration requests; and
c. coupling a voice server to the at least one gateway, the voice server configured to receive the voice call from the at least one gateway.

68. The method as claimed in claim 67 further comprising:
a. configuring an email router corresponding to the email server;
b. configuring a web collaboration router corresponding to the web collaboration server; and
c. configuring a voice router corresponding to the voice server.

69. The method as claimed in claim 63 further comprising matching the at least one node to the communications with a software ACD configured in the application server.

70. The method as claimed in claim 69 wherein the software ACD optimally matches the plurality of agents to the communications.

71. The method as claimed in claim 70 wherein a first one of the at least one nodes match the communications to a second one of the at least one nodes when a plurality of nodes exist and the at least one hub is not operational, and further wherein the at least one node matches the communications to the plurality of agents when the at least one hub is not operational.

72. The method as claimed in claim 70 further comprising recording a set of transaction data produced by a workflow engine with a database, wherein the database is coupled to the workflow engine.

73. The method as claimed in claim 72 further comprising configuring a contact history viewer such that the plurality of agents can view the set of transaction data.

74. The method as claimed in claim 69 further comprising the software ACD calculating a contact priority value for every communication when one of the plurality of agents is available.

75. The method as claimed in claim 63 further comprising:
a. configuring a node voice server to receive a local voice call from a local gateway;
b. coupling a node voice router to the node voice server and configuring the node voice router to receive the local voice call from the node voice server; and
c. coupling a node application server to the node voice router and the at least one hub, wherein the node application server is configured to receive the local voice call from the node voice router, and further wherein the node application server is configured to receive communications from the at least one hub.

76. The method as claimed in claim 63 wherein the plurality of agents have a common set of controls for receiving and responding to the communications.

77. A contact center for distributing communications to elicit a response, the contact center comprising:
a. means for receiving the communications in at least one hub;

b. means for normalizing the communications wherein the normalizing means are coupled to the receiving means;

c. means for routing the communications to at least one node based upon a set of predetermined routing criteria, wherein the routing means are coupled to the normalizing means; and d. means for interfacing between the at least one hub and the at least one node wherein the interfacing means includes a node router, further wherein the node router provides an application server with an availability status of the at least one node and a plurality of agents.

78. The contact center as claimed in claim 77 further comprising means for receiving a voice call from the customer wherein the receiving means includes at least one gateway configured to receive the voice call.

79. The contact center as claimed in claim 78 further comprising:

a. means for configuring an email server in the at least one server to receive non-realtime communication including emails and voice messages;

b. means for configuring a web collaboration server in the at least one server to receive realtime communications including web collaboration requests; and c. means for coupling a voice server to the at least one gateway, the voice server configured to receive the voice call from the at least one gateway.

80. The contact center as claimed in claim 79 further comprising:

a. means for configuring an email router corresponding to the email server;

b. means for configuring a web collaboration router corresponding to the web collaboration server; and c. means for configuring a voice router corresponding to the voice server.

81. The contact center as claimed in claim 77 further comprising means for configuring an immediate workflow engine in the application server, wherein the immediate workflow engine includes the predetermined routing criteria.

82. The contact center as claimed in claim 81 further comprising means for extracting a set of CRM data from at least one corporate CRM database, wherein the at least one corporate CRM database is coupled to the at least one hub, and further wherein the extracting means includes an immediate workflow engine configured to extract the set of CRM data from the at least one corporate CRM database.

83. The contact center as claimed in claim 77 further comprising means for matching the at least one node to the communications wherein the matching means include a software ACD configured in the application server.

84. The contact center as claimed in claim 83 wherein the matching means optimally matches the plurality of agents to the communications.

85. The contact center as claimed in claim 84 further comprising a second means for matching wherein the second matching means includes a first one of the at least one nodes configured to match the communications to a second one of the at least one nodes when a plurality of nodes exist, and the at least one hub is not operational, and further wherein the at least one node matches the communications to the plurality of agents when the at least one hub is not operational.

86. The contact center as claimed in claim 84 further comprising means for recording a set of transaction data produced by a workflow engine, wherein the recording means includes a database, wherein the database is coupled to the workflow engine.

87. The contact center as claimed in claim 86 further comprising means for configuring a contact history viewer such that the plurality of agents can view the set of transaction data.

88. The contact center as claimed in claim 83 further comprising means for calculating a contact priority value for every communication when one of the plurality of agents is available, wherein the calculating means includes the software ACD.

89. The contact center as claimed in claim 77 wherein the plurality of agents have a common set of controls for receiving and responding to the communications.

* * * * *

UNITED STATES PATENT AND TRADEMARK OFFICE
CERTIFICATE OF CORRECTION

| | | |
|---|---|---|
| PATENT NO. | : 7,382,773 B2 | Page 1 of 1 |
| APPLICATION NO. | : 10/632615 | |
| DATED | : June 3, 2008 | |
| INVENTOR(S) | : Carl Schoeneberger et al. | |

It is certified that error appears in the above-identified patent and that said Letters Patent is hereby corrected as shown below:

On the title page:

On the title page, (75) located in the inventor's name (left hand column), delete "Kevin McPartian" and replace with --Kevin McPartlan--.

On the title page, (56) located in the References Cited under U.S. Patent Documents, (right hand column, page 2), delete the following reference "2004/0054743 A1 3/2004 McPartian et al." and replace with --2004/0054743 A1 3/2004 McPartlan et al.--.

In the Claims:

In Claim 43, column 72, line number 55, delete the text "i a rectangle" and replace with --is a rectangle--.

In Claim 63, column 75, line number 47, delete the text "and".

Signed and Sealed this

Twenty-sixth Day of August, 2008

JON W. DUDAS
*Director of the United States Patent and Trademark Office*